US012689928B2

(12) United States Patent
Farag et al.

(10) Patent No.: US 12,689,928 B2
(45) Date of Patent: Jul. 21, 2026

(54) INTER-CELL BEAM MEASUREMENT AND REPORTING

(71) Applicant: Samsung Electronics Co., Ltd., Suwon-si (KR)

(72) Inventors: Emad Nader Farag, Flanders, NJ (US); Eko Onggosanusi, Coppell, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 18/494,663

(22) Filed: Oct. 25, 2023

(65) Prior Publication Data

US 2024/0155399 A1     May 9, 2024

Related U.S. Application Data

(60) Provisional application No. 63/423,344, filed on Nov. 7, 2022.

(51) Int. Cl.
*H04W 24/00*       (2009.01)
*H04L 5/00*        (2006.01)
(Continued)

(52) U.S. Cl.
CPC .......... *H04W 24/10* (2013.01); *H04L 5/0051* (2013.01); *H04L 5/0055* (2013.01); *H04L 5/0094* (2013.01); *H04W 24/08* (2013.01)

(58) Field of Classification Search
None
See application file for complete search history.

(56) References Cited

U.S. PATENT DOCUMENTS

2021/0051710 A1*  2/2021  Cirik ................. H04W 74/0833
2023/0308974 A1*  9/2023  Chandrashekar ...... H04B 7/022
(Continued)

FOREIGN PATENT DOCUMENTS

WO       2022071764 A1    4/2022

OTHER PUBLICATIONS

"5G; NR; Physical channels and modulation (3GPP TS 38.211 version 17.6.0 Release 17)", ETSI TS 138 211 V17.6.0, Oct. 2023, 140 pages.
(Continued)

*Primary Examiner* — Brandon M Renner

(57)       ABSTRACT

A UE includes a transceiver configured to receive first information related to a group of CSI-RS resources, receive second information related to a group TCI states, receive third information indicating an association between the group of TCI states and the group of CSI-RS resources, receive fourth information indicating resources for transmission of a beam measurement report, receive a MAC CE including a cell switch command, and transmit a HARQ-ACK. The UE further includes a processor configured to determine one or more CSI-RS resources from the group of CSI-RS resources based on the TCI state. The transceiver is further configured to receive the one or more CSI-RS resources. The processor is further configured to determine, based on a measurement of the one or more CSI-RS resources, a beam measurement report. The transceiver is further configured to transmit the beam measurement report using the resources for transmission of a beam measurement report.

20 Claims, 32 Drawing Sheets

(51) Int. Cl.
   *H04W 24/08* (2009.01)
   *H04W 24/10* (2009.01)

(56) References Cited

U.S. PATENT DOCUMENTS

| | | | | |
|---|---|---|---|---|
| 2024/0031825 | A1* | 1/2024 | Sakhnini | H04W 72/23 |
| 2024/0276584 | A1* | 8/2024 | Yuan | H04W 76/20 |
| 2024/0405819 | A1* | 12/2024 | Hakola | H04L 5/0053 |
| 2025/0226956 | A1* | 7/2025 | Li | H04W 72/54 |
| 2025/0274786 | A1* | 8/2025 | Guo | H04W 16/28 |

OTHER PUBLICATIONS

"5G; NR; Multiplexing and channel coding (3GPP TS 38.212 version 17.6.0 Release 17)", ETSI TS 138 212 V17.6.0, Oct. 2023, 206 pages.

"5G; NR; Physical layer procedures for control (3GPP TS 38.213 version 17.7.0 Release 17)", ETSI TS 138 213 V17.7.0, Oct. 2023, 268 pages.

"5G; NR; Physical layer procedures for data (3GPP TS 38.214 version 17.7.0 Release 17)", ETSI TS 138 214 V17.7.0, Oct. 2023, 236 pages.

"5G; NR; Medium Access Control (MAC) protocol specification (3GPP TS 38.321 version 17.6.0 Release 17)", ETSI TS 138 321 V17.6.0, Oct. 2023, 255 pages.

"5G; NR; Radio Resource Control (RRC); Protocol specification (3GPP TS 38.331 version 17.6.0 Release 17)", ETSI TS 138 331 V17.6.0, Oct. 2023, 1309 pages.

MediaTek, "New WID on Further NR mobility enhancements", 3GPP TSG RAN Meeting #94e, RP-213565, Dec. 2021, 5 pages.

International Search Report and Written Opinion issued Feb. 19, 2024 regarding International Application No. PCT/KR2023/017792, 7 pages.

Moderator (Fujitsu), "FL summary 3 on L1 enhancements for inter-cell beam management", 3GPP TSG RAN WG1 Meeting #110bis-e, R1-2210675, Oct. 2022, 128 pages.

Moderator (CATT), "Summary on beam management for simultaneous multi-TRP transmission with multiple Rx panels", 3GPP TSG RAN WG1 Meeting #103-e, R1-200nnnn, Oct. 2020, 41 pages.

Samsung, "On L1 enhancements for inter-cell beam management", 3GPP TSG RAN WG1 #110bis-e, R1-2209754, Oct. 2022, 6 pages.

Qualcomm Incorporated, "L1 Enhancements for Inter-Cell Beam Management", 3GPP TSG RAN WG1 Meeting #110-Bis-e, R1-2210008, Oct. 2022, 10 pages.

* cited by examiner

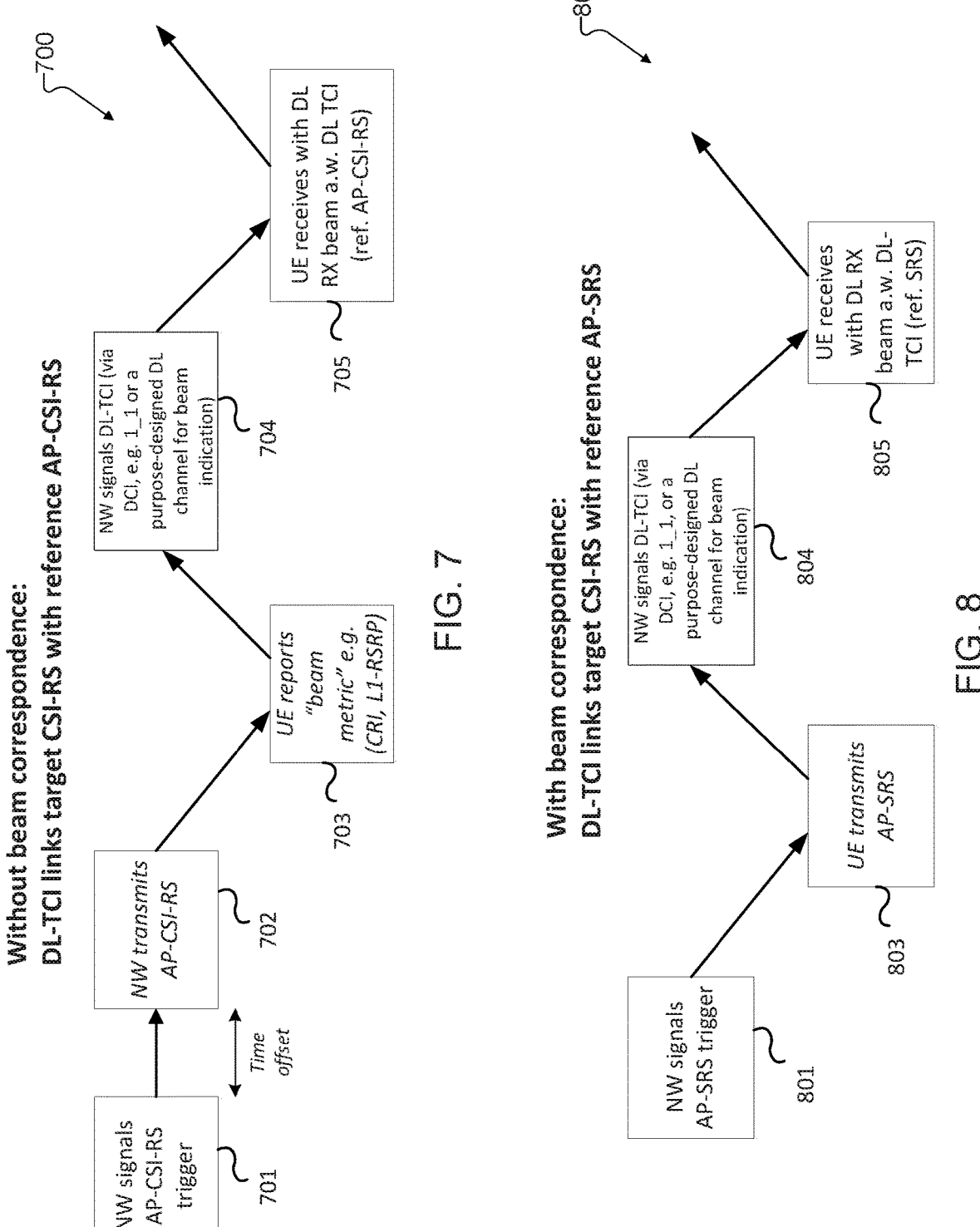

Without beam correspondence:
DL-TCI links target CSI-RS with reference AP-CSI-RS

NW signals AP-CSI-RS trigger — 701

Time offset

NW transmits AP-CSI-RS — 702

UE reports "beam metric" e.g. (CRI, L1-RSRP) — 703

NW signals DL-TCI (via DCI, e.g. 1_1 or a purpose-designed DL channel for beam indication) — 704

UE receives with DL RX beam a.w. DL TCI (ref. AP-CSI-RS) — 705

With beam correspondence:
DL-TCI links target CSI-RS with reference AP-SRS

NW signals AP-SRS trigger — 801

UE transmits AP-SRS — 803

NW signals DL-TCI (via DCI, e.g. 1_1, or a purpose-designed DL channel for beam indication) — 804

UE receives with DL RX beam a.w. DL-TCI (ref. SRS) — 805

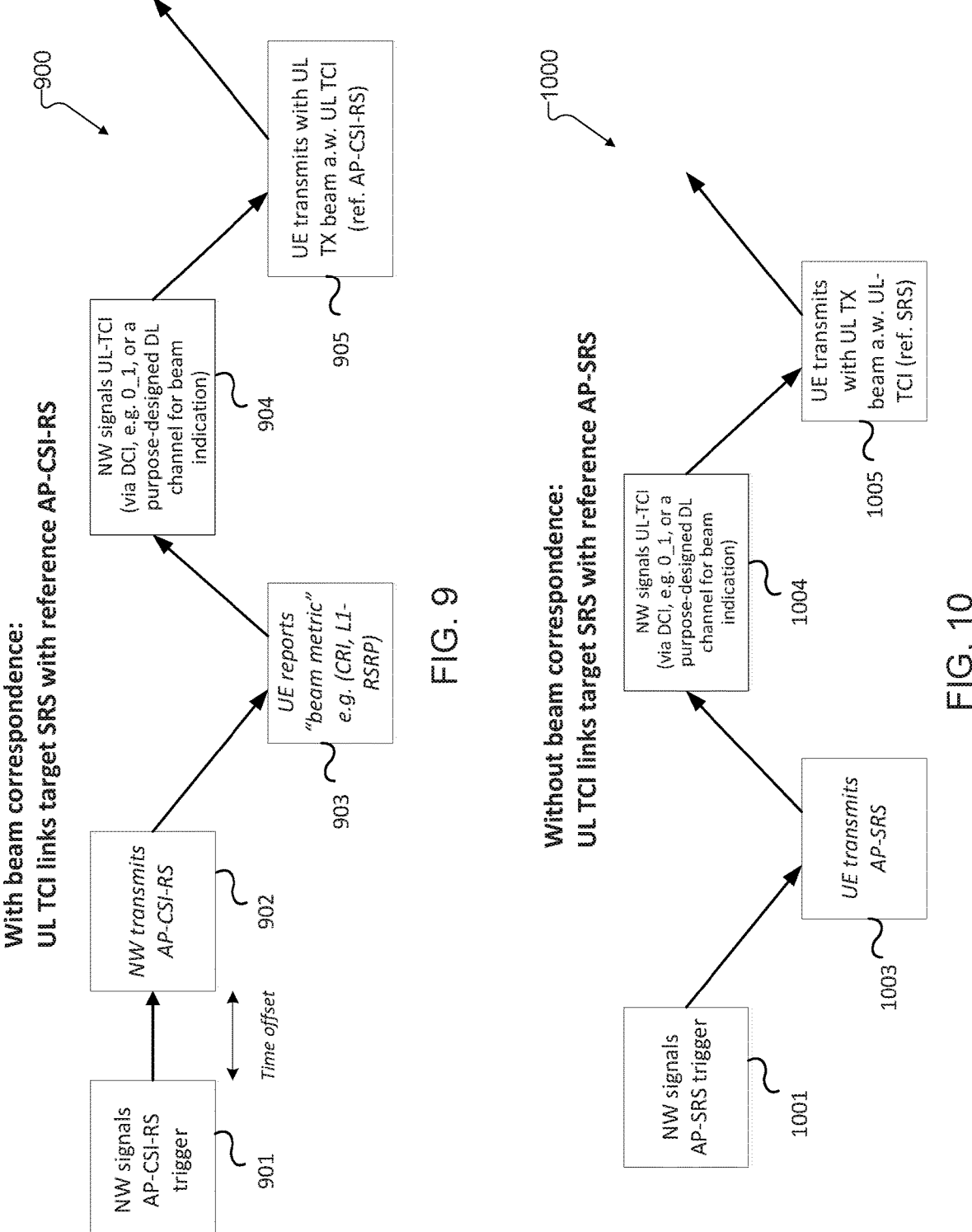

With beam correspondence:
UL TCI links target SRS with reference AP-CSI-RS

NW signals AP-CSI-RS trigger — 901

Time offset

NW transmits AP-CSI-RS — 902

UE reports "beam metric" e.g. (CRI, L1-RSRP) — 903

NW signals UL-TCI (via DCI, e.g. 0_1, or a purpose-designed DL channel for beam indication) — 904

UE transmits with UL TX beam a.w. UL TCI (ref. AP-CSI-RS) — 905

Without beam correspondence:
UL TCI links target SRS with reference AP-SRS

NW signals AP-SRS trigger — 1001

UE transmits AP-SRS — 1003

NW signals UL-TCI (via DCI, e.g. 0_1, or a purpose-designed DL channel for beam indication) — 1004

UE transmits with UL TX beam a.w. UL-TCI (ref. SRS) — 1005

Each BMR can be in a separate reporting instance or all BMRs can be combined in the same reporting instance or partially combined in less than K reporting instances.

1600

Set S is union of
subsets $S_0$, $S_1$, ... $S_{K-1}$

Each BMR can be in a separate reporting instance or all BMRs can be combined in the same reporting instance or partially combined in less than K reporting instances.

1800b gNB Processing

UE Processing

1900
Indicated TCI States in
channel conveying
beam indication
AP-SRS or SP-SRS Set S
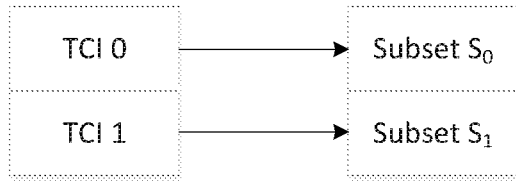
TCI 0 $\longrightarrow$ Subset $S_0$
TCI 1 $\longrightarrow$ Subset $S_1$
TCI K-1 $\longrightarrow$ Subset $S_{K-1}$
Set S is union of
subsets $S_0$, $S_1$, ... $S_{K-1}$
FIG. 19

┌─2000a

| P/SP-SRS | | P/SP-SRS |

P/SP-SRS based on previous beam indication

P/SP-SRS based on current beam indication

Beam indication (new beam) for target cell → ACK → New beam applied →

| P/SP-SRS | | P/SP-SRS |

P/SP-SRS based on previous beam indication

P/SP-SRS based on current beam indication

Cell switch to target cell → ACK → New beam applied →

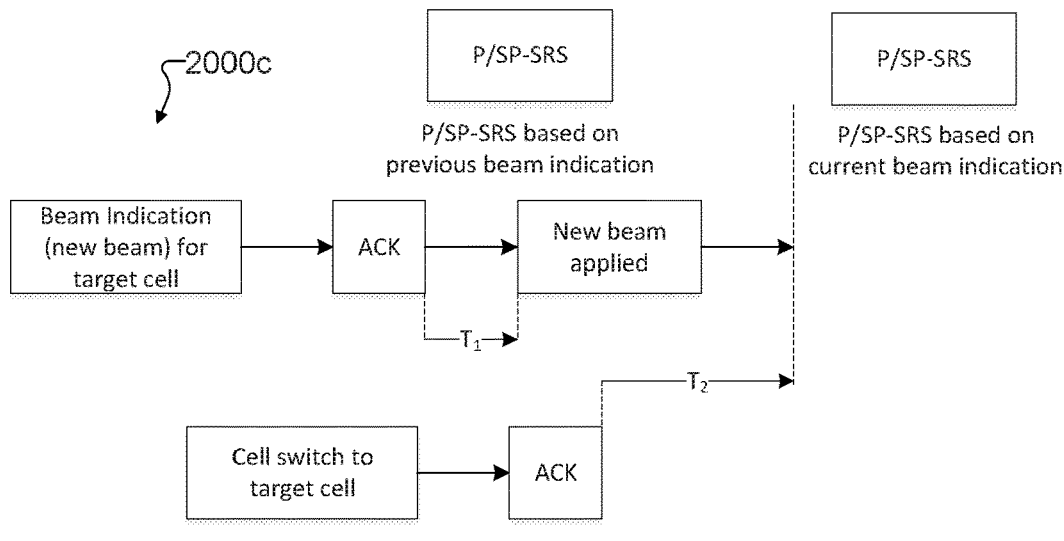

┌─2000c

| P/SP-SRS | | P/SP-SRS |

P/SP-SRS based on previous beam indication

P/SP-SRS based on current beam indication

Beam indication (new beam) for target cell → ACK → New beam applied →

$T_1$ $T_2$

Cell switch to target cell → ACK

FIG. 20C

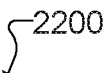
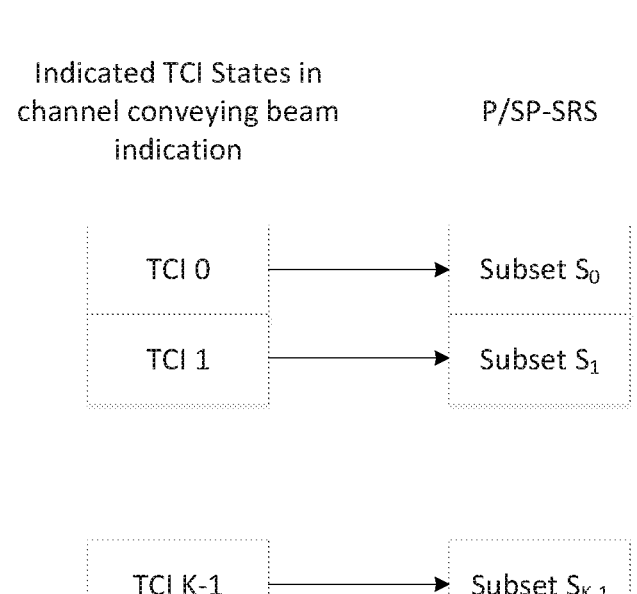
Indicated TCI States in channel conveying beam indication
P/SP-SRS
TCI 0 → Subset $S_0$
TCI 1 → Subset $S_1$
TCI K-1 → Subset $S_{K-1}$
Set S is union of
subsets $S_0$, $S_1$, ... $S_{K-1}$
FIG. 22

INTER-CELL BEAM MEASUREMENT AND REPORTING

CROSS-REFERENCE TO RELATED APPLICATION(S) AND CLAIM OF PRIORITY

This application claims priority under 35 U.S.C. § 119(e) to U.S. Provisional Patent Application No. 63/423,344 filed on Nov. 7, 2022. The above-identified provisional patent application is hereby incorporated by reference in its entirety.

TECHNICAL FIELD

This disclosure relates generally to wireless networks. More specifically, this disclosure relates to methods and apparatuses for inter-cell beam measurement and reporting.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides methods and apparatuses for inter-cell beam measurement and reporting.

In one embodiment, a user equipment (UE) is provided. The UE includes a transceiver configured to receive first information related to a group of channel state information reference signal (CSI-RS) resources associated with a candidate cell, receive second information related to a group of transmission configuration indication (TCI) states associated with the candidate cell, and receive third information indicating an association between the group of TCI states and the group of CSI-RS resources. Each TCI state from the group of TCI states is associated with one or more CSI-RS resources from the group of CSI-RS resources. The transceiver is further configured to receive fourth information indicating resources for transmission of a beam measurement report on the candidate cell, and receive a medium access control channel element (MAC CE) including a cell switch command to the candidate cell. The cell switch command includes a TCI state for the candidate cell. The transceiver is further configured to transmit, in response to the cell switch command, a hybrid automatic repeat request acknowledgement (HARQ-ACK). The UE further includes a processor operably coupled to the transceiver. The processor is configured to determine one or more CSI-RS resources from the group of CSI-RS resources based on the TCI state. The transceiver is further configured to receive the one or more CSI-RS resources. The processor is further configured to determine, based on a measurement of the one or more CSI-RS resources, a beam measurement report. The transceiver is further configured to transmit the beam measurement report using the resources for transmission of the beam measurement report on the candidate cell.

In another embodiment, a base station (BS) is provided. The BS includes a transceiver configured to transmit first information related to a group of CSI-RS resources associated with a candidate cell, transmit second information related to a group of TCI states associated with the candidate cell, and transmit third information indicating an association between the group of TCI states and the group of CSI-RS resources. Each TCI state from the group of TCI states is associated with one or more CSI-RS resources from the group of CSI-RS resources. The transceiver is further configured to transmit fourth information indicating resources for a beam measurement report on the candidate cell and transmit a MAC CE including a cell switch command to the candidate cell. The cell switch command includes a TCI state for the candidate cell. The transceiver is further configured to receive, in response to the cell switch command, a hybrid automatic repeat request acknowledgement (HARQ-ACK). The BS further includes a processor operably coupled to the transceiver. The processor is configured to determine one or more CSI-RS resources from the group of CSI-RS resources based on the TCI state. The transceiver is further configured to transmit the one or more CSI-RS resources and receive the beam measurement report using the resources for the beam measurement report on the candidate cell.

In yet another embodiment, a method of operating a UE is provided. The method includes receiving first information related to a group of CSI-RS resources associated with a candidate cell, receiving second information related to a group of TCI states associated with the candidate cell, and receiving third information indicating an association between the group of TCI states and the group of CSI-RS resources. Each TCI state from the group of TCI states is associated with one or more CSI-RS resources from the group of CSI-RS resources. The method further includes receiving fourth information indicating resources for transmission of a beam measurement report on the candidate cell and receiving a MAC CE including a cell switch command to the candidate cell. The cell switch command includes a TCI state for the candidate cell. The method further includes transmitting, in response to the cell switch command, a HARQ-ACK, determining one or more CSI-RS resources from the group of CSI-RS resources based on the TCI state, receiving the one or more CSI-RS resources, determining, based on a measurement of the one or more CSI-RS resources, a beam measurement report, and transmitting the beam measurement report using the resources for transmission of a beam measurement report on the candidate cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 7 illustrates a DL multi-beam operation according to embodiments of the present disclosure;

FIG. 8 illustrates a DL multi-beam operation according to embodiments of the present disclosure;

FIG. 9 illustrates an UL multi-beam operation according to embodiments of the present disclosure;

FIG. 10 illustrates an UL multi-beam operation according to embodiments of the present disclosure;

FIG. 19 illustrates an example where $M_D+N_U+M_j>1$, $K=M_D+N_U+M_j$ TCI state IDs are included in the channel conveying the beam indications cell switch to target or candidate cell according to embodiments of the present disclosure;

FIGS. 20A-20C illustrate examples for uplink beam management reference signals updated by beam indication or cell switch to a target or candidate cell according to embodiments of the present disclosure;

FIG. 22 illustrates an example where $M_D+N_U+M_j>1$, $K=M_D+N_U+M_j$ TCI state IDs are included in the channel conveying the beam indications or cell switch to a target or candidate cell according to embodiments of the present disclosure.

DETAILED DESCRIPTION

FIGS. 1 through 23, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-3B below describe various embodiments implemented in wireless communications systems and with the use of orthogonal frequency division multiplexing (OFDM) or orthogonal frequency division multiple access (OFDMA) communication techniques. The descriptions of FIGS. 1-3B are not meant to imply physical or architectural limitations to the manner in which different embodiments may be implemented. Different embodiments of the present disclosure may be implemented in any suitably arranged communications system.

Figure 1:
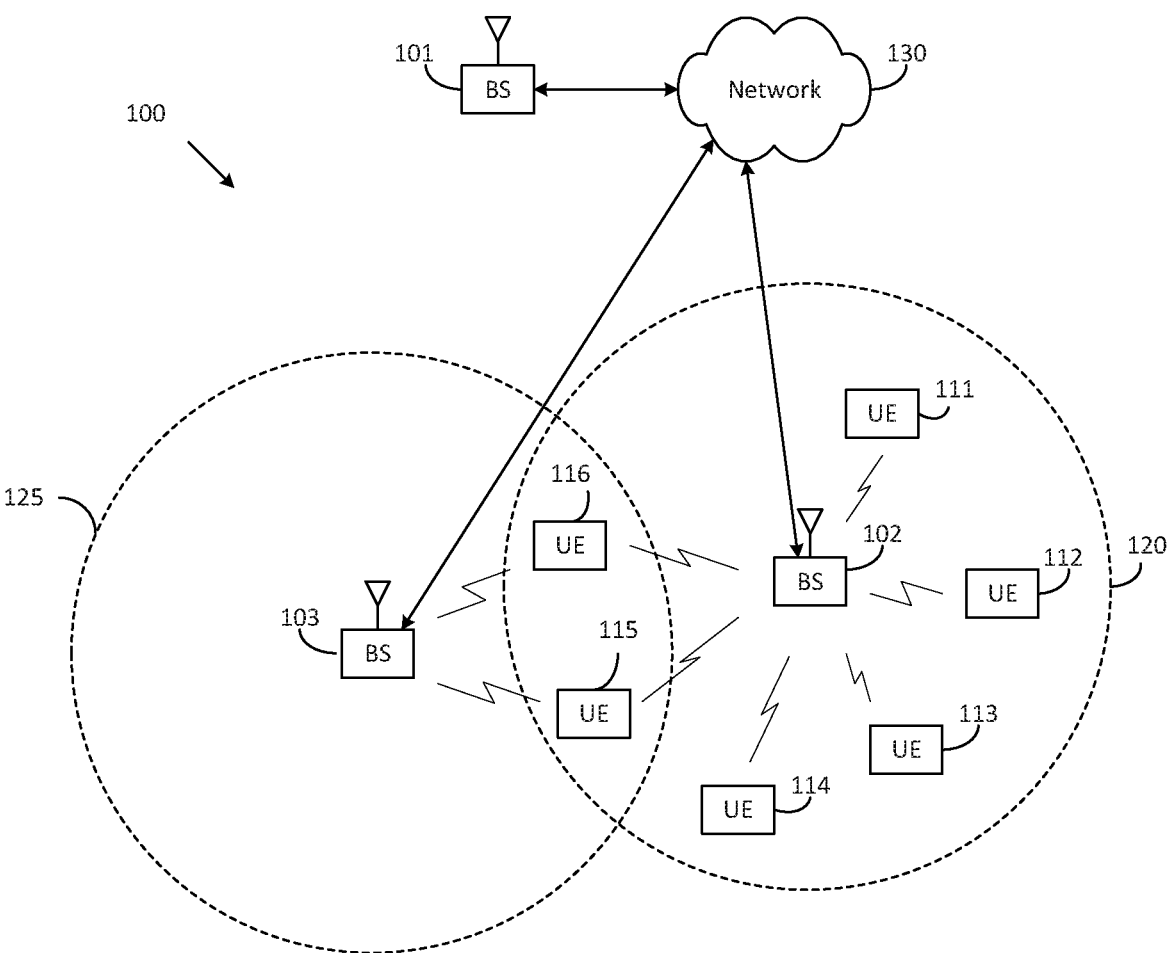
FIG. 1 illustrates an example wireless network according to embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for inter-cell beam measurement and reporting. In certain embodiments, one or more of the gNBs 101-103 includes circuitry, programing, or a combination thereof, to support inter-cell beam measurement and reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2A:
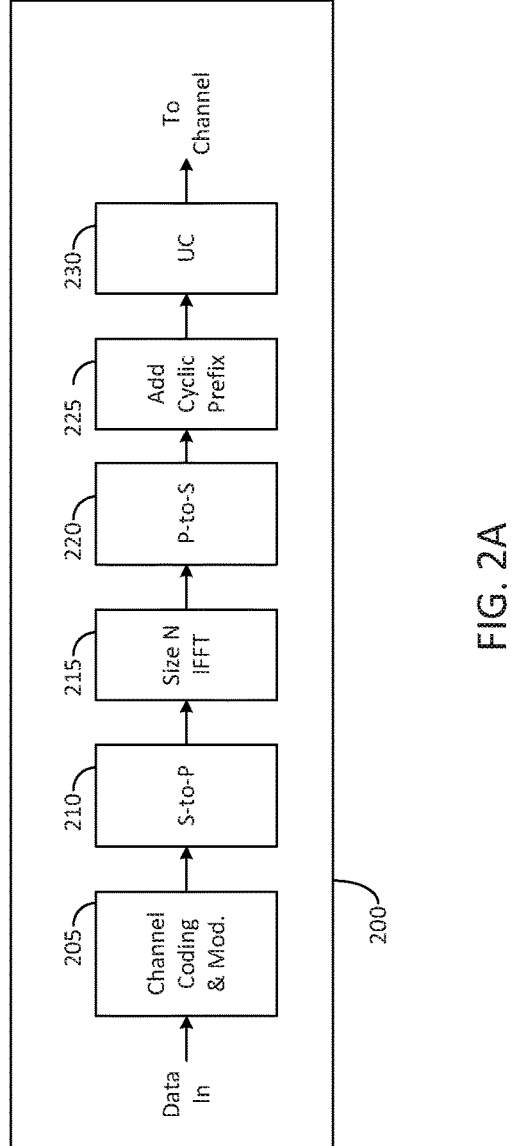
FIGS. 2A and 2B illustrate example wireless transmit and receive paths according to this disclosure.
Figure 2B:
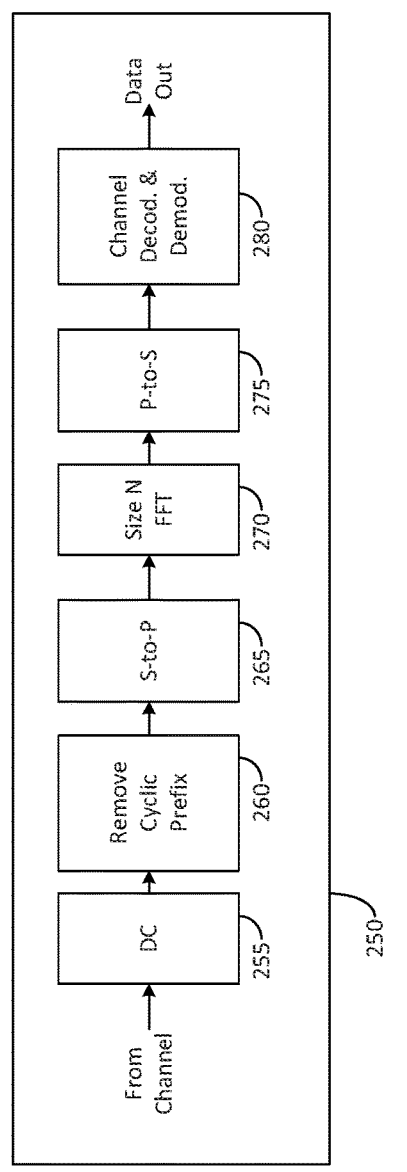

FIGS. 2A and 2B illustrate example wireless transmit and receive paths according to this disclosure. In the following description, a transmit path 200 may be described as being implemented in an gNB (such as gNB 102), while a receive path 250 may be described as being implemented in a UE (such as UE 116). However, it will be understood that the receive path 250 can be implemented in an gNB and that the transmit path 200 can be implemented in a UE. In some embodiments, the receive path 250 is configured to support inter-cell beam measurement and reporting as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
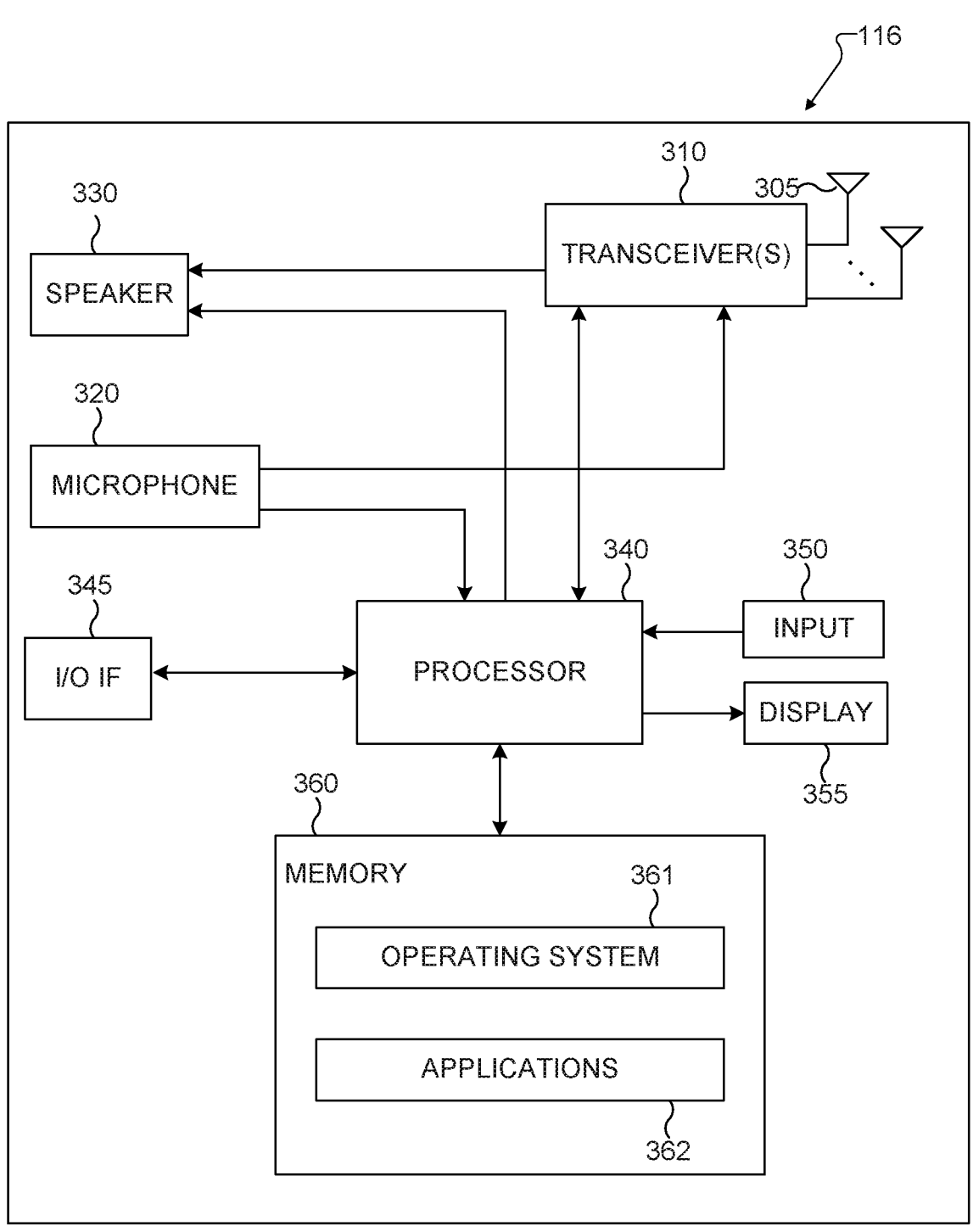
FIG. 3A illustrates an example UE according to embodiments of the present disclosure.

FIG. 3A illustrates an example UE 116 according to embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for inter-cell beam measurement and reporting as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3A illustrates the UE 116 configured as a mobile telephone or smartphone, UEs could be configured to operate as other types of mobile or stationary devices.

Figure 3B:
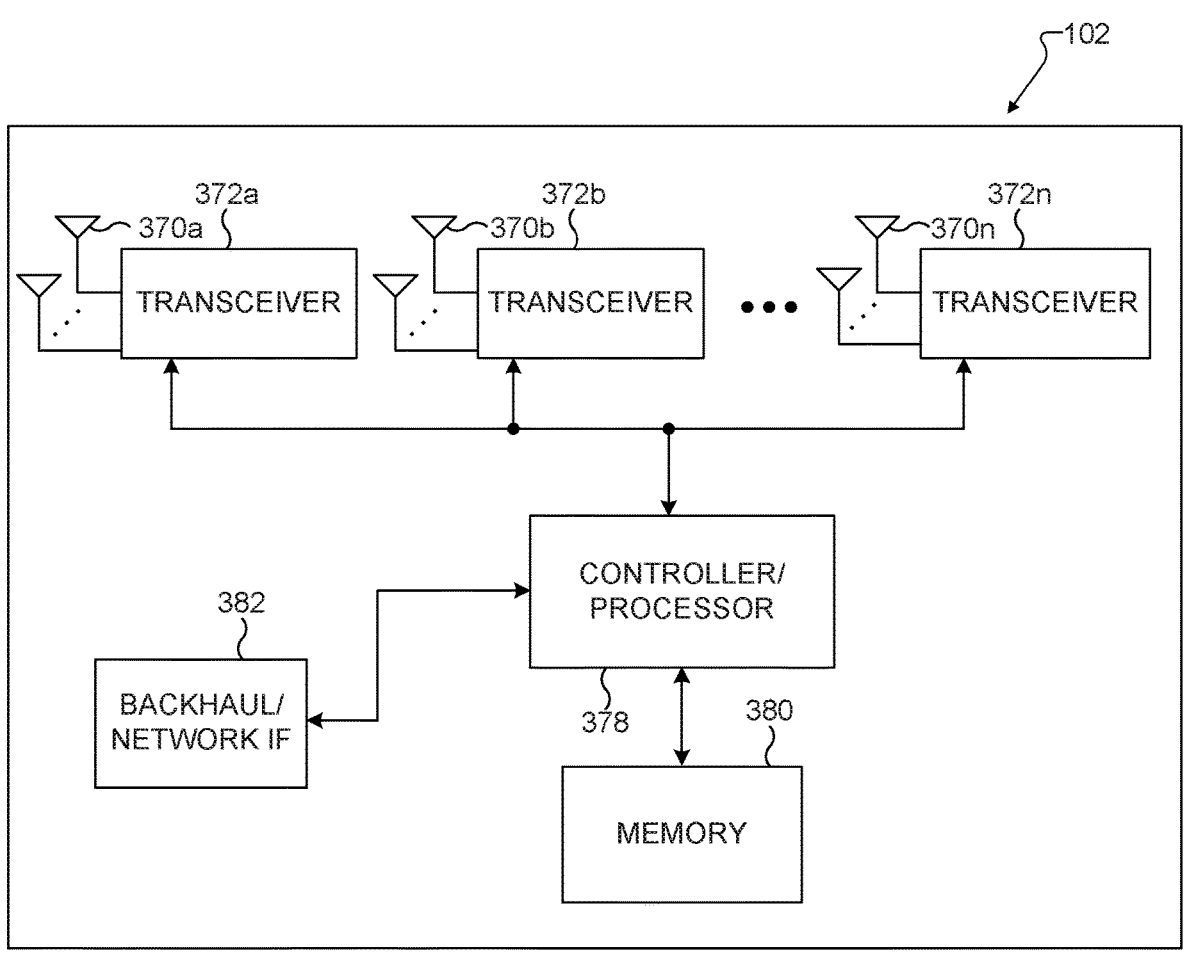
FIG. 3B illustrates an example gNB according to embodiments of the present disclosure.

FIG. 3B illustrates an example gNB 102 according to embodiments of the present disclosure. The embodiment of the gNB 102 illustrated in FIG. 3B is for illustration only, and the gNBs 101 and 103 of FIG. 1 could have the same or similar configuration. However, gNBs come in a wide variety of configurations, and FIG. 3B does not limit the scope of this disclosure to any particular implementation of a gNB.

As shown in FIG. 3B, the gNB 102 includes multiple antennas 370a-370n, multiple transceivers 372a-372n, a controller/processor 378, a memory 380, and a backhaul or network interface 382.

The transceivers 372a-372n receive, from the antennas 370a-370n, incoming RF signals, such as signals transmitted by UEs in the network 100. The transceivers 372a-372n down-convert the incoming RF signals to generate IF or baseband signals. The IF or baseband signals are processed by receive (RX) processing circuitry in the transceivers 372a-372n and/or controller/processor 378, which generates processed baseband signals by filtering, decoding, and/or digitizing the baseband or IF signals. The controller/processor 378 may further process the baseband signals.

Transmit (TX) processing circuitry in the transceivers 372a-372n and/or controller/processor 378 receives analog or digital data (such as voice data, web data, e-mail, or interactive video game data) from the controller/processor 378. The TX processing circuitry encodes, multiplexes, and/or digitizes the outgoing baseband data to generate processed baseband or IF signals. The transceivers 372a-372n up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of UL channel signals and the transmission of DL channel signals by the transceivers 372a-372n in accordance with well-known principles. The controller/processor 378 could support additional functions as well, such as more advanced wireless communication functions. For instance, the controller/processor 378 could support beam forming or directional routing operations in which outgoing/incoming signals from/to multiple antennas 370a-370n are weighted differently to effectively steer the outgoing signals in a desired direction. Any of a wide variety of other functions could be supported in the gNB 102 by the controller/processor 378.

The controller/processor 378 is also capable of executing programs and other processes resident in the memory 380, such as an OS and, for example, processes to support inter-cell beam measurement and reporting as discussed in greater detail below. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G/NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or transceiver.

The memory 380 is coupled to the controller/processor 378. Part of the memory 380 could include a RAM, and another part of the memory 380 could include a Flash memory or other ROM.

Although FIG. 3B illustrates one example of gNB 102, various changes may be made to FIG. 3B. For example, the gNB 102 could include any number of each component shown in FIG. 3B. Also, various components in FIG. 3B could be combined, further subdivided, or omitted and additional components could be added according to particular needs.

The following documents and standards descriptions are hereby incorporated into the present disclosure as if fully set forth herein:

[1] 3GPP TS 38.211 v17.6.0, "NR; Physical channels and modulation."

US 12,689,928 B2

11

[2] 3GPP TS 38.212 v17.6.0, "NR; Multiplexing and Channel coding."

[3] 3GPP TS 38.213 v17.7.0, "NR; Physical Layer Procedures for Control."

[4] 3GPP TS 38.214 v17.7.0, "NR; Physical Layer Procedures for Data."

[5] 3GPP TS 38.321 v17.6.0, "NR; Medium Access Control (MAC) protocol specification."

[6] 3GPP TS 38.331 v17.6.0, "NR; Radio Resource Control (RRC) Protocol Specification."

[7] 3GPP RP-213565, "Further NR Mobility Enhancements".

In this disclosure, a beam is determined by either of:

A TCI state, that establishes a quasi-colocation (QCL) relationship between a source reference signal (e.g., Synchronization Signal/Physical Broadcast Channel (PBCH) Block (SS/PBCH Block or SSB) and/or CSI-RS) and a target reference signal.

A spatial relation information that establishes an association to a source reference signal, such as SSB or CSI-RS or Sounding Reference Signal (SRS).

In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE, or a spatial Tx filter for transmission of downlink channels from the gNB or a spatial Rx filter for reception of uplink channels at the gNB.

Figure 4A:
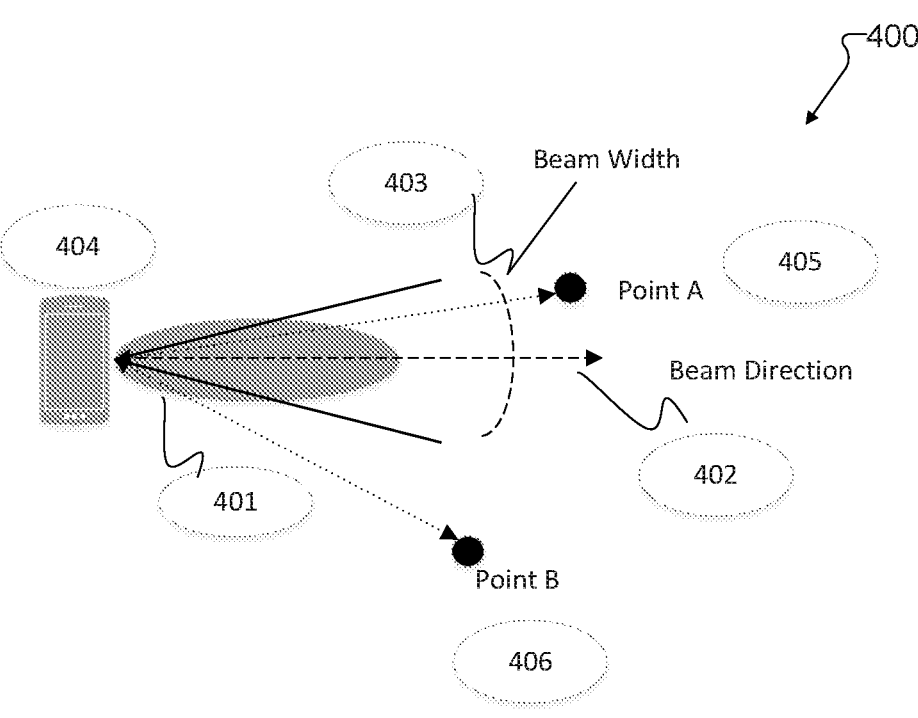
FIGS. 4A-4B illustrate examples and of beams according to embodiments of the present disclosure.
Figure 4B:
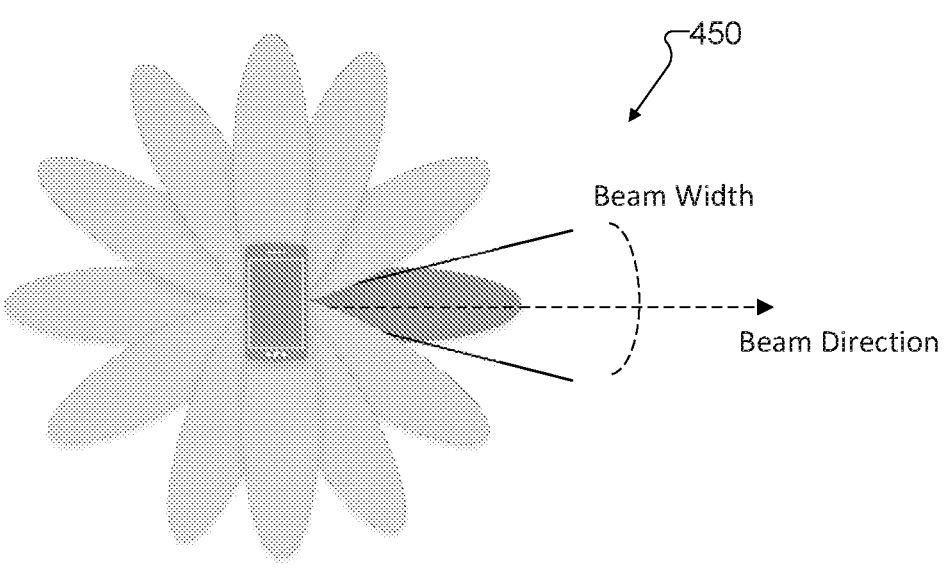

FIGS. 4A-4B illustrate examples 400 and 450 of beams according to embodiments of the present disclosure. The embodiments of beams of FIGS. 4A-4B are for illustration only. Different embodiments of beams could be used without departing from the scope of this disclosure.

As illustrated in FIG. 4A, in a wireless system a beam (401), for a device (404), can be characterized by a beam direction (402) and a beam width (403). For example, a device (404) transmits radio frequency (RF) energy in a beam direction and within a beam width. A device (404) receives RF energy in a beam direction and within a beam width. As illustrated in FIG. 4A, a device at point A (405) can receive from and transmit to device (404) as Point A is within a beam width and direction of a beam from device (404). As illustrated in FIG. 4A, a device at point B (406) cannot receive from and transmit to device (404) as Point B is outside a beam width and direction of a beam from device (404). While FIG. 4A, for illustrative purposes, shows a beam in 2-dimensions (2D), it should be apparent to those skilled in the art, that a beam can be in 3-dimensions (3D), where the beam direction and beam width are defined in space.

In a wireless system, a device can transmit and/or receive on multiple beams. This is known as "multi-beam operation" and is illustrated in FIG. 4B. While FIG. 4B, for illustrative purposes, a beam is in 2D, it should be apparent to those skilled in the art, that a beam can be 3D, where a beam can be transmitted to or received from any direction in space.

Although FIGS. 4A-4B illustrate examples 400 and 450 of beams, various changes may be made to FIGS. 4A-4B. For example, various changes to the beam width, the beam direction, the number of beams, etc. could be made according to particular needs.

Figure 5:
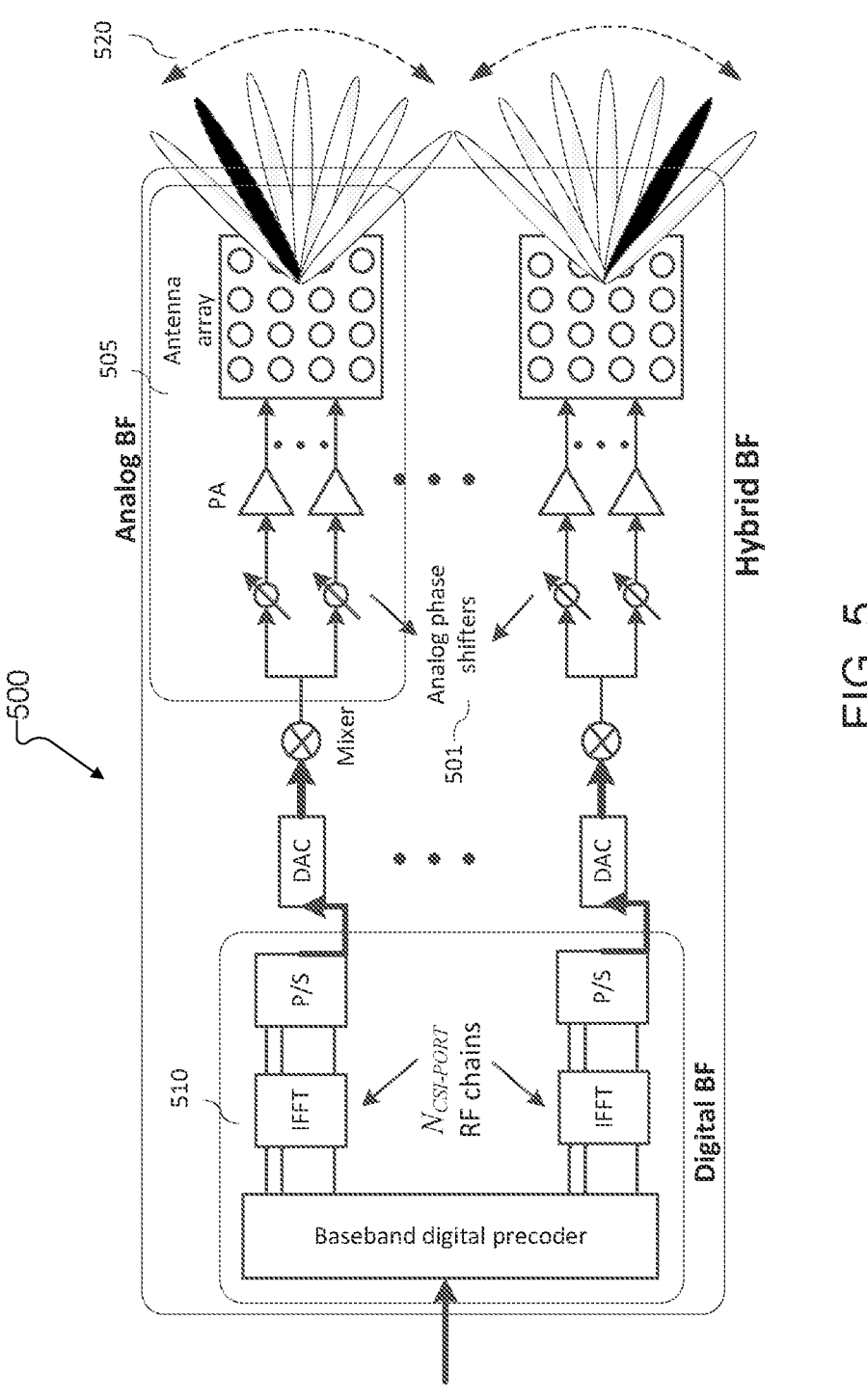
FIG. 5 illustrates example antenna blocks or arrays according to embodiments of the present disclosure.

FIG. 5 illustrates example antenna blocks or arrays 500 according to embodiments of the present disclosure. The embodiment of the antenna blocks or arrays 500 illustrated in FIG. 5 is for illustration only. Different embodiments of antenna blocks or arrays 500 could be used without departing from the scope of this disclosure.

Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of ADCs/DACs at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles (520) by varying the phase shifter bank across symbols or slots/subframes. The number of sub-arrays (equal to the number of RF chains) is same as the number of CSI-RS ports $N_{CSI-PORT}$. A digital beamforming unit 510 performs a linear combination across $N_{CSI\_PORT}$ analog beams to further increase a precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz. In this case, the system can employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Although FIG. 5 illustrates one example antenna blocks or arrays 500, various changes may be made to FIG. 5. For example, various components in FIG. 5 could be combined, further subdivided, or omitted and additional components could be added according to particular needs.

Rel-17 introduced the unified TCI framework, where a unified or master or main or indicated TCI state is signaled or indicated to the UE. The unified or master or main or indicated TCI state can be one of:

1. In case of joint TCI state indication, wherein a same beam is used for DL and UL channels, a joint TCI state that can be used at least for UE-dedicated DL channels and UE-dedicated UL channels.

2. In case of separate TCI state indication, wherein different beams are used for DL and UL channels, a DL TCI state that can be used at least for UE-dedicated DL channels.

3. In case of separate TCI state indication, wherein different beams are used for DL and UL channels, a UL TCI state that can be used at least for UE-dedicated UL channels.

The unified (master or main or indicated) TCI state is a DL or a Joint TCI state of UE-dedicated reception on PDSCH/PDCCH and the CSI-RS applying the indicated TCI state, wherein the TCI state provides a reference signal for the quasi co-location for DM-RS of PDSCH and DM-RS of PDCCH in a CC and CSI-RS when following the unified TCI state and/or an UL or a Joint TCI state for dynamic-grant/configured-grant based PUSCH, PUCCH, and SRS applying the indicated TCI state, wherein the TCI state provides UL TX spatial filter for dynamic-grant and config-ured-grant based PUSCH and PUCCH resource in a CC, and SRS when following the unified TCI state.

The unified TCI framework applies to intra-cell beam management, wherein, the TCI states have a source RS that is directly or indirectly associated, through a quasi-co-location relation, e.g., spatial relation, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi-co-location relation, e.g., spatial relation, with an SSB of cell that has a physical cell identity (PCI) different from the PCI of the serving cell (e.g., the TCI state is associated with a TRP of a cell having a PCI different from the PCI of the serving cell). In Rel-17, UE-dedicated chan-nels can be received and/or transmitted using a TCI state associated with a cell having a PCI different from the PCI of the serving cell. While the common channels can be received and/or transmitted using a TCI state associated with the serving cell (e.g., not associated with a cell having a PCI different from the PCI of the serving cell). Common chan-nels can include:

Channels carrying system information (e.g., SIB) with a DL assignment carried by a DCI in PDCCH having a CRC scrambled by SI-RNTI and transmitted in Type0-PDCCH CSS set.

Channels carrying other system information with a DL assignment carried by a DCI in PDCCH having a CRC scrambled by SI-RNTI and transmitted in Type0A-PDCCH CSS set.

Channels carrying paging or short messages with a DL assignment carried by a DCI in PDCCH having a CRC scrambled by P-RNTI and transmitted in Type2-PDCCH CSS set.

Channels carrying RACH related channels with a DL assignment or UL grant carried by a DCI in PDCCH having a CRC scrambled by RA-RNTI or TC-RNTI and transmitted in Type1-PDCCH CSS set.

A DL-related DCI Format (e.g., DCI Format 1_1 or DCI Format 1_2), with or without DL assignment, can indicate to a UE through a field "transmission configuration indication" a TCI state code point, wherein, the TCI state codepoint can be one of (1) a DL TCI state; (2) an UL TCI state; (3) a joint TCI state; or (4) a pair of DL TCI state and UL TCI state. TCI state code points are activated by MAC CE signaling.

Quasi-co-location (QCL) relation, can be quasi-location with respect to one or more of the following relations [38.214—section 5.1.5]:

Type A, {Doppler shift, Doppler spread, average delay, delay spread}

Type B, {Doppler shift, Doppler spread}

Type C, {Doppler shift, average delay}

Type D, {Spatial Rx parameter}

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL trans-missions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

In Rel-18, a new work item [7] has been agreed to further enhance mobility in NR. "When the UE moves from the coverage area of one cell (e.g., serving cell) to another cell (e.g., candidate cell or target cell), at some point a serving cell change needs to be performed. Currently serving cell change is triggered by L3 measurements and is done by RRC signaling triggered Reconfiguration with Synchronization for change of PCell and PSCell, as well as release add for SCells when applicable. All cases involve complete L2 (and L1) resets, leading to longer latency, larger overhead and longer interruption time than beam switch mobility. The goal of L1/L2 mobility enhancements is to enable a serving cell change via L1/L2 signaling, in order to reduce the latency, overhead and interruption time" [7]. Allowing, the serving cell to be changed seamlessly using L1/L2 mechanisms reduces handover latency, and leads to more robust opera-tion (less dropped calls). In this disclosure, we look at mechanisms for handover triggered by beam switching from the beam of one cell to the beam of another cell.

Figure 6:
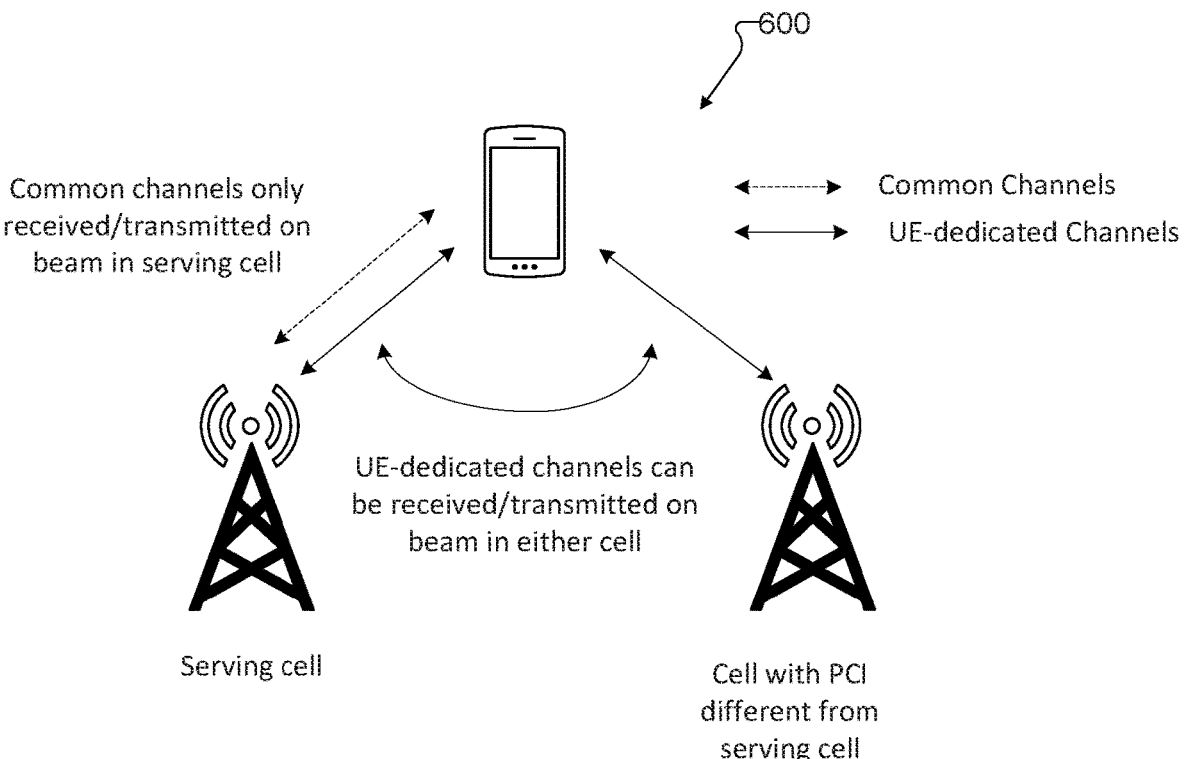
FIG. 6 illustrates an example of inter-cell beam management according to embodiments of the present disclosure.
Figures 11A, 11B, 11C, 11D, 11E:
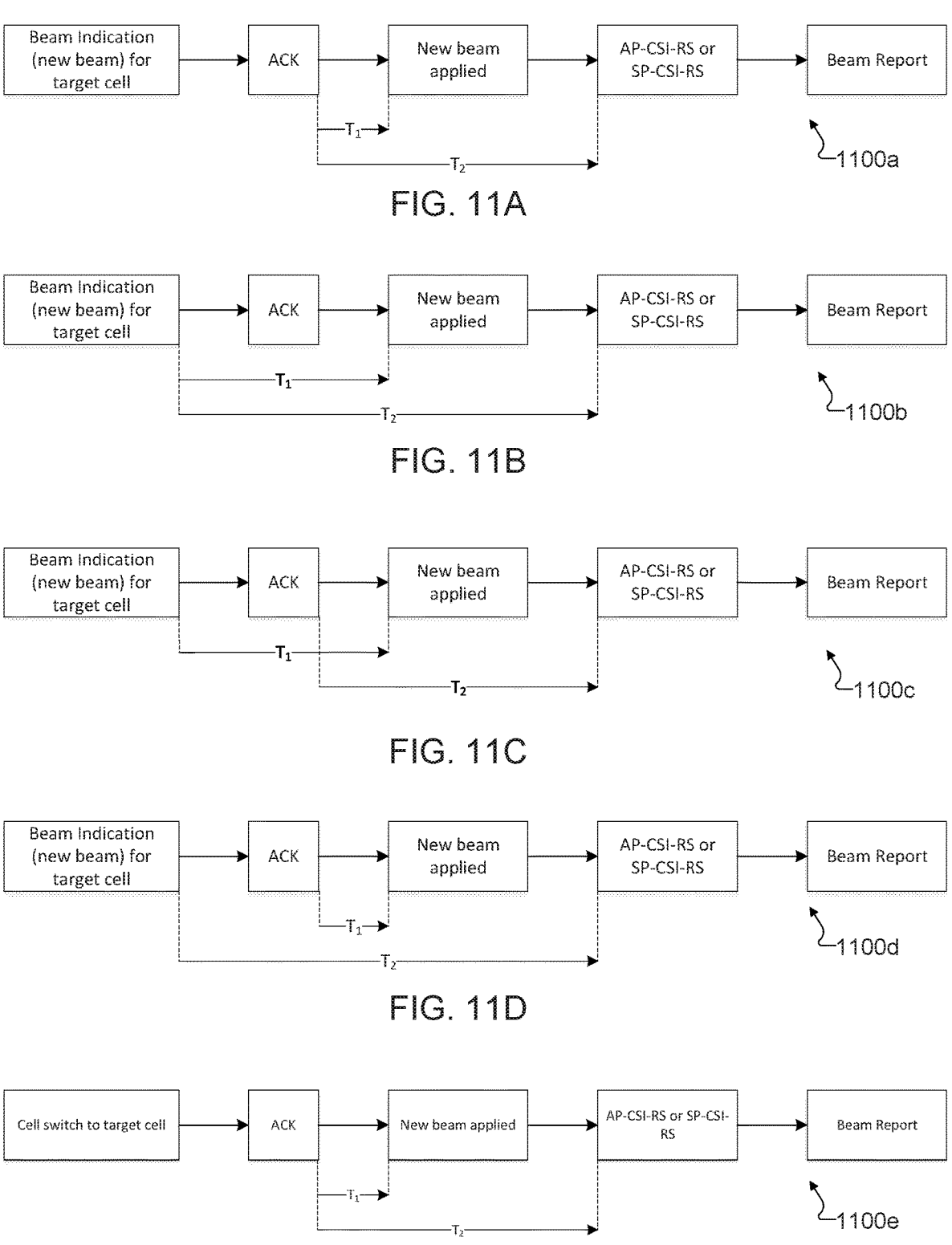
FIGS. 11A-11L illustrate examples for downlink beam measurement and beam reporting triggered by beam indication or cell switch to a target or candidate cell according to embodiments of the present disclosure.
Figures 11F, 11G, 11H, 11I:
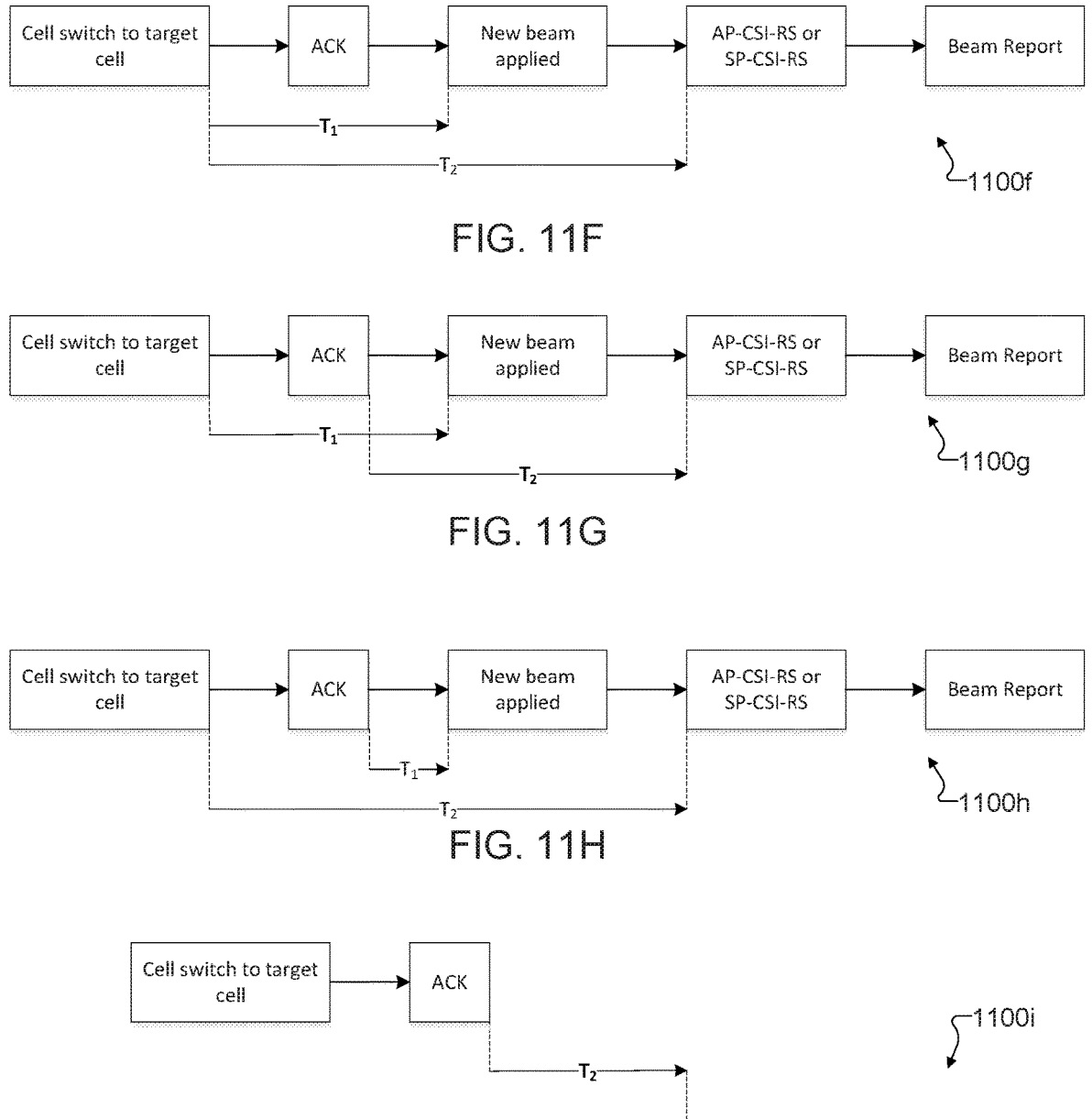
Figure 11J:
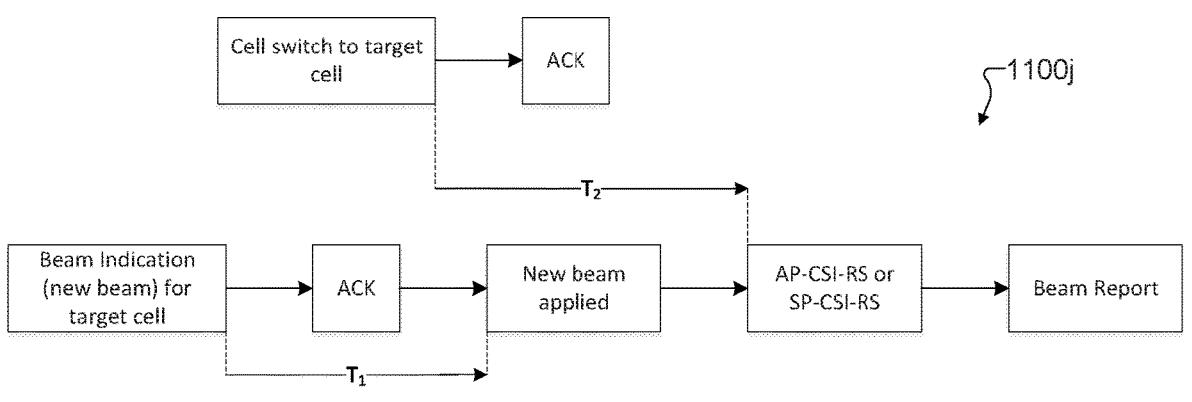
Figure 11K:
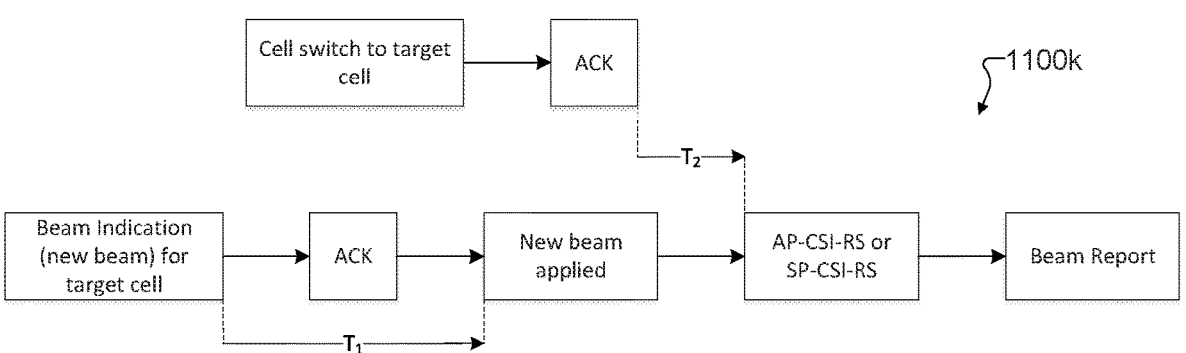
Figure 11L:
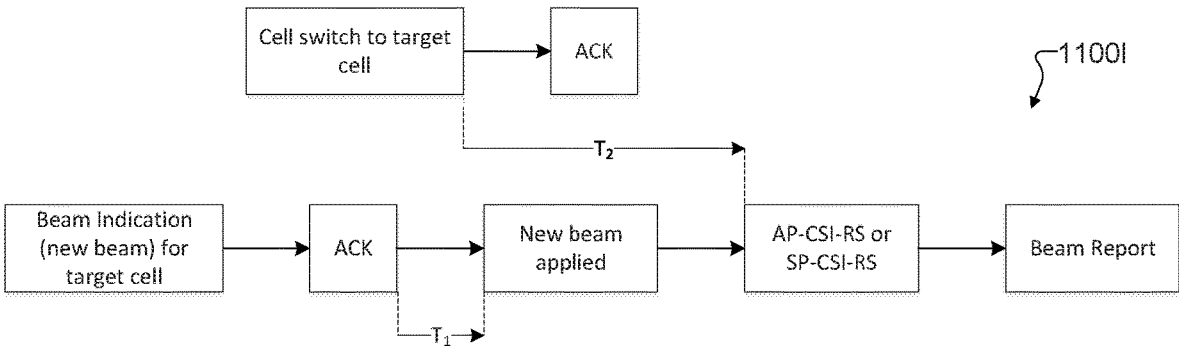
Figure 12A:
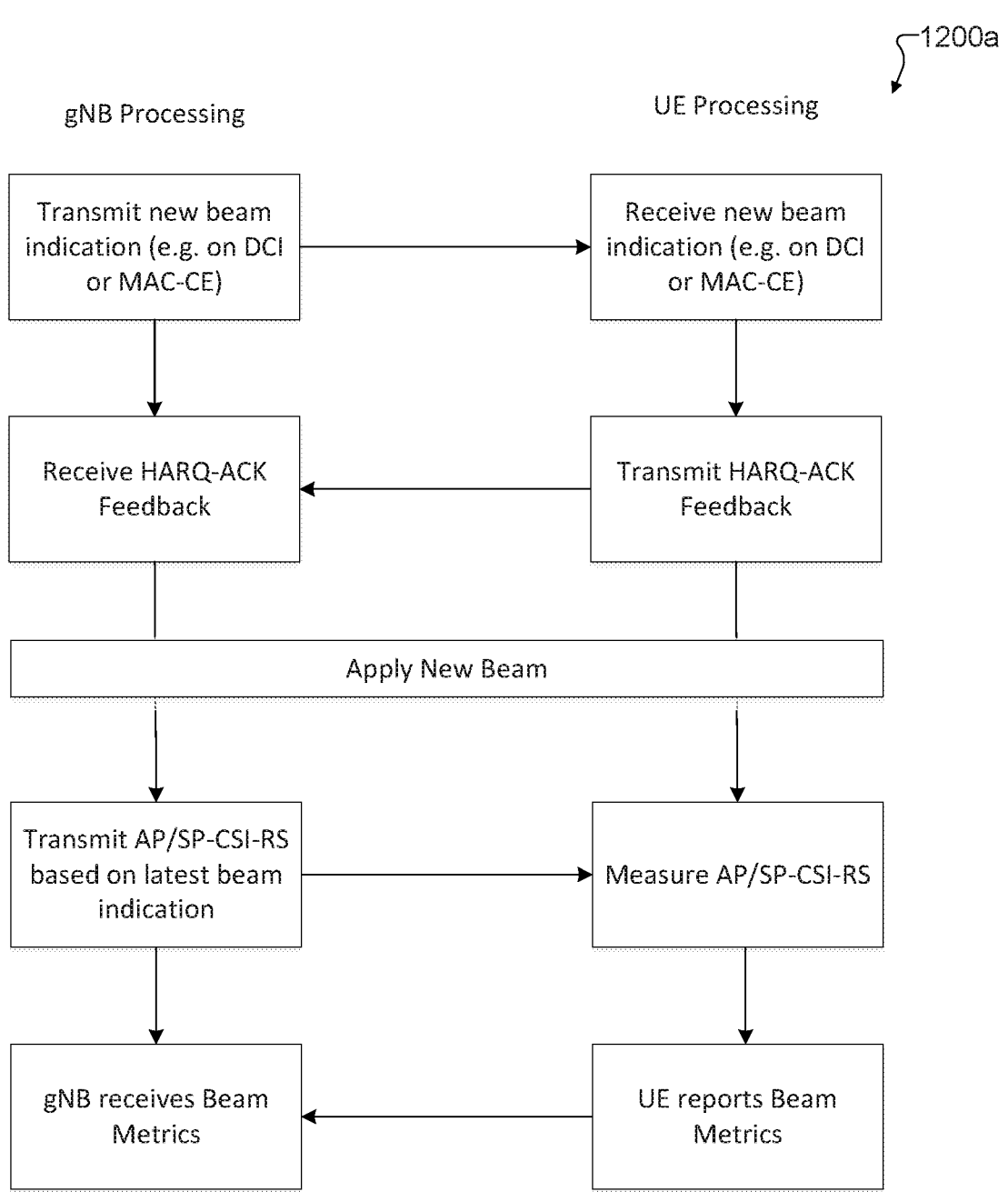
FIGS. 12A-12C illustrate examples for downlink beam measurement and beam reporting triggered by beam indication or cell switch to a target or candidate cell according to embodiments of the present disclosure.
Figure 12B:
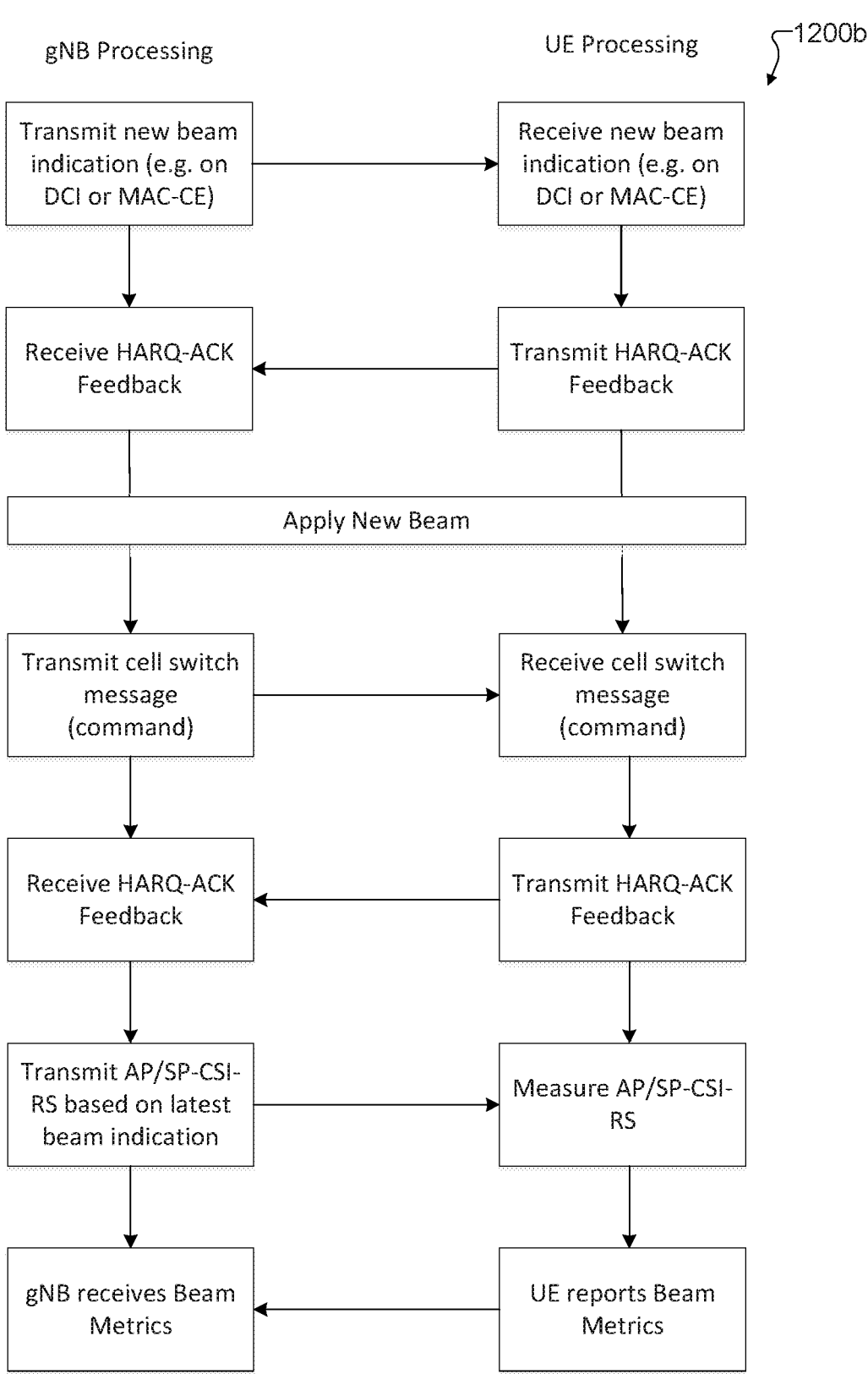
Figure 12C:
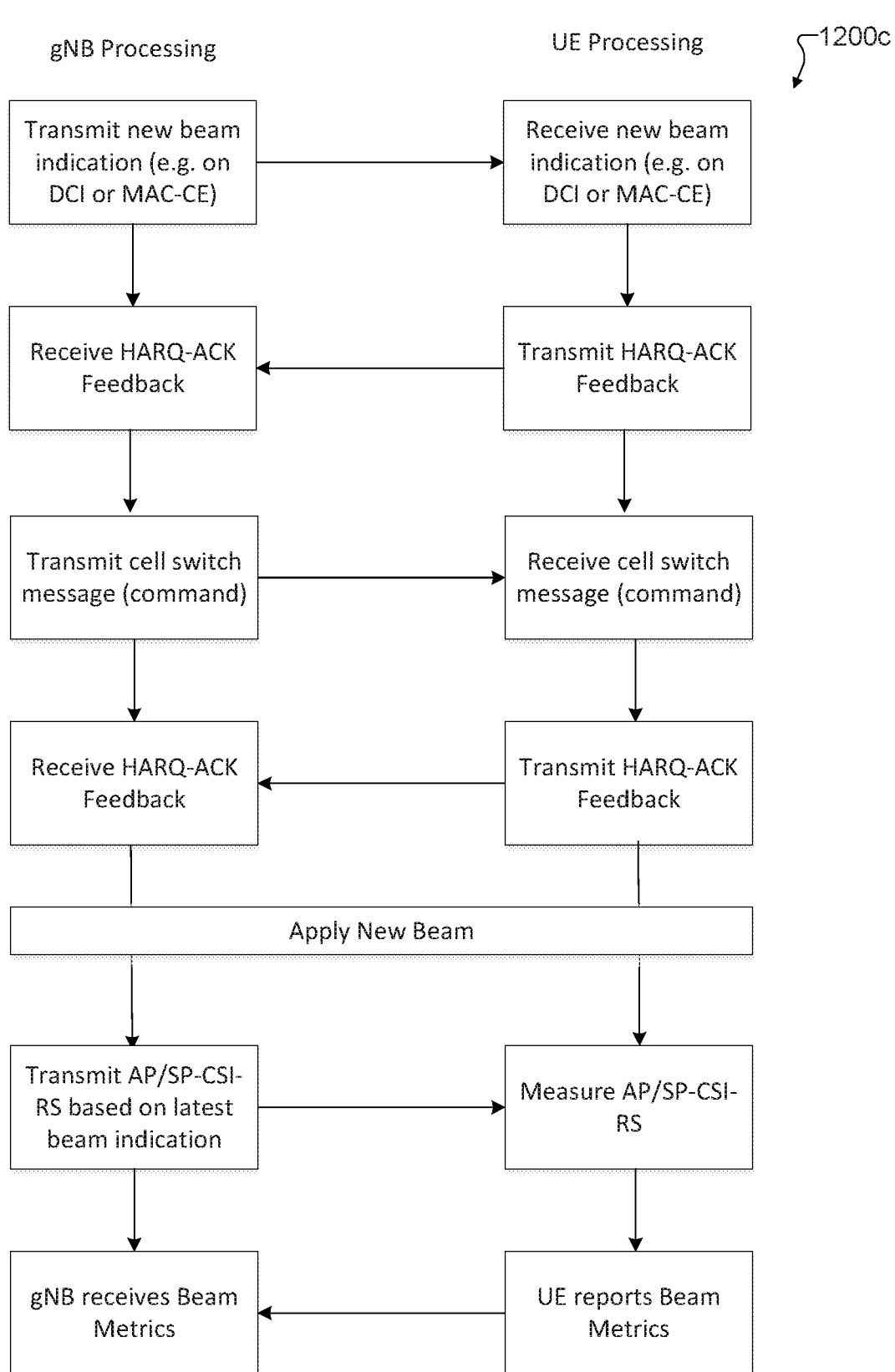

In Rel-17, a unified TCI state framework has been intro-duced to streamline the beam management procedures by reducing latency and overhead associated with beam change. Rel-17 also introduced inter-cell beam management, wherein at least UE dedicated channels can be received on a beam associated with a TRP associated with a PCI different from the PCI of the serving cell. In Rel-17, when a beam changes from the TRP of serving cell, to a TRP of a cell with PCI different from that of the serving cell, the serving cell is not changed, as illustrated in FIG. 6. Common channels, continue to be received and transmitted on beam associated with a serving cell.

FIG. 6 illustrates an example 600 of inter-cell beam management (e.g., for communication with a cell having a PCI different from the PCI of the serving cell) according to embodiments of the present disclosure. The embodiment of inter-cell beam management of FIG. 6 is for illustration only. Different embodiments of inter-cell beam management could be used without departing from the scope of this disclosure.

Although FIG. 6 illustrates an example 600 of inter-cell beam management, various changes may be made to FIG. 6. For example, various changes to the cells, the channels, the beams, etc. could be made according to particular needs.

To reduce latency during handover, it is important to have accurate and reliable measurements from the target cell as soon as possible, to find a gNB-UE beam pair when switch-ing to the target serving cell or shortly thereafter. Identifying and indicating new beams with high accuracy and low latency is of paramount importance to enhancing the overall system performance and robustness. Two key components of beam management are beam refinement and beam tracking. Beam refinement includes refining the resolution of the spatial filters from coarse to fine to enhance antenna gain and provide higher throughput and/or better coverage. Beam tracking involves adapting the transmit and receive spatial filters to a time-varying channel. Beam refinement and beam tracking includes:

Beam measurement on a reference signal associated with a beam, e.g., a fine beam(s) within a coarse beam, or a spatial adjacent beam(s) in response to mobility.

Beam reporting, e.g., reporting a beam metric such as L1-RSRP or L1 SINR on an uplink control channel.

Beam indication.

Before the cell switch command, while the UE is in the original serving cell, it performs measurements to find a candidate or target cell, the UE can switch to. The measurements performed have coarse time and spatial granularity and generally provide a first order estimate of the beam to use in the candidate or target cell after cell switch. After the cell switch command is received by the UE, a more refined measurement can be triggered based on the TCI state indicated in the cell switch command.

In the present disclosure, design and signaling aspects that allow the configuration of measurement RS and measurement reports triggered by indication of a TCI state of a candidate or target cell or by a cell switch command or message to switch to the target (or candidate) cell are considered.

The reporting metric for the beam measurement report that can trigger cell switch or handover is also considered.

In the present disclosure, both FDD and TDD are considered as a duplex method for DL and UL signaling.

Although exemplary descriptions and embodiments within the present disclosure assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure considers several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS, or can be configured with a certain time-domain behavior, such as a periodicity and offset in case of periodic RS, or can be a combination of such configuration and activation/deactivation in case of semi-persistent RS.

For mmWave bands (or FR2) or for higher frequency bands (such as >52.6 GHz) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as a SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping", and determine all TX-RX beam pairs associated with all the UL RSs configured to the UE to transmit.

Examples of DL multi-beam operations that utilize DL-TCI-state based DL beam indication are provided below. In a first example embodiment, an aperiodic CSI-RS is transmitted by the NW/gNB and received/measured by the UE. This embodiment can be used regardless of whether or not there is UL-DL beam correspondence. In a second example embodiment, an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 7 illustrates a DL multi-beam operation 700 according to embodiments of the present disclosure. The embodiment of a DL multi-beam operation 700 of FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of a DL multi-beam operation 700 could be used without departing from the scope of this disclosure.

In the example of FIG. 7, a DL multi-beam operation 700 starts with the gNB/NW signaling to a UE an aperiodic CSI-RS (AP-CSI-RS) trigger or indication (step 701). This trigger or indication can be included in a DCI and indicate transmission of AP-CSI-RS in a same (zero time offset) or in a later slot/sub-frame (>0 time offset). For example, the DCI can be related to scheduling of a DL reception, or an UL transmission and the CSI-RS trigger can be either jointly or separately coded with a CSI report trigger. Upon receiving the AP-CSI-RS transmitted by the gNB/NW (step 702), the UE measures the AP-CSI-RS and calculates and reports a "beam metric" that indicates a quality of a particular TX beam hypothesis (step 703). Examples of such beam reporting are a CSI-RS resource indicator (CRI), or a SSB resource indicator (SSB-RI), coupled with an associated L1-RS RP/L1-RSRQ/L1-SINR/CQI.

Upon receiving the beam report from the UE, the gNB/NW can use the beam report to select a DL RX beam for the UE and indicate the DL RX beam selection (step 704) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 705).

Alternatively, the gNB/NW can use the beam report to select a DL RX beam for the UE and indicate to the UE the selected DL RX beam (step 704) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 705).

In the example of FIG. 7, as described above, the UE selects a DL RX beam using an index of a reference RS, such as a AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Although FIG. 7 illustrates an example of a DL multi-beam operation 700, various changes may be made to FIG. 7. For example, while shown as a series of steps, various steps in FIG. 7 could overlap, occur in parallel, occur in a different order, or occur any number of times.

FIG. 8 illustrates a DL multi-beam operation 800 according to embodiments of the present disclosure. The embodiment of a DL multi-beam operation 800 of FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of a DL multi-beam operation 800 could be used without departing from the scope of this disclosure.

In the example of FIG. 8, a DL multi-beam operation 800 starts with the gNB/NW signaling to a UE an aperiodic SRS (AP-SRS) trigger or request (step 801). This trigger can be included in a DCI format such as for example a DCI format scheduling a PDSCH reception or a PUSCH transmission. Upon receiving and decoding the DCI format with the AP-SRS trigger (step 802), the UE transmits a SRS (AP-SRS) to the gNB/NW (step 803) so that the NW (or gNB) can measure the UL propagation channel and select a DL RX beam for the UE for DL (at least when there is beam correspondence).

The gNB/NW can then indicate the DL RX beam selection (step 804) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 805).

Alternatively, the gNB/NW can indicate the DL RX beam selection (step 804) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 805).

In the example of FIG. 8, as described above, the UE selects the DL RX beam based on the UL TX beam associated with the reference RS (AP-SRS) index signaled via the TCI-state field.

Although FIG. 8 illustrates an example of a DL multi-beam operation 800, various changes may be made to FIG. 8. For example, while shown as a series of steps, various steps in FIG. 8 could overlap, occur in parallel, occur in a different order, or occur any number of times.

Similar, for UL multi-beam operation, the gNB selects an UL RX beam for every UL TX beam that corresponds to a reference RS. Therefore, when an UL RS, such as a SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping", and determine all the TX-RX beam pairs associated with all the reference RSs configured to the UE. Conversely, when a DL RS, such as a CSI-RS and/or a SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

Examples of UL multi-beam operations that utilize TCI-based UL beam indication after the network (NW) receives a transmission from the UE are provided below. In a first example embodiment, a NW transmits an aperiodic CSI-RS, and a UE receives and measures the CSI-RS. This embodiment can be used, for instance, at least when there is reciprocity between the UL and DL beam-pair-link (BPL). This condition is termed "UL-DL beam correspondence." In a second example embodiment, the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

FIG. 9 illustrates an UL multi-beam operation 900 according to embodiments of the present disclosure. The embodiment of a DL multi-beam operation 900 of FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments of a DL multi-beam operation 900 could be used without departing from the scope of this disclosure.

In the example of FIG. 9, an UL multi-beam operation 900 starts with the gNB/NW signaling to a UE an aperiodic CSI-RS (AP-CSI-RS) trigger or indication (step 901). This trigger or indication can be included in a DCI format, such as a DCI format scheduling a PDSCH reception to the UE or a PUSCH transmission from the UE and can be either separately or jointly signaled with an aperiodic CSI request/ trigger, and indicate transmission of AP-CSI-RS in a same slot (zero time offset) or in a later slot/sub-frame (>0 time offset). Upon receiving the AP-CSI-RS transmitted by the gNB/NW (step 902), the UE measures the AP-CSI-RS and, in turn, calculates and reports a "beam metric" (indicating quality of a particular TX beam hypothesis) (step 903). Examples of such beam reporting are CSI-RS resource indicator (CRI) or SSB resource indicator (SSB-RI) together with an associated L1-RSRP/L1-RSRQ/L1-SINR/CQI.

Upon receiving the beam report from the UE, the gNB/ NW can use the beam report to select an UL TX beam for the UE and indicate the UL TX beam selection (step 904) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 905).

Alternatively, the gNB/NW can use the beam report to select an UL TX beam for the UE and indicate the UL TX beam selection (step 904) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 905).

In the example of FIG. 9, as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/ L1-RSRP or L1-SINR.

Although FIG. 9 illustrates an example of a UL multi-beam operation 900, various changes may be made to FIG. 9. For example, while shown as a series of steps, various steps in FIG. 9 could overlap, occur in parallel, occur in a different order, or occur any number of times.

FIG. 10 illustrates an UL multi-beam operation 1000 according to embodiments of the present disclosure. The embodiment of a DL multi-beam operation 1000 of FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of a DL multi-beam operation 1000 could be used without departing from the scope of this disclosure.

In the example of FIG. 10, an UL multi-beam operation 1000 starts with the gNB/NW signaling to a UE an aperiodic SRS (AP-SRS) trigger or request (step 1001). This trigger can be included in a DCI format, such as a DCI format scheduling a PDSCH reception or a PUSCH transmission. Upon receiving and decoding the DCI format with the AP-SRS trigger (step 1002), the UE transmits AP-SRS to the gNB/NW (step 1003) so that the NW (or gNB) can measure the UL propagation channel and select an UL TX beam for the UE.

The gNB/NW can then indicate the UL TX beam selection (step 1004) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1005).

Alternatively, a gNB/NW can indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1005).

In the example of FIG. 10, as described above, the UE selects the UL TX beam from the reference RS (in this case SRS) index signaled via the value of the TCI-state field.

Although FIG. 10 illustrates an example of a UL multi-beam operation 1000, various changes may be made to FIG. 10. For example, while shown as a series of steps, various steps in FIG. 10 could overlap, occur in parallel, occur in a different order, or occur any number of times.

In the present disclosure, a TCI state is used for beam indication. TCI state can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

In the following examples, CSI-RS can refer to non-zero power (NZP) CSI-RS.

In the following examples, a cell switch command or a dynamic cell switch command is a message that switches the serving cell from a source cell or a source serving cell to a target cell or a target serving cell or a candidate cell. The cell switch command can be a DCI Format and/or a MAC CE signal. In some examples, the cell switch signal includes an indicated TCI state for the target serving cell or candidate cell. In another example, the cell switch signal is distinct from the signal used to indicate TCI states for the target serving cell or candidate cell. In the following examples, cell switch command or message can refer to the channel conveying the cell switch command or message.

The network can indicate a TCI state (or spatial relation information) through DL control signaling (i.e., Downlink Control Information (DCI)) and/or through L2 signaling (e.g., MAC CE). The TCI state can provide association with a reference signal (e.g., CSI-RS or SSB or SRS) with a QCL-TypeD or spatial relation, establishing an association with a spatial filter. The TCI state can be for a target cell or a target serving cell or a candidate cell. A UE can be configured a set of TCI state for the target cell or the target serving cell or the candidate cell. In one example, the TCI state is associated with a reference signal (e.g., SSB or CSI-RS) of a target serving cell or candidate cell, wherein the reference signal is a source RS for the TCI state of QCL Type D or a spatial reference signal for the TCI state, associated with a coarse spatial filter. In another example, the TCI state is associated with a reference signal (e.g., SRS) to a target serving cell or candidate cell, wherein the reference signal is a spatial reference signal for the TCI state, and the source RS of the reference signal is a DL reference signal (e.g., SSB or CSI-RS) of target serving cell or candidate cell. A UE can be configured a set of reference signals for measurement (e.g., CSI-RS and/or SSB and/or SRS) for the target cell or the target serving cell or the candidate cell. A TCI-state and/or a QCL-TypeD reference RS associated with the TCI-State and/or a source reference RS associated with the TCI state can be mapped or linked or associated (e.g., by configuration) to a set S, wherein, S can be a set of CSI-RS resource(s) and/or a set of CSI-RS resource set(s) and/or SSB resource(s) and/or SSB resource set(s) and/or SRS resource(s) and/or SRS resource set(s) associated with the target serving cell or candidate cell.

The new (most recently updated) TCI state indication of a target serving cell or candidate cell triggers the aperiodic (AP)-CSI-RS and/or semi-persistent (SP)-CSI-RS and/or AP-SRS and/or SP-SRS for downlink beam measurement and beam reporting, wherein the CSI-RS resources or the CSI-RS resource sets associated with the AP-CSI-RS and/or SP-CSI-RS and/or AP-SRS and/or SP-SRS are those mapped or linked or associated (e.g., by configuration) to the new TCI state (i.e., set S). The measurement report includes one or more pairs of a resource indicator (e.g., CRI) and a corresponding beam metric measured on the resource indicator such as L1-RSRP/L1-RSRQ/L1-SINR/CQI.

In one embodiment, the UE assumes that the aforementioned RS (AP-CSI-RS and/or SP-CSI-RS and/or AP-SRS and/or SP-SRS) is (or, for SP, starts to be) transmitted concurrently with the beam indication and/or cell switch after a timing offset T_OFFSET. Some example values of T_OFFSET include 0 (no offset) and n>0 OFDM symbol(s). The transmission of the RS can be assumed without an additional triggering from the NW (e.g., via the CSI request field in a channel conveying a beam indication (e.g., a TCI state) such as a purpose designed DCI format for beam indication, and/or UL-related DCI and/or DL-related DCI and/or MAC CE). That is, the UE assumes that the RS is received T_OFFSET after the reception of the beam indication and/or cell switch command or message. In one sub-embodiment, an RS trigger parameter is included in the beam indication together with the TCI state update. In one sub-embodiment, an RS trigger parameter is included in the cell switch message. The RS trigger parameter can include some information on the RS such as a resource or resource set index/indices associated with the RS. In another sub-embodiment, a parameter indicating the T_OFFSET is included in the beam indication together with the TCI state update. In another sub-embodiment, a parameter indicating the T_OFFSET is included in the cell switch message. The set of possible values of T_OFFSET can be configured via higher-layer (e.g., RRC) signaling and/or MAC CE signaling. The T_OFFSET signaled together with the TCI state update indicates a value taken from the set. In another sub-embodiment, both the RS trigger parameter and the T_OFFSET parameter are included in the beam indication together with the TCI state update. In another sub-embodiment, both the RS trigger parameter and the T_OFFSET parameter are included in the cell switch message. In another sub-embodiment, the beam indication or the cell switch message do not include the RS trigger parameter or the T_OFFSET parameter. In this case, at least one of the RS resource or resource set indices or the T_OFFSET parameter is configured via higher-layer (e.g., RRC) signaling or MAC CE. Therefore, the TCI state update or cell switch command or message itself functions as the trigger for the RS with a pre-configured resource or resource set information and/or T_OFFSET value, if applicable. In one example T_OFFSET can depend on a UE capability.

In another embodiment, the UE assumes that the afore-mentioned RS (AP-CSI-RS and/or SP-CSI-RS and/or AP-SRS and/or SP-SRS) is (or, for SP, starts to be) transmitted after an additional (subsequent) triggering from the NW (e.g., via the CSI request field in UL-related and/or DL-related DCI and/or MAC CE) is received analogous to the regular procedure for the reception of aperiodic or semi-persistent RS. That is, after receiving the beam indication, the UE will await the reception of another CSI-RS/SRS triggering (e.g., via the CSI request field in UL-related DCI and/or DL-related DCI and/or MAC CE) before receiving the associated RS.

In another embodiment, the UE assumes that the afore-mentioned RS (AP-CSI-RS and/or SP-CSI-RS and/or AP-SRS and/or SP-SRS) is (or, for SP, starts to be) is transmitted after a cell switch command or message to change the serving cell from the source serving cell to the target serving cell or candidate cell. That is, after receiving the beam indication for target cell or candidate cell, if applicable, the UE will await the reception of a cell switch command before receiving the associated RS. The aforementioned T_OFF-SET can be from the cell switch command.

In another embodiment, the UE assumes that the afore-mentioned RS (AP-CSI-RS and/or SP-CSI-RS and/or AP-SRS and/or SP-SRS) is (or, for SP, starts to be) transmitted after an additional (subsequent) triggering from the NW (e.g., via the CSI request field in UL-related and/or DL-related DCI and/or MAC CE) is received analogous to the regular procedure for the reception of aperiodic or semi-persistent RS. The additional triggering is transmitted after a cell switch command or message. That is, after receiving the cell switch command or message, the UE will await the reception of another CSI-RS/SRS triggering (e.g., via the CSI request field in UL-related DCI and/or DL-related DCI and/or MAC CE) before receiving the associated RS.

In one embodiment, the UE performs measurements for CSI and beam measurements on the aforementioned RS (AP-CSI-RS and/or SP-CSI-RS). The CSI/beam report can be explicitly or implicitly triggered by the TCI state indi-cation without additional triggering from the network (e.g., via the CSI request field in a channel conveying a beam indication (e.g., a TCI state) such as a purposed designed DCI format for beam indication, and/or UL-related DCI and/or DL-related DCI and/or MAC CE). That is the UE transmits the CSI/beam report T_OFFSET after the recep-tion of the beam indication, alternatively, the UE transmits the CSI/beam report T_OFFSET after the reception of the corresponding RS. In one sub-embodiment, a CSI request trigger parameter is included in the beam indication together with the TCI state update. In one sub-embodiment, a CSI request trigger parameter is included in the cell switch message. The CSI request trigger parameter can include some information on the CSI report such as a reporting resources and metric type (e.g., L1-RSRP/L1-RSRQ/L1-SINR/CQI). In another sub-embodiment, a parameter indi-cating the T_OFFSET is included in the beam indication together with the TCI state update. In another sub-embodi-ment, a parameter indicating the T_OFFSET is included in the cell switch message. The set of possible values of T_OFFSET can be configured via higher-layer (e.g., RRC) signaling and/or MAC CE signaling. The T_OFFSET sig-naled together with the TCI state update indicates a value taken from the set. In another sub-embodiment, both the CSI request trigger parameter and the T_OFFSET parameter are included in the beam indication together with the TCI state update. In another sub-embodiment, both the CSI request trigger parameter and the T_OFFSET parameter are included in the cell switch message. In another sub-embodi-ment, the beam indication and cell switch message do not include the CSI request trigger parameter or the T_OFFSET parameter. In this case, at least one of the CSI reporting resources or the T_OFFSET parameter is configured via higher-layer (e.g., RRC) signaling or MAC CE. Therefore, the TCI state update itself functions as the trigger for the CSI report with a pre-configured resource information and/or T_OFFSET value, if applicable.

In another embodiment, the UE assumes that CSI/beam report is transmitted after an additional (subsequent) trig-gering from the network (e.g., via the CSI request field in UL-related DCI and/or DL-related DCI and/or MAC CE) is received analogous to the regular procedure for the trans-mission of aperiodic or semi-persistent CSI/beam reports. That is, after receiving the beam indication, the UE will await the reception of another CSI/beam report trigger (e.g., via the CSI request field in UL-related and/or DL-related DCI and/or MAC CE) before transmitting the associated CSI/beam report.

In another embodiment, the UE assumes that CSI/beam report is transmitted after a cell switch command to change the serving cell from the source serving cell to the target serving cell or candidate cell. That is, after receiving the beam indication, the UE will await the reception of a cell switch command before transmitting the associated CSI/beam report. The aforementioned T_OFFSET can be from the cell switch command.

In another embodiment, the UE assumes that CSI/beam report is transmitted after an additional (subsequent) trig-gering from the network (e.g., via the CSI request field in UL-related DCI and/or DL-related DCI) is received analo-gous to the regular procedure for the transmission of ape-riodic or semi-persistent CSI/beam reports. The additional triggering is transmitted after a cell switch command. That is, after receiving the beam indication and cell switch command, the UE will await the reception of another CSI/beam report trigger (e.g., via the CSI request field in UL-related and/or DL-related DCI and/or MAC CE) before transmitting the associated CSI/beam report.

In another embodiment, the UE performs measurements CSI and beam measurements on the aforementioned RS (AP-CSI-RS and/or SP-CSI-RS). The UE can decide (based on an event, either specified or not, such a change in the optimum beam or TCI state or cell switch) whether a CSI/beam report is needed. If so, a UE-initiated report is transmitted.

In one example, set S can be configured and/or updated through higher layer RRC signaling.

In another example, set S can be configured and/or updated through MAC CE signaling.

In another example, set S can be signaled to a UE dynamically through a CSI request providing set S without triggering CSI reporting.

In another example, set S can be singled with the beam indication, i.e., set S is signaled in the DCI of the beam indication and/or the MAC CE of the beam indication and/or a combination of MAC CE and DCI.

In another example, set S can be singled with the cell switch command or message, i.e., set S is signaled in the DCI of the cell switch command or message and/or the MAC CE of the cell switch command or message and/or a combination of MAC CE and DCI.

In another example, one or more set S can be configured and/or update through higher layer RRC signaling and/or MAC CE signaling. The mapping of one or more set S to one or more TCI states is configured and/or updated through RRC signaling. In one example, the TCI state in the channel conveying the beam indication implicitly determines the set S for beam measurement.

In one example, the target cell or candidate cell in the cell switch command or message implicitly determines the set S for beam measurement.

In one example, the reporting resources and/or report type can be configured and/or updated through higher layer RRC signaling.

In another example, the reporting resources and/or report type can be configured and/or updated through MAC CE signaling.

In another example, the reporting resources and/or report type can be signaled to a UE dynamically through a CSI request providing set S and the CSI reporting resources and/or report type.

In another example, the reporting resources and/or report type can be signaled to a UE dynamically through a CSI report request trigger providing the CSI reporting resources and/or report type.

In another example, the reporting resources and/or report type can be singled with the beam indication, i.e., the reporting resources and/or set S are signaled in the DCI of the beam indication and/or the MAC CE of the beam indication and/or a combination of MAC CE and DCI.

In another example, the reporting resources and/or report type can be singled with the cell switch, i.e., the reporting resources and/or set S are signaled in the DCI of the cell switch and/or the MAC CE of the cell switch and/or a combination of MAC CE and DCI.

In one example, the UL resources for conveying the beam report are configured on PUCCH.

In another example, the UL resources for conveying the beam report are configured on PUCCH, and include a first part beam report and a second part report.

In another example, the UL resources for conveying the beam report are configured on PUSCH.

In another example, the UL resources for conveying the beam report are configured on PUSCH, and include a first part beam report and a second part report.

FIGS. 11A-11L and FIGS. 12A-12C illustrate examples 1100a-11001 and 1200a-1200c for downlink beam measurement and beam reporting triggered by beam indication or cell switch to a target or candidate cell according to embodiments of the present disclosure. An embodiment of the methods illustrated in FIGS. 11A-11L and FIGS. 12A-12C are for illustration only. One or more of the components illustrated in FIGS. 11A-11L and FIGS. 12A-12C may be implemented in specialized circuitry configured to perform the noted functions or one or more of the components may be implemented by one or more processors executing instructions to perform the noted functions. Other embodiments of downlink beam measurement and beam reporting triggered by beam indication could be used without departing from the scope of this disclosure.

In the examples of FIGS. 11A-11L and FIGS. 12A-12C, a new beam indication (e.g., a new TCI state or a new spatial relation information) and/or cell switch command or message is indicated to a UE for target serving cell or candidate cell, for example through L1 control signaling (i.e., DCI) and/or through L2 signaling (i.e., MAC CE). The UE receives the corresponding beam indication and/or cell switch command or message and in response provides HARQ-ACK feedback to the gNB. The gNB and UE can apply the new beam of target serving cell or candidate cell (i.e., TCI state or spatial relation filter) after time $T_1$ after the start or the end of the channel conveying the HARQ-ACK feedback with positive acknowledgement for the TCI state. Alternatively, the UE can apply the new beam of target serving cell (i.e., TCI state or spatial relation filter) after time $T_1$ after the start or the end of the channel conveying the HARQ-ACK feedback with positive acknowledgement for a cell switch command or message. In another example, the gNB and UE can apply the new beam (i.e., TCI state or spatial relation filter) after time $T_1$ after the start or the end of the channel conveying the beam indication that is positively acknowledged. Alternatively, the gNB and UE can apply the new beam (i.e., TCI state or spatial relation filter) after time $T_1$ after the start or the end of the channel conveying a cell switch command that is positively acknowledged. An AP-CSI-RS or SP-CSI-RS is triggered after time $T_2$ after the start or the end of the channel conveying the HARQ-ACK feedback with positive acknowledgement for the TCI state. Alternatively, An AP-CSI-RS or SP-CSI-RS is triggered after time $T_2$ after the start or the end of the channel conveying the HARQ-ACK feedback with positive acknowledgement for the cell switch command or message. In another example an AP-CSI-RS or SP-CSI-RS is triggered after time $T_2$ after the start or the end of the channel conveying the beam indication that is positively acknowledged. Alternatively, an AP-CSI-RS or SP-CSI-RS is triggered after time $T_2$ after the start or the end of the channel conveying the cell switch command that is positively acknowledged. In another example an AP-CSI-RS or SP-CSI-RS is triggered after time $T_2$ after the start or the end of the channel conveying the beam indication. Alternatively, an AP-CSI-RS or SP-CSI-RS is triggered after time $T_2$ after the start or the end of the channel conveying the cell switch command. The AP-CSI-RS or SP-CSI-RS includes CSI-RS resources and/or resource sets in set S. In one example, $T_2$ is configured and/or updated by higher layer RRC signaling. In another example, $T_2$ is configured and/or updated by MAC CE signaling. In another example, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S. In another example, $T_2$ is indicated by the cell switch command or message signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S.

In one example, the CSI-RS resource can be configured with 'repetition off', i.e., a UE may not assume that the CSI-RS resources within a CSI-RS resource set are transmitted with a same downlink spatial domain transmission filter.

In another example, the CSI-RS resource can be configured with 'repetition on', i.e., a UE can assume that the CSI-RS resources within a CSI-RS resource set are transmitted with a same downlink spatial domain transmission filter.

In another example, U.S. patent application Ser. No. 17/302,582 filed on May 6, 2021, which is incorporated by reference herein, the CSI-RS resource can be configured with 'repetition partially on', i.e., a UE can assume that a subset of the CSI-RS resources within a CSI-RS resource set are transmitted with a same downlink spatial domain transmission filter, the UE may not assume that the CSI-RS resources within different subsets of the CSI-RS resource set are transmitted with a same downlink spatial domain transmission filter.

In one example, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example, $M_D + N_U + M_j = 1$, i.e., the channel conveying the beam indications includes one TCI state ID:

$M_D = 1$, $N_U = 0$ and $M_j = 0$, or $M_D = 0$, $N_U = 1$ and $M_j = 0$, or $M_D = 0$, $N_U = 0$ and $M_j = 1$.

Set S corresponds to the indicated DL TCI state ID or UL TCI state ID or Joint TCI state ID. The UE reports beam metrics and corresponding resource indicators based on set S.

Figure 13:
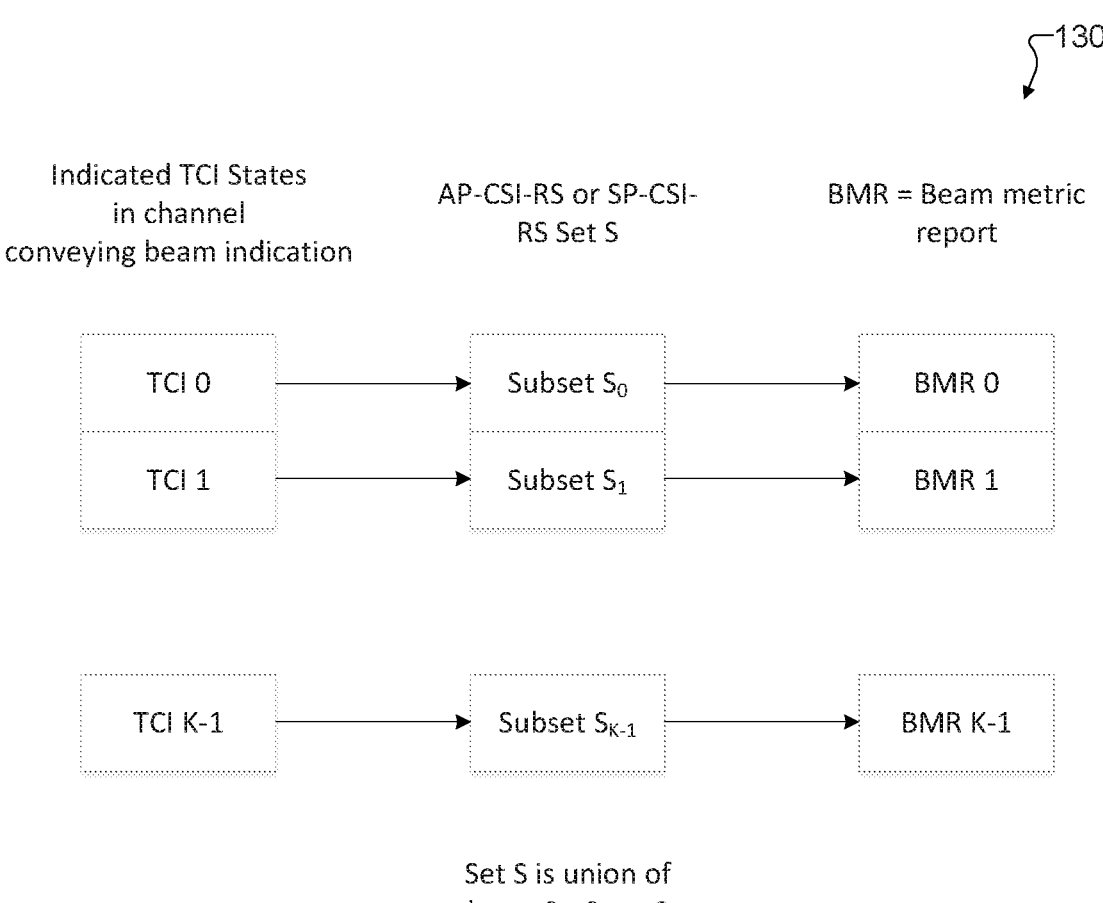
FIG. 13 illustrates an example where $M_D+N_U+M_j>1$, $K=M_D+N_U+M_j$ TCI state IDs are included in the channel conveying the beam indications or cell switch to a target or candidate cell according to embodiments of the present disclosure.
Figures 14A, 14B, 14C:
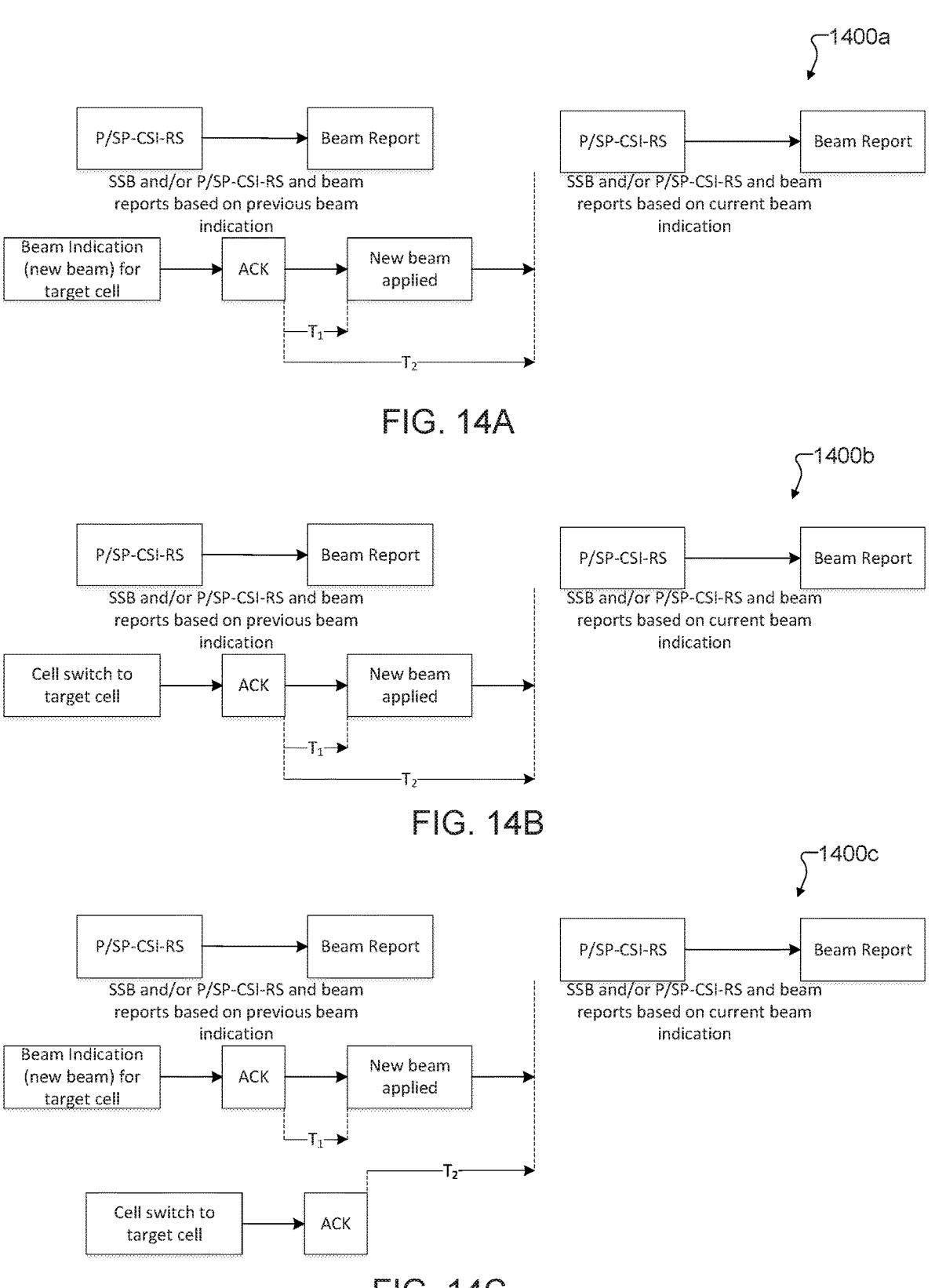
FIGS. 14A-14C illustrate examples for downlink beam measurement and beam reporting updated by beam indication or cell switch to a target or candidate cell according to embodiments of the present disclosure.
Figure 15A:
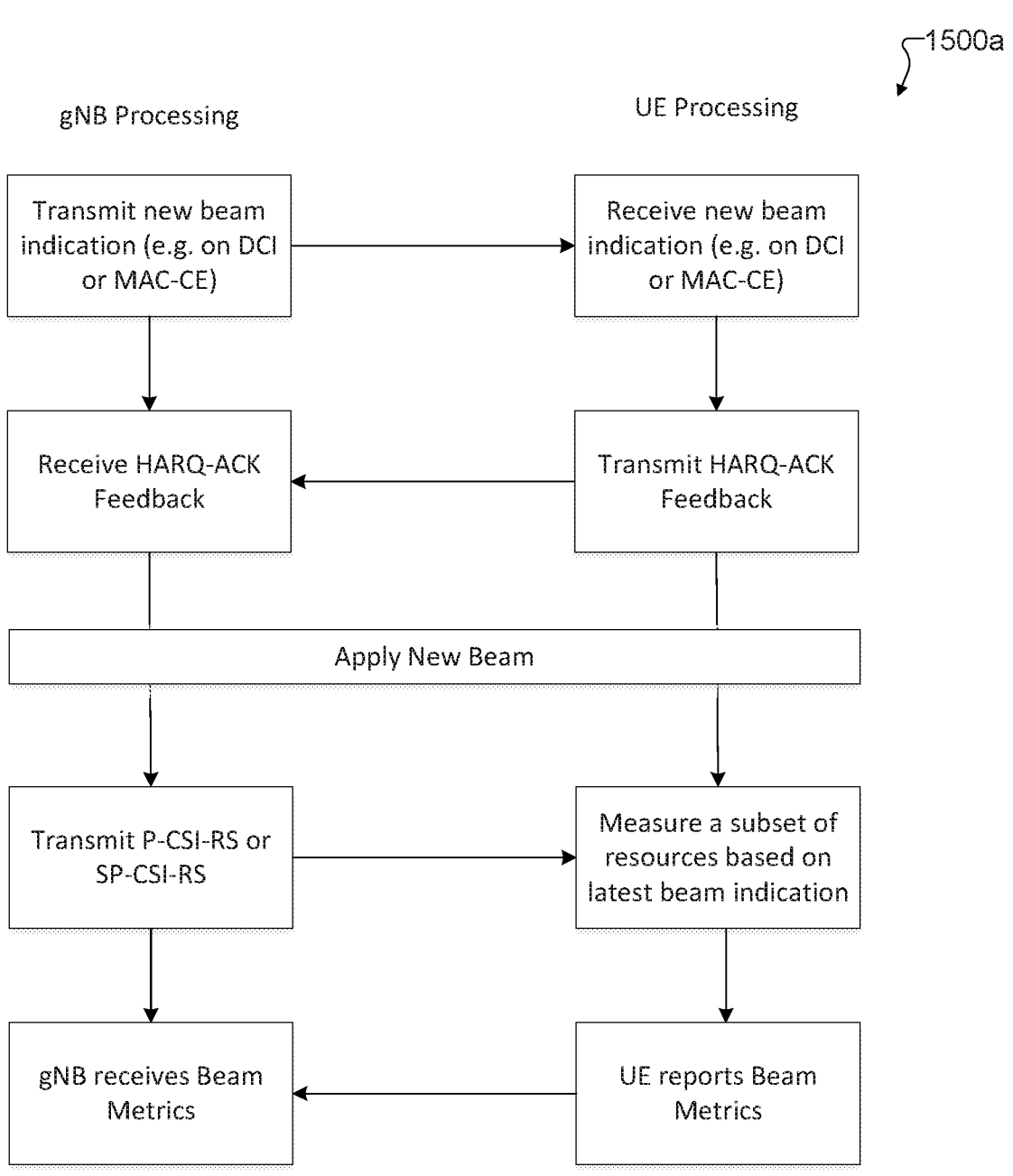
FIGS. 15A-15C illustrate examples for downlink beam measurement and beam reporting updated by beam indication or cell switch to a target or candidate cell according to embodiments of the present disclosure.
Figure 15B:
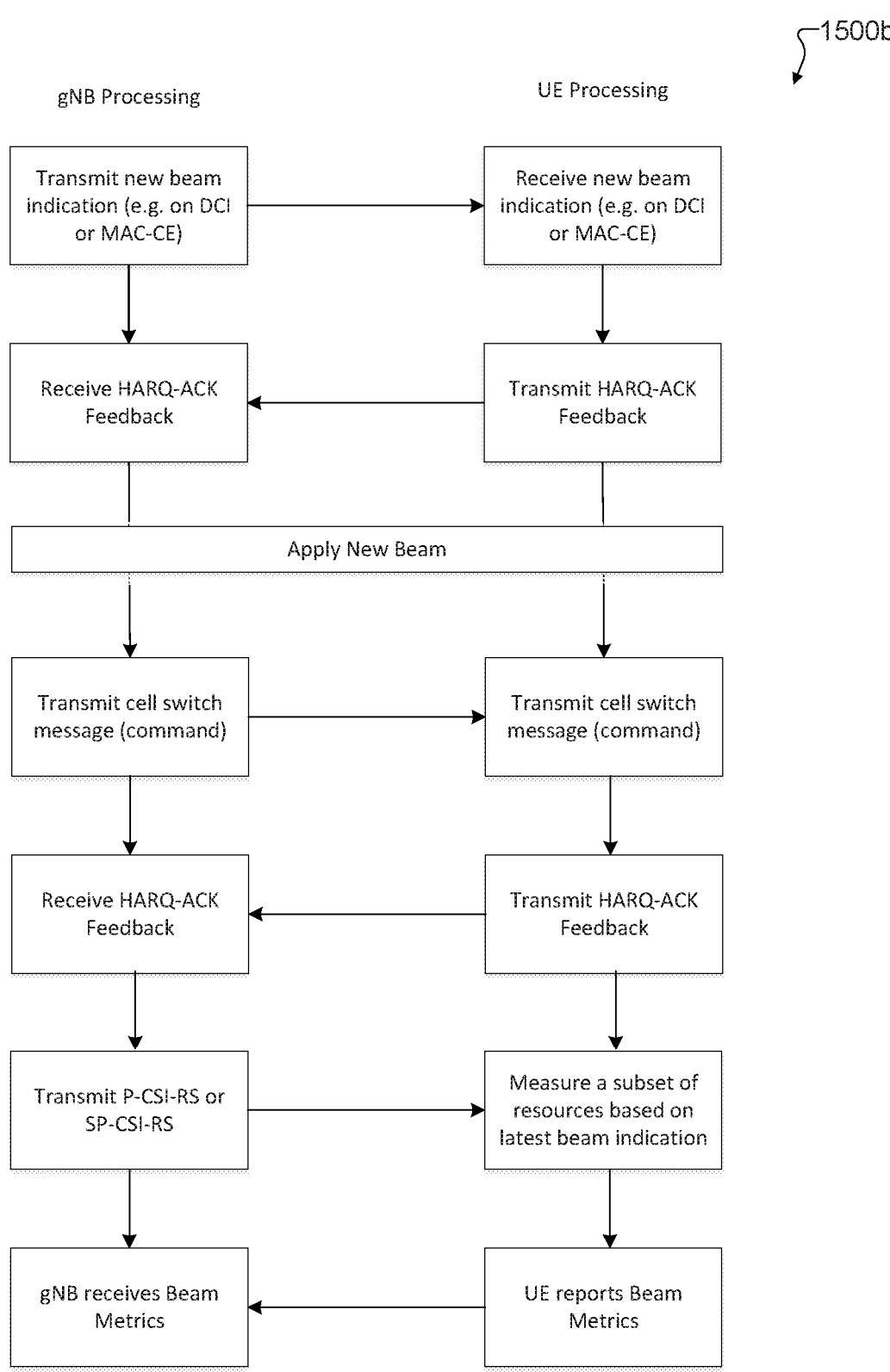
Figure 15C:
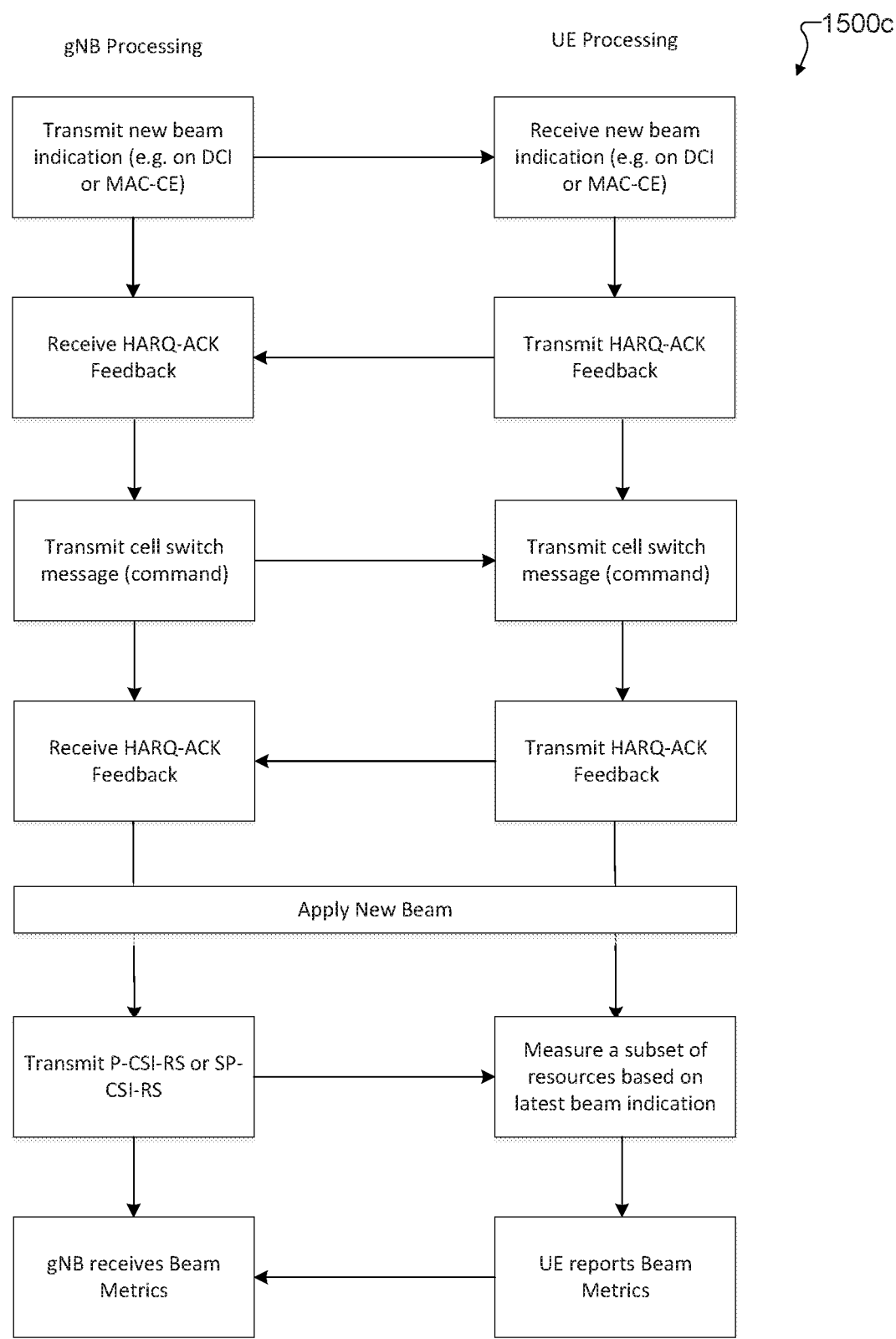

FIG. 13 illustrates an example 1300 where $M_D + N_U + M_j > 1$, $K = M_D + N_U + M_j$ TCI state IDs are included in the channel conveying the beam indications or cell switch to a target or candidate cell according to embodiments of the present disclosure. The embodiment of beam indications of FIG. 13 is for illustration only. Different embodiments of beam indication could be used without departing from the scope of this disclosure.

In the example of FIG. 13, $M_D + N_U + M_j > 1$, $K = M_D + N_U + M_j$ TCI state IDs are included in the channel conveying the beam indications. Set S includes K subsets of AP-CSI-RS or SP-CSI-RS resources, each subset corresponds to an indicated TCI state ID. The association between a TCI state ID and the AP-CSI-RS or SP-CSI-RS resources in the subset can be configured/updated by RRC signaling and/or MAC CE signaling. The UE reports K beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K beam metric reports are included in a same reporting instance.

In another example, each beam metric report is included in its own reporting instance, there are K reporting instances for the K beam metric reports.

In another example, the K beam metric reports are included in more than one reporting instance but less than K reporting instances, a reporting instance can include one or more beam metric reports.

Although FIG. 13 illustrates an example of beam indication or cell switch, various changes may be made to FIG. 13. For example, various changes to the number of TCI states, etc. could be made according to particular needs.

In one example, $M_D + N_U + M_j > 1$, $K = M_D + N_U + M_j$ TCI state IDs are included in the channel conveying the beam indications or cell switch to a target or candidate cell. Set S includes K1 subsets of AP-CSI-RS or SP-CSI-RS resources, wherein $K1 \leq K$. Each indicated TCI state ID corresponds to at most one subset in set S. The association between a TCI state ID and the AP-CSI-RS or SP-CSI-RS resources in the subset can be configured/updated by RRC signaling and/or MAC CE signaling. The UE reports K1 beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K1 beam metric reports are included in a same reporting instance.

In another example, each beam metric report is included in its own reporting instance, there are K1 reporting instances for the K1 beam metric reports.

In another example, the K1 beam metric reports are included in more than one reporting instance but less than K1 reporting instances, a reporting instance can include one or more beam metric reports.

In one example, an indicated TCI state ID has no corresponding subset in set S, and no corresponding beam metric report.

In another example, a subset in set S can correspond to one or more indicated TCI state IDs.

In another example, the channel conveying the TCI state IDs can indicate the TCI state IDs for which a UE reports a beam metric report.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types.

A second set or sets of UL measurement RS resources (e.g., SRS).

A channel conveying a beam indication can indicate whether the UE:

1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following:

Explicitly signaled in the channel conveying a beam indication (e.g., a TCI state);

Implicitly determined based higher layer configuration of resource sets and mapping of resource sets to TCI states, and the TCI state indicated in the channel conveying a beam indication.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types;

A second set or sets of UL measurement RS resources (e.g., SRS).

A cell switch command or message (a channel conveying a cell switch command or message) can indicate whether the UE:

1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the cell switch command or message, new values for an existing flag in the cell switch command or message, a combination of field values of exiting fields in the cell switch command or message or a specific RNTI or a specific RNTI in the cell switch command or message.

The measurement RS resources and the report resources (if applicable), can be one of the following:

Explicitly signaled in the cell switch command or message.

Implicitly determined based higher layer configuration of resource sets and mapping of resource sets to TCI states, and the TCI state indicated for the target cell or candidate cell.

In the aforementioned examples, the channel conveying the beam indication, or the cell switch command or message can trigger a beam measurement report. The measurement RS resources can be implicitly determined without further indication. In one example, the beam measurement report is transmitted after cell switch in the target or candidate cell.

Although FIGS. 11A-11L and FIGS. 12A-12C illustrate examples 1100a-11001 and 1200a-1200c for downlink beam measurement and beam reporting triggered by beam indication or cell switch to target or candidate cell, various changes may be made to FIGS. 11A-11L and FIGS. 12A-12C. For example, while shown as a series of steps, various steps in FIGS. 11A-11L and FIGS. 12A-12C could overlap, occur in parallel, occur in a different order, or occur any number of times.

The network can indicate TCI state (or spatial relation information) through DL control signaling (i.e., Downlink Control Information (DCI)) and/or through L2 signaling (e.g., MAC CE). The TCI state can provide association with a reference signal (e.g., CSI-RS or SSB or SRS) with a QCL-TypeD or spatial relation, establishing an association with a spatial filter, the TCI state can be for a target cell or a target serving cell or a candidate cell. A UE can be configured a set of TCI state for the target cell or the target serving cell or the candidate cell. In one example, the UE is configured with reference signals R for beam measurement and reporting of a target serving cell or candidate cell. In one example, R can correspond to a SSB resources of target serving cell or candidate cell. In another example, R can correspond to CSI-RS resources or resource sets of target serving cells or candidate cell, wherein in one example the CSI-RS resources are periodic CSI-RS resources, in another example, the CSI-RS resources are semi-persistent CSI-RS resources. In another example, R can contain SSB and/or CSI-RS of target serving cell or candidate cells according to more than one of the examples herein. A UE can be configured a set of reference signals for measurement (e.g., CSI-RS and/or SSB) for the target cell or the target serving cell or the candidate cell.

A TCI-state and/or a QCL-TypeD reference RS associated with the TCI-State can be mapped or linked or associated (e.g., by configuration) to a set S, wherein, S is a set of SSB resource(s) and/or a set of CSI-RS resource(s) and/or a set of CSI-RS resource set(s), and set S is a subset of R. A new TCI state indication updates the periodic or semi-persistent resources (i.e., SSBs or CSI-RS) for downlink beam measurement and beam reporting, wherein the resources for beam measurement are those of set S linked or mapped or associated (e.g., by configuration) to the new TCI state.

In one example, set S can be configured and/or updated through higher layer RRC signaling. The mapping of one or more set S to one or more TCI states is configured and/or updated through RRC signaling.

The TCI state in the channel conveying the beam indication implicitly determines the set S for beam measurement.

In another example, set S can be configured and/or updated through MAC CE signaling. The mapping of set one or more set S to one or more TCI states is configured and/or updated through MAC CE signaling.

The TCI state in the channel conveying the beam indication implicitly determines the set S for beam measurement.

In another example, set S can be signaled to a UE dynamically through a CSI request providing set S without triggering CSI reporting.

In another example, set S can be singled with the beam indication, i.e., set S is signaled in the DCI of the beam indication and/or the MAC CE of the beam indication and/or a combination of MAC CE and DCI.

In one example, RRC signaling and/or MAC CE signaling configures one or more set S, the DCI and/or MAC CE of the beam indication (i.e., the channel conveying the beam indication) conveys a set index for beam measurement.

In another example, set S can be singled with the cell switch command or message, i.e., set S is signaled in the DCI of the cell switch command or message and/or the MAC CE of the cell switch command or message and/or a combination of MAC CE and DCI.

In one example, RRC signaling and/or MAC CE signaling configures one or more set S, the DCI and/or MAC CE of the cell switch command or message (i.e., the channel conveying the cell switch) conveys a set index for beam measurement.

In one example, the reporting resources and/or report type can be configured and/or updated through higher layer RRC signaling.

In another example, the reporting resources and/or report type can be configured and/or updated through MAC CE signaling.

In another example, the reporting resources and/or report type can be signaled to a UE dynamically through a CSI request providing set S and the CSI reporting resources and/or report type.

In another example, the reporting resources and/or report type can be signaled to a UE dynamically through a CSI report request trigger providing the CSI reporting resources and/or report type.

In another example, the reporting resources and/or report type can be singled with the beam indication, i.e., the reporting resources and/or set S are signaled in the DCI of the beam indication and/or the MAC CE of the beam indication and/or a combination of MAC CE and DCI.

In another example, the reporting resources and/or report type can be singled with the cell switch command or message, i.e., the reporting resources and/or set S are signaled in the DCI of the cell switch command or message and/or the MAC CE of the cell switch command or message and/or a combination of MAC CE and DCI.

In one example, the UL resources for conveying the beam report are configured on PUCCH.

In one example, the UL resources for conveying the beam report are configured on PUCCH, and include a first part beam report and a second part report.

In another example, the UL resources for conveying the beam report are configured on PUSCH.

In another example, the UL resources for conveying the beam report are configured on PUSCH, and include a first part beam report and a second part report.

FIGS. 14A-14C and FIGS. 15A-15C illustrate examples $1400a$-$1400c$ and $1500a$-$1500c$ for downlink beam measurement and beam reporting updated by beam indication or cell switch to a target or candidate cell according to embodiments of the present disclosure. An embodiment of the methods illustrated in FIGS. 14A-14C and FIGS. 15A-15C are for illustration only. One or more of the components illustrated in FIGS. 14A-14C and FIGS. 15A-15C may be implemented in specialized circuitry configured to perform the noted functions or one or more of the components may be implemented by one or more processors executing instructions to perform the noted functions. Other embodiments of downlink beam measurement and beam reporting triggered by beam indication could be used without departing from the scope of this disclosure.

In the examples of FIGS. 14A-14C and FIGS. 15A-15C, a new beam indication (e.g., a new TCI state or a new spatial relation information) and/or cell switch command or message is indicated to a UE, for example through L1 control signaling (i.e., DCI) and/or through L2 signaling (i.e., MAC CE). The UE receives the corresponding beam indication and/or cell switch command or message and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement. In another example, the gNB and UE can apply the new beam (i.e., TCI state or spatial relation filter) after time $T_1$ after the start or the end of the channel conveying the beam indication or cell switch command/message that is positively acknowledged. At time $T_2$ after the start or the end of the channel conveying the HARQ-ACK feedback with positive acknowledgement, the UE can update the set of resources S for beam measurement and reporting. In another example, after time $T_2$ after the start or the end of the channel conveying the beam indication or cell switch command/message that is positively acknowledged, the UE can update the set of resources S for beam measurement and reporting. In another example, after time $T_2$ after the start or the end of the channel conveying the beam indication or cell switch command/message, the UE can update the set of resources S for beam measurement and reporting S can include SSB resources and/or CSI-RS resources and/or CSI-RS resource sets. In one example, $T_2$ is configured and/or updated by higher layer RRC signaling. In another example, $T_2$ is configured and/or updated by MAC CE signaling. In another example, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S. In another example, $T_2$ is indicated by the cell switch command/message signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S.

In one example, the CSI-RS resource can be configured with 'repetition off', i.e., a UE may not assume that the CSI-RS resources within a CSI-RS resource set are transmitted with a same downlink spatial domain transmission filter.

In another example, the CSI-RS resource can be configured with 'repetition on', i.e., a UE can assume that the CSI-RS resources within a CSI-RS resource set are transmitted with a same downlink spatial domain transmission filter.

In another example, U.S. patent application Ser. No. 17/302,582 filed on May 6, 2021, which is incorporated by reference herein, the CSI-RS resource can be configured with 'repetition partially on', i.e., a UE can assume that a subset of the CSI-RS resources within a CSI-RS resource set are transmitted with a same downlink spatial domain transmission filter, the UE may not assume that the CSI-RS resources within different subsets of the CSI-RS resource set are transmitted with a same downlink spatial domain transmission filter.

In one example, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example, $M_D + N_U + M_j = 1$, i.e., the channel conveying the beam indications includes one TCI state ID:
$M_D = 1$, $N_U = 0$ and $M_j = 0$, or
$M_D = 0$, $N_U = 1$ and $M_j = 0$, or
$M_D = 0$, $N_U = 0$ and $M_j = 1$.
Set S corresponds to the indicated DL TCI state ID or UL TCI state ID or Joint TCI state ID. The UE reports beam metrics and corresponding resource indicators based on set S.

Figure 16:
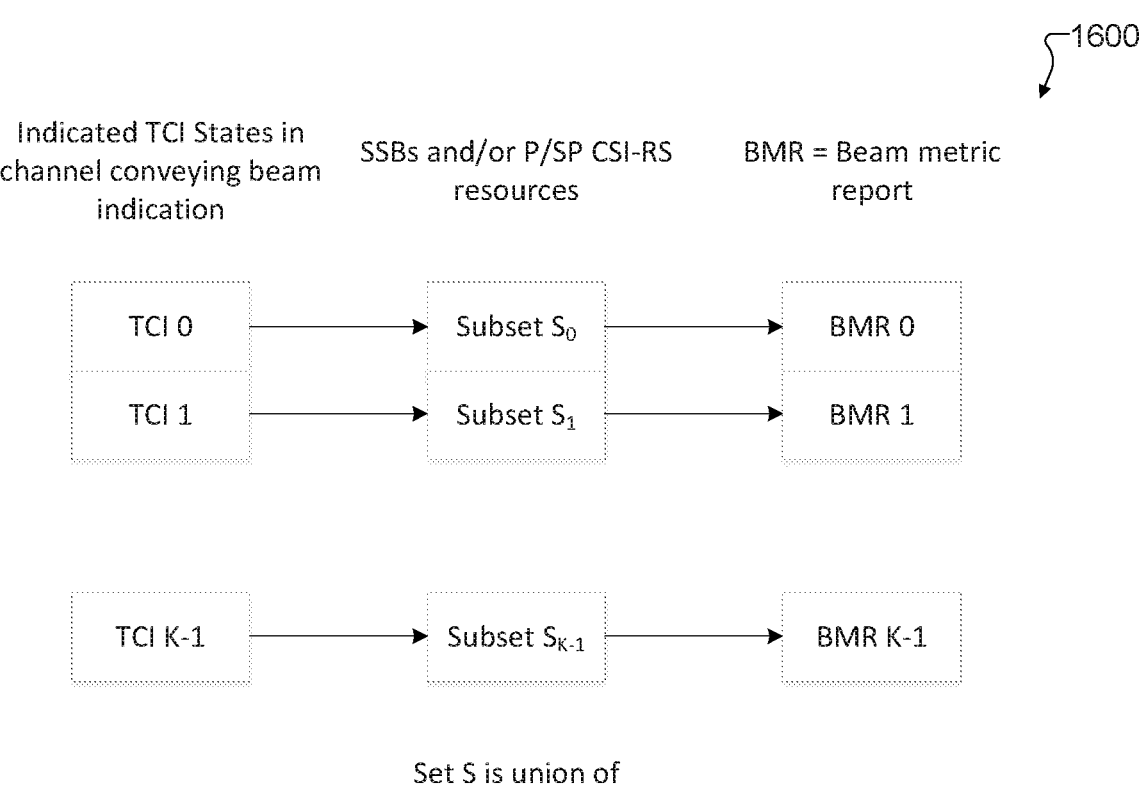
FIG. 16 illustrates an example where $M_D+N_U+M_j>1$, $K=M_D+N_U+M_j$ TCI state IDs TCI state IDs are included in the channel conveying the beam indications or cell switch to a target or candidate cell according to embodiments of the present disclosure.
Figures 17A, 17B, 17C:
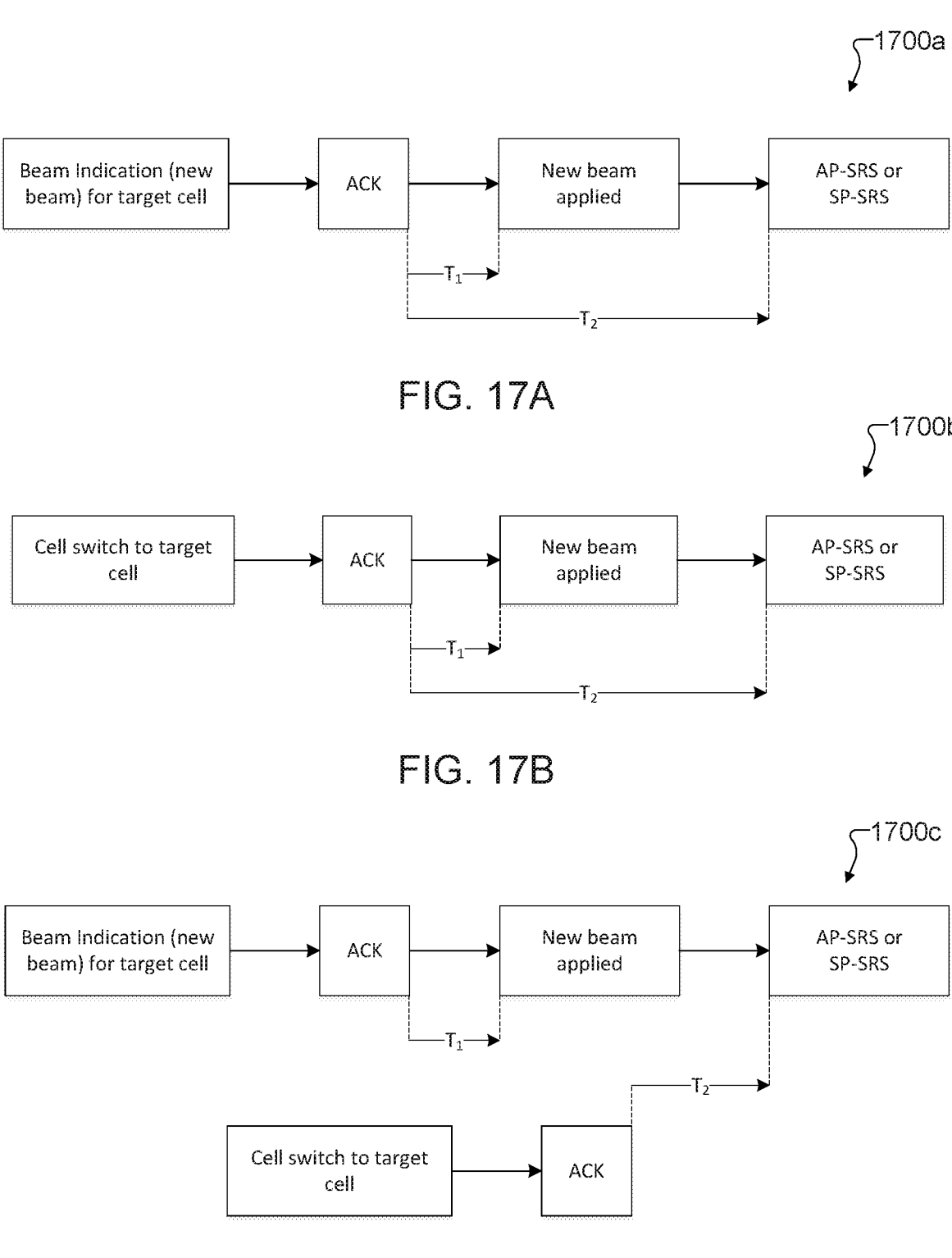
FIGS. 17A-17C illustrate examples for uplink beam management reference signals triggered by beam indication cell switch to target or candidate cell according to embodiments of the present disclosure.
Figure 18A:
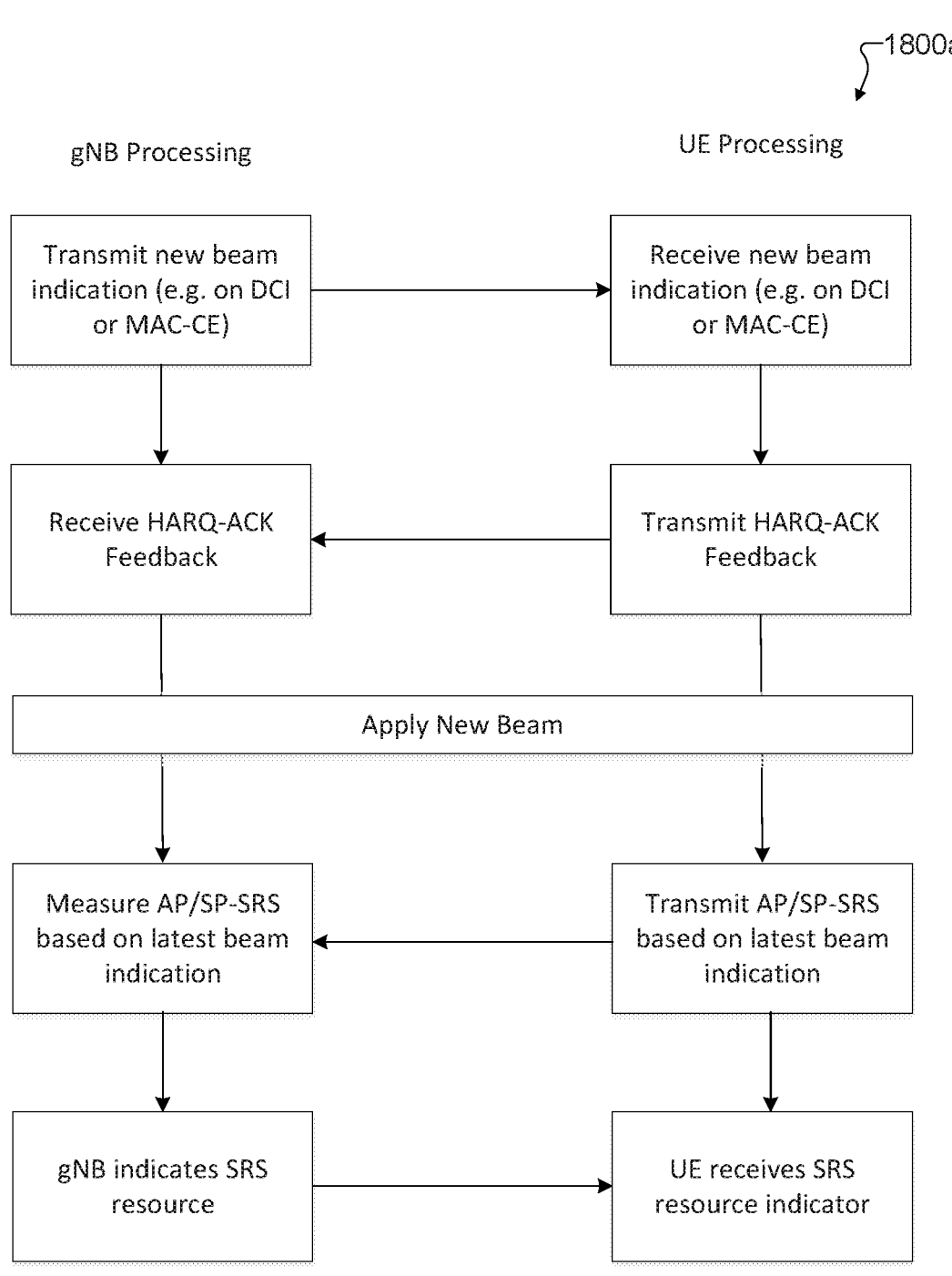
FIGS. 18A-18C illustrate examples for uplink beam management reference signals triggered by beam indication cell switch to target or candidate cell according to embodiments of the present disclosure.
Figure 18B:
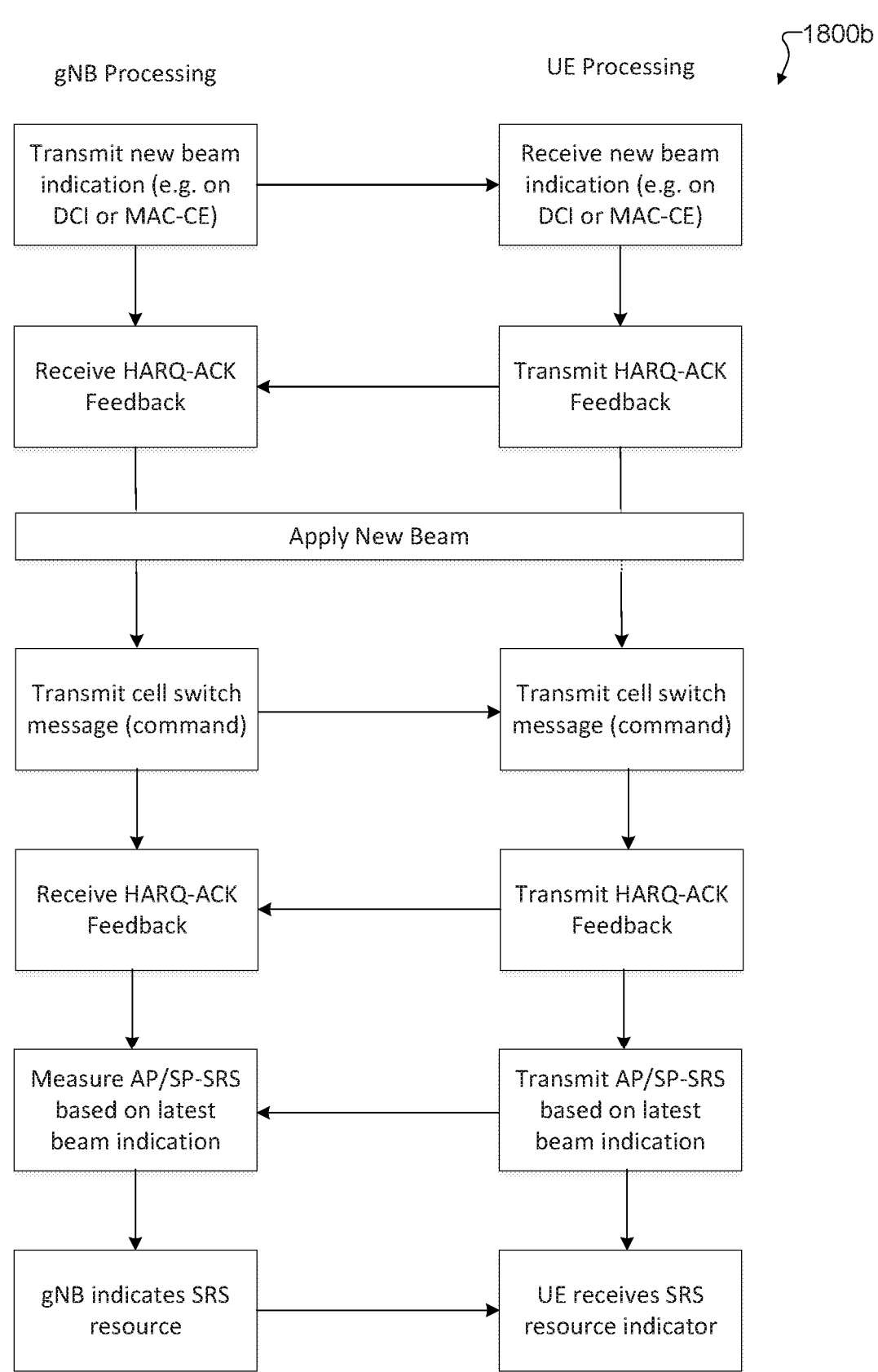
Figure 18C:
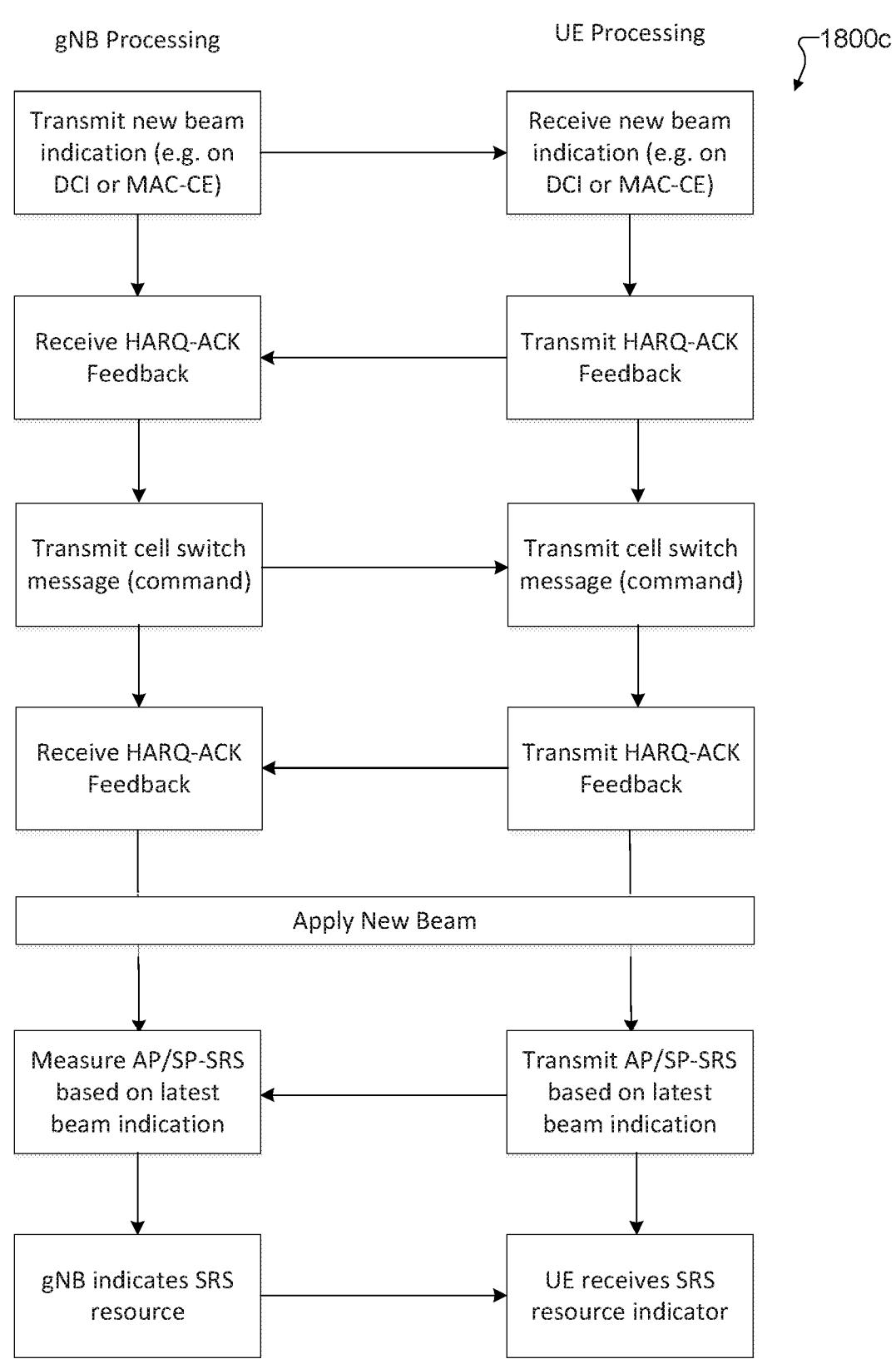
Figure 21A:
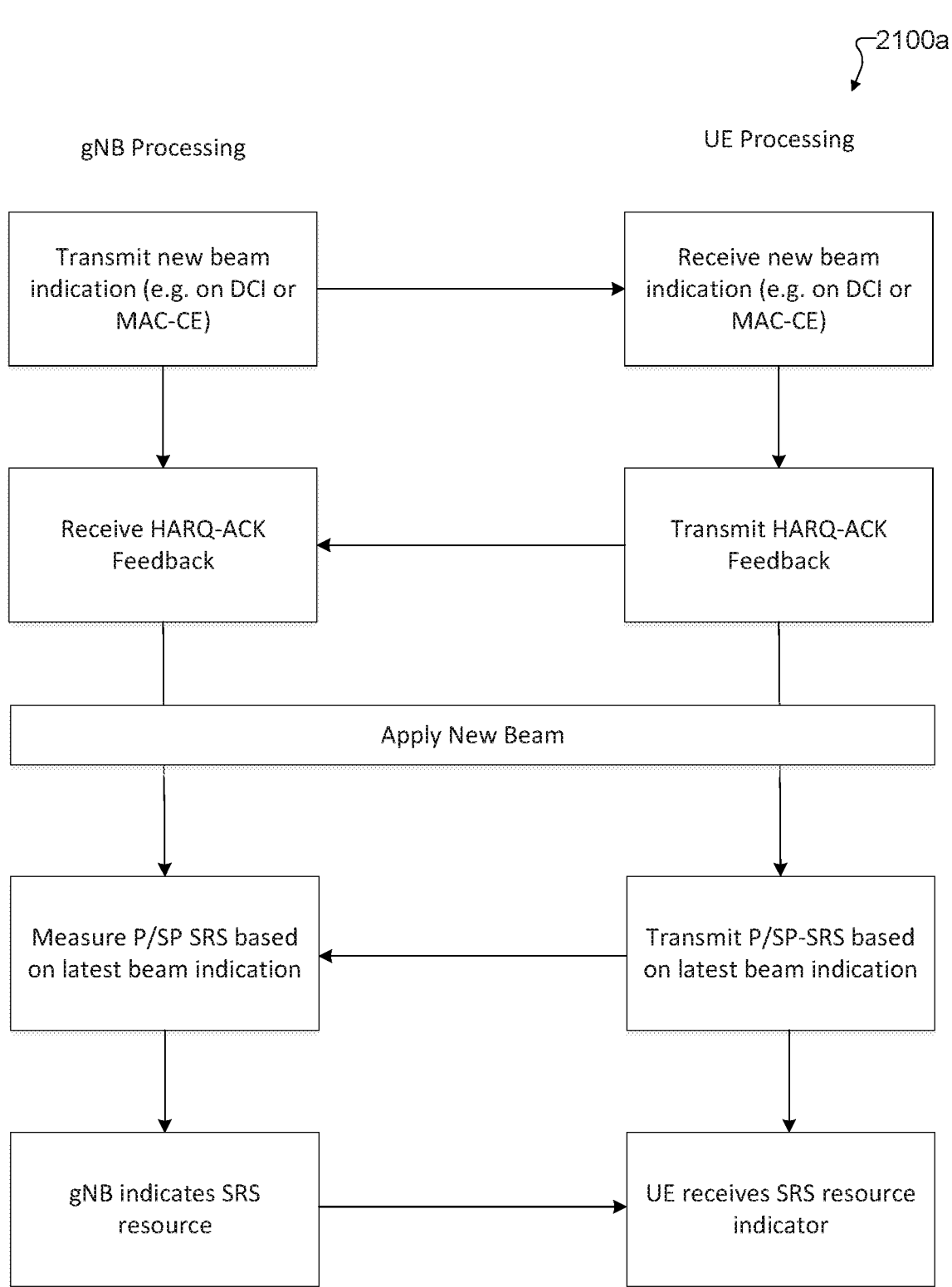
FIGS. 21A-21C illustrate examples for uplink beam management reference signals updated by beam indication or cell switch to a target or candidate cell according to embodiments of the present disclosure.
Figure 21B:
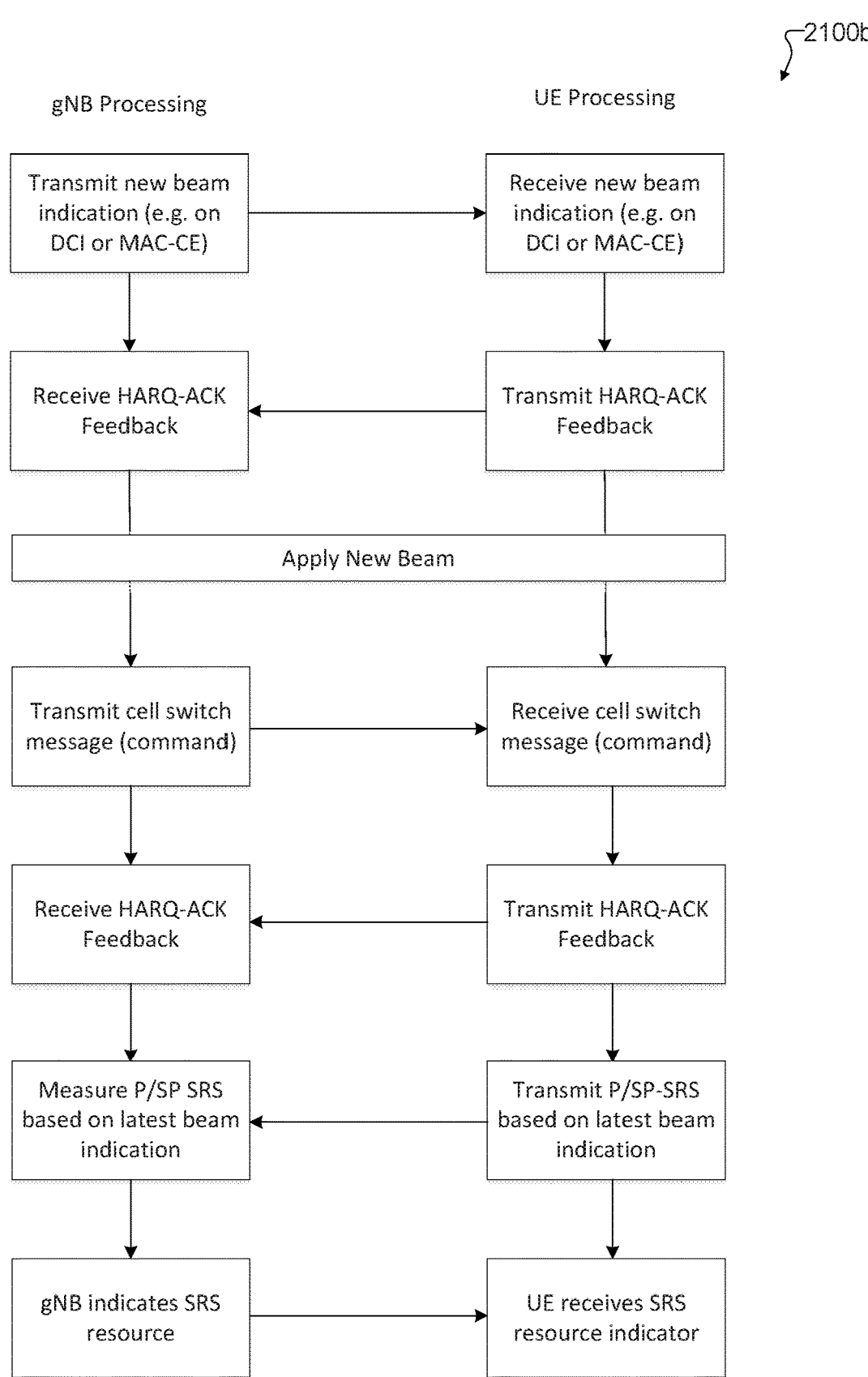
Figure 21C:
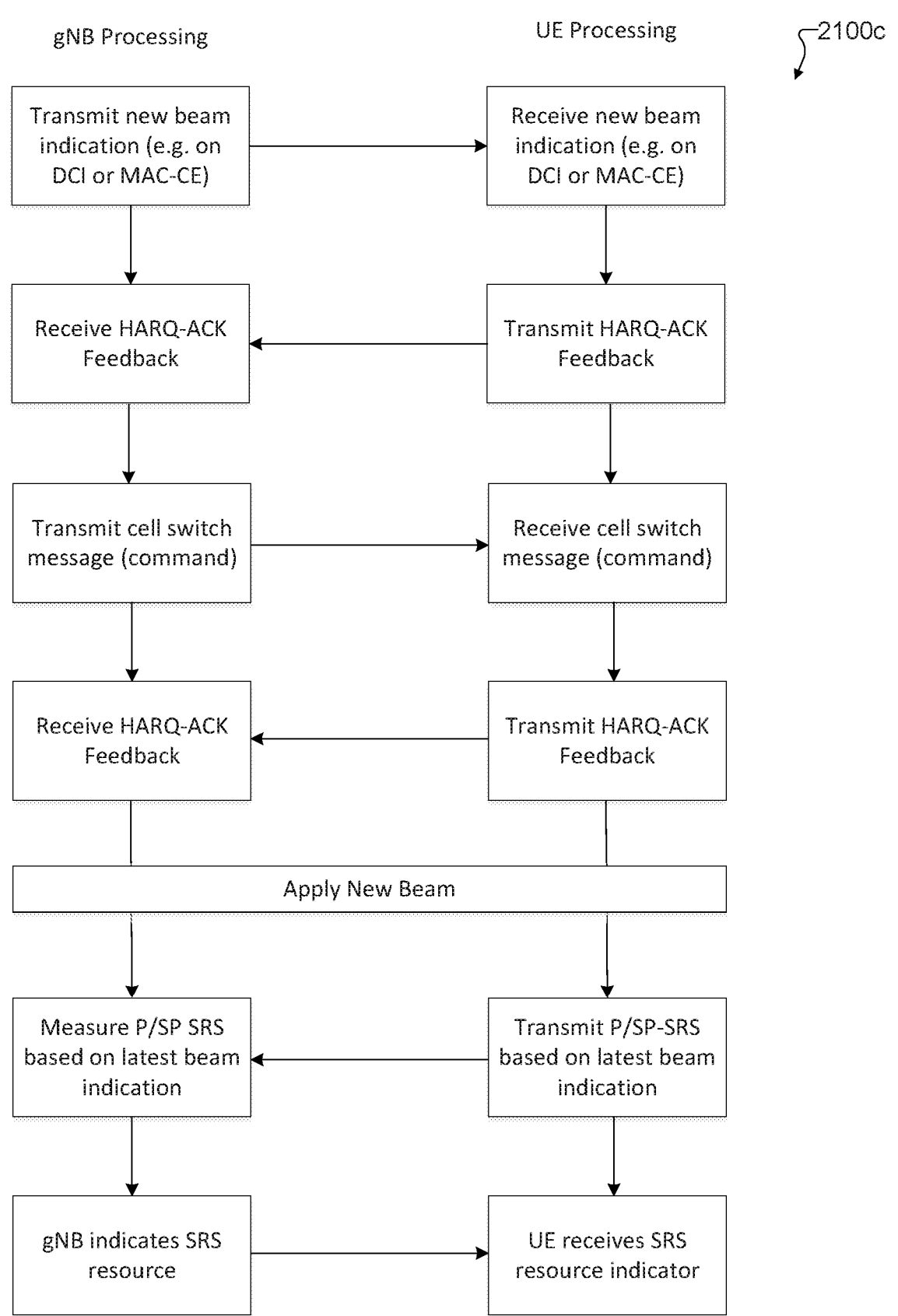

FIG. 16 illustrates an example 1600 where $M_D + N_U + M_j > 1$, $K = M_D + N_U + M_j$ TCI state IDs TCI state IDs are included in the channel conveying the beam indications or cell switch to a target or candidate cell according to embodiments of the present disclosure. The embodiment of beam indications of FIG. 16 is for illustration only. Different embodiments of beam indication could be used without departing from the scope of this disclosure.

In the example of FIG. 16, $M_D + N_U + M_j > 1$, $K = M_D + N_U + M_j$ TCI state IDs are included in the channel conveying the beam indications or cell switch. Set S includes K subsets of SSBs and/or P/SP CSI-RS resources, each subset corresponds to an indicated TCI state ID. The association between a TCI state ID and the SSBs and/or P/SP CSI-RS resources in the subset can be configured/updated by RRC signaling and/or MAC CE signaling. The UE reports K beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K beam metric reports are included in a same reporting instance.

In another example, each beam metric report is included in its own reporting instance, there are K reporting instances for the K beam metric reports.

In another example, the K beam metric reports are included in more than one reporting instance but less than K reporting instances, a reporting instance can include one or more beam metric reports.

Although FIG. 16 illustrates an example of beam indication or cell switch, various changes may be made to FIG. 16. For example, various changes to the number of TCI states, etc. could be made according to particular needs.

In one example, $M_D + N_U + M_J > 1$, $K = M_D + N_U + M_J$ TCI state IDs are included in the channel conveying the beam indications or cell switch to a target or candidate cell. Set S includes K1 subsets of SSBs and/or P/SP CSI-RS resources, wherein $K1 \leq K$. Each indicated TCI state ID corresponds to at most one subset in set S. The association between a TCI state ID and the SSBs and/or P/SP CSI-RS resources in the subset can be configured/updated by RRC signaling and/or MAC CE signaling. The UE reports K1 beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K1 beam metric reports are included in a same reporting instance.

In another example, each beam metric report is included in its own reporting instance, there are K1 reporting instances for the K1 beam metric reports.

In another example, the K1 beam metric reports are included in more than one reporting instance but less than K1 reporting instances, a reporting instance can include one or more beam metric reports.

In one example, an indicated TCI state ID has no corresponding subset in set S, and no corresponding beam metric report.

In another example, a subset in set S can correspond to one or more indicated TCI state IDs.

In another example, the channel conveying the TCI state IDs can indicate the TCI state IDs for which a UE reports a beam metric report.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types;

A second set or sets of UL measurement RS resources (e.g., SRS).

A channel conveying a beam indication can indicate whether the UE:

1. Measures the DL measurement RS resources and provides the beam measurement report on the configured resources for beam reporting.

2. Transmits an UL measurement RS (e.g., SRS)

3. Both 1 and 2.

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following:

Explicitly signaled in the channel conveying a beam indication (e.g., a TCI state)

Implicitly determined based higher layer configuration of resource sets and mapping of resource sets to TCI states, and the TCI state indicated in the channel conveying a beam indication.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types A second set or sets of UL measurement RS resources (e.g., SRS).

A cell switch command or message (a channel conveying a cell switch command or message) can indicate whether the UE:

1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the cell switch command or message, new values for an existing flag in the cell switch command or message, a combination of field values of exiting fields in the cell switch command or message or a specific RNTI or a specific RNTI in the cell switch command or message.

The measurement RS resources and the report resources (if applicable), can be one of the following:

Explicitly signaled in the cell switch command or message.

Implicitly determined based higher layer configuration of resource sets and mapping of resource sets to TCI states, and the TCI state indicated for the target cell or candidate cell.

In the aforementioned examples, the channel conveying the beam indication, or the cell switch command or message can trigger a beam measurement report. The measurement RS resources can be implicitly determined without further indication. In one example, the beam measurement report is transmitted after cell switch in the target or candidate cell.

Although FIGS. 14A-14C and FIGS. 15A-15C illustrate examples 1400a-1400c and 1500a-1500c for downlink beam measurement and beam reporting updated by beam indication or cell switch to target or candidate cell, various changes may be made to FIGS. 14A-14C and FIGS. 15A-15C. For example, while shown as a series of steps, various steps in FIGS. 14A-14C and FIGS. 15A-15C could overlap, occur in parallel, occur in a different order, or occur any number of times.

The network can indicate TCI state (or spatial relation information) through DL control signaling (i.e., Downlink Control Information (DCI)) and/or through L2 signaling (e.g., MAC CE). The TCI state can provide association with a reference signal (e.g., CSI-RS or SSB or SRS) with a QCL-TypeD or spatial relation, establishing an association with a spatial filter, the TCI state can be for a target cell or a target serving cell or a candidate cell. A UE can be configured a set of TCI state for the target cell or the target serving cell or the candidate cell.

In one example, the TCI state is associated with a reference signal (e.g., SSB or CSI-RS) of a target serving cell or candidate cell, wherein the reference signal is a source RS for the TCI state of QCL Type D or a spatial reference signal for the TCI state, associated with a coarse spatial filter. In another example, the TCI state is associated with a reference signal (e.g., SRS) to a target serving cell or candidate cell, wherein the reference signal is a spatial reference signal for the TCI state, and the source RS of the reference signal is a DL reference signal (e.g., SSB or CSI-RS) of target serving cell or candidate cell. A UE can be configured a set of reference signals for measurement (e.g., CSI-RS and/or SSB and/or SRS) for the target cell or the target serving cell or the candidate cell. A TCI-state and/or a QCL-TypeD reference RS associated with the TCI-State and/or a source reference RS associated with the TCI state can be mapped or linked or associated (e.g., by configuration) to a set S, wherein, S is a set of SRS resource(s) and/or a set of SRS resource set(s). In one example, the source RS of the TCI state is the reference RS of the spatial relation information of the SRS resource(s) and/or SRS resource set(s) in set S. The new (most recently updated) TCI state indication triggers the aperiodic (AP)-SRS and/or semi-persistent (SP) SRS, wherein the SRS resources and/or the SRS resource sets associated with the AP-SRS or SP-SRS are those mapped or linked or associated (e.g., by configuration) to the new TCI state (i.e., set S) associated with the target serving cell or candidate cell.

In one embodiment, the UE assumes that the aforementioned RS (AP-SRS and/or SP-SRS) is (or, for SP, starts to be) transmitted concurrently with the beam indication and/or cell switch after a timing offset T_OFFSET. Some example values of T_OFFSET include 0 (no offset) and n>0 OFDM symbol(s). The transmission of the RS can be assumed without an additional triggering from the NW (e.g., via the SRS request field in a channel conveying a beam indication (e.g., a TCI state) such as a purposed designed DCI format for beam indication, and/or UL-related DCI and/or DL-related DCI and/or MAC CE). That is, the UE assumes that the RS is transmitted T_OFFSET after the reception of the beam indication and/or cell switch command or message. In one sub-embodiment, an RS trigger parameter is included in the beam indication together with the TCI state update. In one sub-embodiment, an RS trigger parameter is included in the cell switch command or message. The RS trigger parameter can include some information on the RS such as a resource or resource set index/indices associated with the RS. In another sub-embodiment, a parameter indicating the T_OFFSET is included in the beam indication together with the TCI state update. In another sub-embodiment, a parameter indicating the T_OFFSET is included in the cell switch command or message. The set of possible values of T_OFFSET can be configured via higher-layer (e.g., RRC) signaling and/or MAC CE signaling. The T_OFFSET signaled together with the TCI state update indicates a value taken from the set. In another sub-embodiment, both the RS trigger parameter and the T_OFFSET parameter are included in the beam indication together with the TCI state update. In another sub-embodiment, both the RS trigger parameter and the T_OFFSET parameter are included in the cell switch command or message. In another sub-embodiment, the beam indication or cell switch command or message do not include the RS trigger parameter or the T_OFFSET parameter. In this case, at least one of the RS resource or resource set indices or the T_OFFSET parameter is configured via higher-layer (e.g., RRC) signaling or MAC CE. Therefore, the TCI state update or cell switch command or message itself functions as the trigger for the RS with a pre-configured resource or resource set information and/or T_OFFSET value, if applicable. In one example T_OFFSET can depend on a UE capability.

In another embodiment, the UE assumes that the aforementioned RS (AP-SRS and/or SP-SRS) is (or, for SP, starts to be) transmitted after an additional (subsequent) triggering from the NW (e.g., via the SRS request field in UL-related and/or DL-related DCI and/or MAC CE) is received analogous to the regular procedure for the reception of aperiodic or semi-persistent RS. That is, after receiving the beam indication, the UE will await the reception of another SRS triggering (e.g., via the SRS request field in UL-related DCI and/or DL-related DCI and/or MAC CE) before transmitting the associated RS.

In another embodiment, the UE assumes that the aforementioned RS (AP-SRS and/or SP-SRS) is (or, for SP, starts to be) transmitted after a cell switch command or message to change the serving cell from the source serving cell to the target serving cell or candidate cell. That is, after receiving the beam indication, the UE will await the reception of another SRS triggering (e.g., via the SRS request field in UL-related DCI and/or DL-related DCI and/or MAC CE) before transmitting the associated RS.

In another embodiment, the UE assumes that the aforementioned RS (AP-SRS and/or SP-SRS) is (or, for SP, starts to be) transmitted after an additional (subsequent) triggering from the NW (e.g., via the SRS request field in UL-related and/or DL-related DCI and/or MAC CE) is received analogous to the regular procedure for the reception of aperiodic or semi-persistent RS. The additional triggering is transmitted after a cell switch command or message. That is, after receiving the cell switch command or message, the UE will await the reception of another SRS triggering (e.g., via the SRS request field in UL-related DCI and/or DL-related DCI and/or MAC CE) before transmitting the associated RS.

In one example, set S can be configured and/or updated through higher layer RRC signaling.

In another example, set S can be configured and/or updated through MAC CE signaling.

In another example, set S can be signaled to a UE dynamically through a SRS request providing set S.

In another example, set S can be singled with the beam indication, i.e., set S is signaled in the DCI of the beam indication and/or the MAC CE of the beam indication and/or a combination of MAC CE and DCI.

In another example, set S can be singled with the cell switch command or message, i.e., set S is signaled in the DCI of the cell switch command or message and/or the MAC CE of the cell switch command or message and/or a combination of MAC CE and DCI.

In another example, one or more set S can be configured and/or update through higher layer RRC signaling and/or MAC CE signaling. The mapping of one or more set S to one or more TCI states is configured and/or updated through RRC signaling.

In one example, the TCI state in the channel conveying the beam indication implicitly determines the set S for SRS transmission.

In one example, the TCI state in the cell switch command or message implicitly determines the set S for SRS transmission.

FIGS. 17A-17C and FIGS. 18A-18C illustrate examples 1700a-1700c and 1800a-1800c for uplink beam management reference signals triggered by beam indication or cell switch to target or candidate cell according to embodiments of the present disclosure. An embodiment of the methods illustrated in FIGS. 17A-17C and FIGS. 18A-18C are for illustration only. One or more of the components illustrated in FIGS. 17A-17C and FIGS. 18A-18C may be implemented in specialized circuitry configured to perform the noted functions or one or more of the components may be implemented by one or more processors executing instructions to perform the noted functions. Other embodiments of uplink beam management reference signals triggered by beam indication could be used without departing from the scope of this disclosure.

In the examples of FIGS. 17A-17C and FIGS. 18A-18C, a new beam indication (e.g., a new TCI state or a new spatial relation information) and/or cell switch command or message is indicated to a UE for target serving cell or candidate, for example through L1 control signaling (i.e., DCI) and/or through L2 signaling (i.e., MAC CE). The UE receives the corresponding beam indication and/or cell switch command or message and in response provides HARQ-ACK feedback to the gNB. The gNB and UE can apply the new beam of target serving cell or candidate cell (i.e., TCI state or spatial relation filter) after time $T_1$ after the start or the end of the channel conveying the HARQ-ACK feedback with positive acknowledgement for TCI state. Alternatively, the gNB and UE can apply the new beam of target serving cell (i.e., TCI state or spatial relation filter) after time $T_1$ after the start or the end of the channel conveying the HARQ-ACK feedback for a cell switch command or message. In another example, the gNB and UE can apply the new beam (i.e., TCI state or spatial relation filter) after time $T_1$ after the start or the end of the channel conveying the beam indication that is positively acknowledged. In another example, the gNB and UE can apply the new beam (i.e., TCI state or spatial relation filter) after time $T_1$ after the start or the end of the channel conveying the cell switch command or message that is positively acknowledged. An AP-SRS or SP-SRS (e.g., for beam management and/or indication) is triggered after time $T_2$ after the start or the end of the channel conveying the HARQ-ACK feedback with positive acknowledgement for TCI state. Alternatively, an AP-SRS or SP-SRS (e.g., for beam management and/or indication) is triggered after time $T_2$ after the start or the end of the channel conveying the HARQ-ACK feedback with positive acknowledgement for the cell switch command or message. In another example an AP-SRS or SP-SRS (e.g., for beam management and/or indication) is triggered after time $T_2$ after the start or the end of the channel conveying the beam indication that is positively acknowledged. In another example an AP-SRS or SP-SRS (e.g., for beam management and/or indication) is triggered after time $T_2$ after the start or the end of the channel conveying the cell switch command or message that is positively acknowledged. In another example an AP-SRS or SP-SRS (e.g., for beam management and/or indication) is triggered after time $T_2$ after the start or the end of the channel conveying the beam indication. Alternatively, an AP-SRS or SP-SRS (e.g., for beam management and/or indication) is triggered after time $T_2$ after the start or the end of the channel conveying the cell switch command. The AP-SRS or SP-SRS includes SRS resources and/or resource sets in set S. In one example, $T_2$ is configured and/or updated by higher layer RRC signaling. In another example, $T_2$ is configured and/or updated by MAC CE signaling. In another example, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S. In another example, $T_2$ is indicated by the cell switch command or message signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S.

In one example, the SRS resource can be configured with 'repetition off', i.e., a UE can transmit the SRS resources within a SRS resource set with different uplink spatial domain transmission filters.

In another example, the SRS resource can be configured with 'repetition on', i.e., a UE transmits the SRS resources within a SRS resource set with a same uplink spatial domain transmission filter.

In another example, the SRS resource can be configured with 'repetition partially on', i.e., a UE transmits SRS resources of a subset of SRS resources within a SRS resource set with a same uplink spatial domain transmission filter, the UE can transmit SRS resources within different subsets of the SRS resource set with different uplink spatial domain transmission filters.

In one example, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example, $M_D + N_U + M_j = 1$, i.e., the channel conveying the beam indications includes one TCI state ID:

$M_D = 1$, $N_U = 0$ and $M_j = 0$, or $M_D = 0$, $N_U = 1$ and $M_j = 0$, or $M_D = 0$, $N_U = 0$ and $M_j = 1$.

Set S corresponds to the indicated DL TCI state ID or UL TCI state ID or Joint TCI state ID. The UE transmits set S of AP-SRS or SP-SRS based on the indicated TCI state ID.

FIG. 19 illustrates an example 1900 where $M_D + N_U + M_j > 1$, $K = M_D + N_U + M_j$ TCI state IDs are included in the channel conveying the beam indications or cell switch to a target or candidate cell according to embodiments of the present disclosure. The embodiment of beam indications of FIG. 19 is for illustration only. Different embodiments of beam indication could be used without departing from the scope of this disclosure.

In the example of FIG. 19, $M_D + N_U + M_j > 1$, $K = M_D + N_U + M_j$ TCI state IDs are included in the channel conveying the beam indications. Set S includes K subsets of AP-SRS or SP-SRS resources, each subset corresponds to an indicated TCI state ID. The association between a TCI state ID and the AP-SRS or SP-SRS resources in the subset can be configured/updated by RRC signaling and/or MAC CE signaling.

Although FIG. 19 illustrates an example of beam indication or cell switch, various changes may be made to FIG. 19. For example, various changes to the number of TCI states, etc. could be made according to particular needs.

In one example, $M_D + N_U + M_j > 1$, $K = M_D + N_U + M_j$ TCI state IDs are included in the channel conveying the beam indications or cell switch to a target or candidate cell. Set S includes K1 subsets of AP-SRS or SP-SRS resources, wherein K1≤K. Each indicated TCI state ID corresponds to at most one subset in set S. The association between a TCI state ID and the AP-SRS or SP-SRS resources in the subset can be configured/updated by RRC signaling and/or MAC CE signaling.

In one example, an indicated TCI state ID has no corresponding subset in set S, and no corresponding SRS transmission.

In another example, a subset in set S can correspond to one or more indicated TCI state IDs.

In another example, the channel conveying the TCI state IDs can indicate the TCI state IDs for which a UE transmits a subset of SRS resources.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types.

A second set or sets of UL measurement RS resources (e.g., SRS).

A channel conveying a beam indication can indicate whether the UE:

1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following:

Explicitly signaled in the channel conveying a beam indication (e.g., a TCI state).

Implicitly determined based higher layer configuration of resource sets and mapping of resource sets to TCI states, and the TCI state indicated in the channel conveying a beam indication.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types.

A second set or sets of UL measurement RS resources (e.g., SRS).

A cell switch command or message (a channel conveying a cell switch command or message) can indicate whether the UE 1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the cell switch command or message, new values for an existing flag in the cell switch command or message, a combination of field values of exiting fields in the cell switch command or message or a specific RNTI or a specific RNTI in the cell switch command or message.

The measurement RS resources and the report resources (if applicable), can be one of the following:

Explicitly signaled in the cell switch command or message.

Implicitly determined based higher layer configuration of resource sets and mapping of resource sets to TCI states, and the TCI state indicated for the target cell or candidate cell.

Although FIGS. 17A-17C and FIGS. 18A-18C illustrate examples 1700a-1700c and 1800a-1800c for uplink beam management reference signals triggered by beam indication or cell switch to target or candidate cell, various changes may be made to FIGS. 17A-17C and FIGS. 18A-18C. For example, while shown as a series of steps, various steps in FIGS. 17A-17C and FIGS. 18A-18C could overlap, occur in parallel, occur in a different order, or occur any number of times.

The network can indicate TCI state (or spatial relation information) through DL control signaling (i.e., Downlink Control Information (DCI)) and/or through L2 signaling (e.g., MAC CE). The TCI state can provide association with a reference signal (e.g., CSI-RS or SSB or SRS) with a QCL-TypeD or spatial relation, establishing an association with a spatial filter, the TCI state can be for a target cell or a target serving cell or a candidate cell. A UE can be configured a set of TCI state for the target cell or the target serving cell or the candidate cell. In one example, the UE is configured with UL reference signals R for beam measurement and indication of a target serving cell or candidate cell. In one example, R can correspond to SRS resources or SRS resource sets to target serving cell or candidate cell, wherein in one example the SRS resources are periodic SRS resources, in another example, the SRS resources are semi-persistent SRS resources. In another example, R can contain SRS according to examples described herein. A UE can be configured a set of reference signals for measurement (e.g., SRS) for the target cell or the target serving cell or the candidate cell.

A TCI-state and/or a QCL-TypeD reference RS associated with the TCI-State can be mapped or linked or associated (e.g., by configuration) to a set S, wherein, S is a set of SRS resource(s) and/or a set of SRS resource set(s). In one example, set S can be a subset of R. A new TCI state indication updates the periodic or semi-persistent resources (i.e., SRS resources) for uplink beam measurement and beam reporting, wherein the resources for beam measurement are those of set S linked or mapped or associated (e.g., by configuration) to the new TCI state. In one example, the source RS of the TCI state is the reference RS of the spatial relation information of the SRS resource(s) and/or SRS resource set(s) in set S.

In another example, set S can be set R, wherein a new TCI state indication with source reference signal $RS_n$ updates the reference RS of the spatial relation information of the SRS resource(s) and/or SRS resource set(s) in set S to $RS_n$.

In one example, set S and/or set R can be configured and/or updated through higher layer RRC signaling. The mapping of one or more set S to one or more TCI states is configured and/or updated through RRC signaling.

The TCI state in the channel conveying the beam indication implicitly determines the set S for SRS transmission.

In another example, set S and/or set R can be configured and/or updated through MAC CE signaling. The mapping of one or more set S to one or more TCI states is configured and/or updated through RRC signaling.

The TCI state in the channel conveying the beam indication implicitly determines the set S for SRS transmission.

In another example, set S can be signaled to a UE dynamically through a SRS request providing set S.

In another example, set S can be singled with the beam indication, i.e., set S is signaled in the DCI of the beam indication and/or the MAC CE of the beam indication and/or a combination of MAC CE and DCI.

In one example, RRC signaling and/or MAC CE signaling configures one or more set S, the DCI and/or MAC CE of the beam indication (i.e., the channel conveying the beam indication) conveys a set index for SRS transmission.

In another example, set S can be singled with the cell switch command or message, i.e., set S is signaled in the DCI of the cell switch command or message and/or the MAC CE of the cell switch command or message and/or a combination of MAC CE and DCI.

In one example, RRC signaling and/or MAC CE signaling configures one or more set S, the DCI and/or MAC CE of the cell switch command or message (i.e., the channel conveying the cell switch) conveys a set index for SRS transmission.

FIGS. 20A-20C and FIGS. 21A-21C illustrate examples 2000a-2000c and 2100a-2100c for uplink beam management reference signals updated by beam indication or cell switch to a target or candidate cell according to embodiments of the present disclosure. An embodiment of the methods illustrated in FIGS. 20A-20C and FIGS. 21A-21C are for illustration only. One or more of the components illustrated in FIGS. 20A-20C and FIGS. 21A-21C may be implemented in specialized circuitry configured to perform the noted functions or one or more of the components may be implemented by one or more processors executing instructions to perform the noted functions. Other embodiments of uplink beam management reference signals updated by beam indication could be used without departing from the scope of this disclosure.

In the examples of FIGS. 20A-20C and FIGS. 21A-21C, a new beam indication (e.g., a new TCI state or a new spatial relation information) and/or cell switch command or message is indicated to a UE, for example through L1 control signaling (i.e., DCI) and/or through L2 signaling (i.e., MAC CE). The UE receives the corresponding beam indication and/or cell switch command or message and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement. In another example, the gNB and UE can apply the new beam (i.e., TCI state or spatial relation filter) after time $T_1$ after the start or the end of the channel conveying the beam indication or cell switch command or message that is positively acknowledged. At time $T_2$ after the start or the end of the channel conveying the HARQ-ACK feedback with positive acknowledgement, the UE can update the set of resources S for SRS (e.g., for beam management and/or indication). In another example, after time $T_2$ after the start or the end of the channel conveying the beam indication or cell switch command or message that is positively acknowledged, the UE can update the set of resources S for SRS (e.g., for beam management and/or indication). In another example, after time $T_2$ after the start or the end of the channel conveying the beam indication or cell switch command or message the UE can update the set of resources S for SRS (e.g., for beam management and/or indication).

S can include SRS resources and/or SRS resource sets. In one example, $T_2$ is configured and/or updated by higher layer RRC signaling. In another example, $T_2$ is configured and/or updated by MAC CE signaling. In another example, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S. In another example, $T_2$ is indicated by the cell switch command/message signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S.

In one example, the SRS resource can be configured with 'repetition off', i.e., a UE can transmit the SRS resources within a SRS resource set with different uplink spatial domain transmission filters.

In another example, the SRS resource can be configured with 'repetition on', i.e., a UE transmits the SRS resources within a SRS resource set with a same uplink spatial domain transmission filter.

In another example, the SRS resource can be configured with 'repetition partially on', i.e., a UE transmits SRS resources of a subset of SRS resources within a SRS resource set with a same uplink spatial domain transmission filter, the UE can transmit SRS resources within different subsets of the SRS resource set with different uplink spatial domain transmission filters.

In one example, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example, $M_D + N_U + M_j = 1$, i.e., the channel conveying the beam indications includes one TCI state ID:
$M_D = 1$, $N_U = 0$ and $M_j = 0$, or
$M_D = 0$, $N_U = 1$ and $M_j = 0$, or
$M_D = 0$, $N_U = 0$ and $M_j = 1$.
Set S corresponds to the indicated DL TCI state ID or UL TCI state ID or Joint TCI state ID. The UE transmits set S of P/SP-SRS based on the indicated TCI state ID.

FIG. 22 illustrates an example 2200 where $M_D + N_U + M_j > 1$, $K = M_D + N_U + M_j$ TCI state IDs are included in the channel conveying the beam indications or cell switch to a target or candidate cell according to embodiments of the present disclosure. The embodiment of beam indications of FIG. 22 is for illustration only. Different embodiments of beam indication could be used without departing from the scope of this disclosure.

In the example of FIG. 22, $M_D + N_U + M_j > 1$, $K = M_D + N_U + M_j$ TCI state IDs are included in the channel conveying the beam indications or cell switch. Set S includes K subsets of P/SP-SRS resources, each subset corresponds to an indicated TCI state ID. The association between a TCI state ID and the P/SP-SRS resources in the subset can be configured/updated by RRC signaling and/or MAC CE signaling.

Although FIG. 22 illustrates an example of beam indication, various changes may be made to FIG. 22. For example, various changes to the number of TCI states, etc. could be made according to particular needs.

In one example, $M_D + N_U + M_j > 1$, $K = M_D + N_U + M_j$ TCI state IDs are included in the channel conveying the beam indications or cell switch.

Set S includes K1 subsets of P/SP-SRS resources, wherein $K1 \leq K$. Each indicated TCI state ID corresponds to at most one subset in set S. The association between a TCI state ID and the P/SP-SRS resources in the subset can be configured/updated by RRC signaling and/or MAC CE signaling.

In one example, an indicated TCI state ID has no corresponding subset in set S, and no corresponding SRS transmission.

In another example, a subset in set S can correspond to one or more indicated TCI state IDs.

In another example, the channel conveying the TCI state IDs can indicate the TCI state IDs for which a UE transmits a subset of SRS resources.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types.

A second set or sets of UL measurement RS resources (e.g., SRS).

A channel conveying a beam indication can indicate whether the UE:

1. Measures the DL measurement RS resources and provides the beam measurement report on the configured resources for beam reporting.
2. Transmits an UL measurement RS (e.g., SRS).
3. Both 1 and 2.

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following:

Explicitly signaled in the channel conveying a beam indication (e.g., a TCI state).

Implicitly determined based higher layer configuration of resource sets and mapping of resource sets to TCI states, and the TCI state indicated in the channel conveying a beam indication.

In one example, a network can configure through high layer signaling (RRC signaling and/or MAC CE signaling):

A first set or sets of DL measurement RS resources (e.g., CSI-RS and/or SSB), and beam measurement reporting resources and beam measurement types.

A second set or sets of UL measurement RS resources (e.g., SRS).

A cell switch command or message (a channel conveying a cell switch command or message) can indicate whether the UE:

1. Measures the DL measurement RS resources and provides the beam measurement report on the configured resources for beam reporting.

2. Transmits an UL measurement RS (e.g., SRS).

3. Both 1 and 2.

The indication type of measurement RS(s) can be based on a new flag in the cell switch command or message, new values for an existing flag in the cell switch command or message, a combination of field values of exiting fields in the cell switch command or message or a specific RNTI or a specific RNTI in the cell switch command or message.

The measurement RS resources and the report resources (if applicable), can be one of the following:

Explicitly signaled in the cell switch command or message.

Implicitly determined based higher layer configuration of resource sets and mapping of resource sets to TCI states, and the TCI state indicated the target cell or candidate cell.

Although FIGS. 20A-20C and FIGS. 21A-21C illustrate examples 2000a-2000c and 2100a-2100c for uplink beam management reference signals updated by beam indication, various changes may be made to FIGS. 20A-20C and FIGS. 21A-21C. For example, while shown as a series of steps, various steps in FIGS. 20A-20C and FIGS. 21A-21C could overlap, occur in parallel, occur in a different order, or occur any number of times.

A CSI-RS resource for beam refinement, can be configured with 'usage', in the corresponding CSI-RS resource set configuration and/or the CSI-RS resource configuration, set to:

In one example, 'usage' is set to 'TxFilterRefinement' for the refinement of downlink spatial domain transmission filter.

In another example, 'usage' is set to 'RxFilterRefinement' for the refinement of downlink spatial domain reception filter. In this case, the UE can assume that the respective CSI-RS resource(s) share the same TCI state as that most recently updated/signaled for an assigned DL data reception on PDSCH and its associated dedicated control (such as the DL assignment on PDCCH). In this case, repetition is configured and can be set to 'ON' or 'OFF'.

In another example, 'usage' is set to 'TxRxFilterRefinement' or 'FilterRefinement' for the refinement of downlink spatial domain transmission filter and/or downlink spatial domain reception filter.

In another example, 'usage' is set to 'beamManagement' for the refinement of downlink spatial domain transmission filter and/or downlink spatial domain reception filter.

A CSI-RS resource for beam tracking, can be configured with 'usage', in the corresponding CSI-RS resource set configuration and/or the CSI-RS resource configuration, set to:

In one example, 'usage' is set to 'TxBeamTracking' for downlink spatial domain transmission filter beam tracking.

In another example, 'usage' is set to 'RxBeamTracking' for downlink spatial domain reception filter beam.

In another example, 'usage' is set to 'TxRxBeamTracking' for 'BeamTracking' for downlink spatial domain transmission filter and/or downlink spatial domain reception filter beam tracking.

In another example, 'usage' is set to 'beamManagement' for downlink spatial domain transmission filter and/or downlink spatial domain reception filter beam tracking.

A SRS resource for beam refinement, can be configured with 'usage', in the corresponding SRS resource set configuration and/or the SRS resource configuration, set to:

In one example, 'usage' is set to 'TxFilterRefinement' for the refinement of uplink spatial domain transmission filter.

In another example, 'usage' is set to 'RxFilterRefinement' for the refinement of uplink spatial domain reception filter. In this case, the UE can assume that the respective SRS resource(s) share the same TCI state as that most recently updated/signaled for an assigned UL data reception on PUSCH and PUCCH. In this case, repetition is configured and can be set to 'ON' or 'OFF'. Optionally, the UE can assume that the UL (TX) spatial filter SRS intended for Rx beam refinement can be inferred from the TCI state for DL (from the beam indication)—in case of common (e.g., joint) DL and UL TCI state. In this case, repetition is configured and can be set to 'ON' or 'OFF'.

In another example, 'usage' is set to 'TxRxFilterRefinement' or 'FilterRefinement' for the refinement of uplink spatial domain transmission filter and/or uplink spatial domain reception filter.

In another example, 'usage' is set to 'beamManagement' for the refinement of uplink spatial domain transmission filter and/or uplink spatial domain reception filter.

A SRS resource for beam tracking, can be configured with 'usage', in the corresponding SRS resource set configuration and/or the SRS resource configuration, set to:

In one example, 'usage' is set to 'TxBeamTracking' for uplink spatial domain transmission filter beam tracking.

In another example, 'usage' is set to 'RxBeamTracking' for uplink spatial domain reception filter beam. In this case, the UE can assume that the respective SRS resource(s) share the same TCI state as that most recently updated/signaled for an assigned UL data reception on PUSCH and PUCCH. In this case, repetition is configured and can be set to 'ON' or 'OFF'. Optionally, the UE can assume that the UL (TX) spatial filter SRS intended for Rx beam tracking can be inferred from the TCI state for DL (from the beam indication)—in case of common DL and UL TCI state. In this case, repetition is configured and can be set to 'ON' or 'OFF'.

In another example, 'usage' is set to 'TxRxBeamTracking' for 'BeamTracking' for uplink spatial domain transmission filter and/or uplink spatial domain reception filter beam tracking.

In another example, 'usage' is set to 'beamManagement' for uplink spatial domain transmission filter and/or uplink spatial domain reception filter beam tracking.

In any of the above example embodiments, terms such as 'RxFilterRefinement', 'TxFilterRefinement', 'TxBeamTracking', and 'RxBeamTracking', etc. are used for illustrative purposes. They can be substituted with any other terms for the same functionality.

RSRP measurement provides a reasonable metric for making a handover decision. A cell can be selected as a target cell for handover if it has a better RSRP than the RSPR of the current serving for example by a certain threshold. RSRP measurements don't take into account the interference in cell. In some cases, the target cell might have a sufficiently better RSRP than the serving cell, but has significantly higher interference, which would lead to a lower signal quality if handover were to take place to the target cell. In those cases, it might seem that using an SINR-type measurement is a better metric than the L1-RSRP metric or using an SINR-type measurement in addition to the L1-RSRP. However, the L1-SINR, which is the ratio between L1-signal power and the interference of a slot can be quite a noisy measurement that can vary significantly from measurement instance to another. There could be several ways to mitigate the variability of the L1-SINR:

A first alternative is taking an average (e.g., exponential average) of the L1-SINR across several slots. The longer the averaging window, the more stable the L1-SINR. However, this comes at an expense of a longer latency.

A second alternative is calculating a long-term average (e.g., exponential average or sliding window) of the L1 interference and noise over a window with a certain size. The long-term average interface is then used to divide L1-RSRP to get an L1-SINR measurement that can be used for handover purposes, i.e., L1-SINR=(L1-RSRP/Long term average interference). The L1-RSRP is measurement in one measurement instance (i.e., without averaging), hence the latency of calculating this metric can be short.

In one example, the beam measurement metric is L1-RSRP that is measured in a single instance.

In one example, the beam measurement metric is an averaged L1-RSRP.

In one example, the average (e.g., long term average) is over measurements performed in a period T.

In one example, T can be configured or updated by RRC signaling and/or MAC CE signaling and/or L1 control (e.g., DCI) signaling.

In one example, T can be specified in the system specifications.

In one example, the measurements averaged in time T include all measurements within the last period T from the time of the L1 measurement report (e.g., the initial transmission of the L1 measurement report).

In one example, the measurements averaged in time T include all measurements within the last period T from the time of the most recent L1 measurement.

In one example, the average (e.g., long term average) is over the most recent N L1-RSRP measurements.

In one example, N can be configured or updated by RRC signaling and/or MAC CE signaling and/or L1 control (e.g., DCI) signaling.

In one example, N can be specified in the system specifications.

In one example, the average (e.g., long term average) is an exponential average with an exponential average parameter a. For example, if RSPR average after measurement instance n−1 is $RSRP_A(n-1)$. The measurement of L1-RSRP during instance n is RSRP(n). The RSPR average after measurement instance n is $RSRP_A(n)=aRSRP_A(n-1)+(1-a)RSRP(n)$. Alternatively, The RSPR average after measurement instance n is $RSRP_A(n)=(1-a)RSRP_A(n-1)+aRSRP(n)$.

In one example, a can be configured or updated by RRC signaling and/or MAC CE signaling and/or L1 control (e.g., DCI) signaling.

In one example, a can be specified in the system specifications.

In one example, the beam measurement metric is L1-SINR that is measured in a single instance. For example, the L1-SINR is ratio of L1 signal power measured in a single instance to the L1 interference and noise measured in the same instance.

In one example, the beam measurement metric is an averaged L1-SINR, wherein the L1-SINR is ratio of L1 signal power measured in a single instance to the L1 interference and noise measured in the same instance.

In one example, the average (e.g., long term average) is over measurement performed in a period T:

(a) In one example, T can be configured or updated by RRC signaling and/or MAC CE signaling and/or L1 control (e.g., DCI) signaling.

(b) In one example, T can be specified in the system specifications.

(c) In one example, the measurements averaged in time T include all measurements within the last period T from the time of the L1 measurement report (e.g., the initial transmission of the L1 measurement report).

(d) In one example, the measurements averaged in time T include all measurements within the last period T from the time of the most recent L1 measurement.

In one example, the average (e.g., long term average) is over the most recent N L1-SINR measurements:

(a) In one example, N can be configured or updated by RRC signaling and/or MAC CE signaling and/or L1 control (e.g., DCI) signaling.

(b) In one example, N can be specified in the system specifications.

In one example, the average (e.g., long term average) is an exponential average with an exponential average parameter a. For example, if SINR average after measurement instance n−1 is $SINR_A(n-1)$. The measurement of L1-SINR during instance n is SINR(n). The L1-SINR average after measurement instance n is $SINR_A(n)=aSINR_A(n-1)+(1-a)SINR(n)$. Alternatively, The L1-SINR average after measurement instance n is $SINR_A(n)=(1-a)SINR_A(n-1)+aSINR(n)$.

(a) In one example, a can be configured or updated by RRC signaling and/or MAC CE signaling and/or L1 control (e.g., DCI) signaling.

(b) In one example, a can be specified in the system specifications.

In one example, the beam measurement metric is L1-SINR where the L1 signal power is measured in a single instance, the interference and noise is an average (e.g., long term average) interference and noise value. The L1-SINR is ratio of the instantaneous L1 signal power to the average interference and noise.

In one example, the interference and noise average (e.g., long term average) is over measurement performed in a period T.

In one example, T can be configured or updated by RRC signaling and/or MAC CE signaling and/or L1 control (e.g., DCI) signaling.

In one example, T can be specified in the system specifications.

In one example, the measurements averaged in time T include all measurements within the last period T from the time of the most recent or current L1 measurement.

In one example, the interference and noise average (e.g., long term average) is over the most recent N noise and interference measurements.

In one example, N can be configured or updated by RRC signaling and/or MAC CE signaling and/or L1 control (e.g., DCI) signaling.

In one example, N can be specified in the system specifications.

In one example, the average (e.g., long term average) is an exponential average with an exponential average parameter a. For example, if interference and noise average after measurement instance n−1 is $IN_A(n−1)$. The measurement interference and noise during instance n is $IN(n)$. The interference and noise average after measurement instance n is $IN_A(n)=aIN_A(n−1)+(1−a)IN(n)$. Alternatively, The interference and noise average after measurement instance n is $IN_A(n)=(1−a)IN_A(n−1)+aIN(n)$.

In one example, a can be configured or updated by RRC signaling and/or MAC CE signaling and/or L1 control (e.g., DCI) signaling.

In one example, a can be specified in the system specifications.

In one example, the L1-SINR in each slot is calculated as ratio of the instantaneous L1 signal power to the average interference and noise as described herein. The resulting L1-SINR is further averaged.

In one example, the average (e.g., long term average) is over measurement performed in a period T.

In one example, T can be configured or updated by RRC signaling and/or MAC CE signaling and/or L1 control (e.g., DCI) signaling.

In one example, T can be specified in the system specifications.

In one example, the measurements averaged in time T include all measurements within the last period T from the time of the L1 measurement report (e.g., the initial transmission of the L1 measurement report).

In one example, the measurements averaged in time T include all measurements within the last period T from the time of the most recent L1 measurement.

In one example, the average (e.g., long term average) is over the most recent N L1-SINR measurements.

In one example, N can be configured or updated by RRC signaling and/or MAC CE signaling and/or L1 control (e.g., DCI) signaling.

In one example, N can be specified in the system specifications.

In one example, the average (e.g., long term average) is an exponential average with an exponential average parameter a. For example, if SINR average after measurement instance n−1 is $SINR_A(n−1)$. The measurement of L1-SINR during instance n is $SINR(n)$. The L1-SINR average after measurement instance n is $SINR_A(n)=aSINR_A(n−1)+(1−a)SINR(n)$. Alternatively, The L1-SINR average after measurement instance n is $SINR_A(n)=(1−a)SINR_A(n−1)+aSINR(n)$.

In one example, a can be configured or updated by RRC signaling and/or MAC CE signaling and/or L1 control (e.g., DCI) signaling.

In one example, a can be specified in the system specifications.

In one example, a beam measurement report is a common measurement report for L1 intra-frequency measurement and L1 inter-frequency measurement.

In another example, separate beam measurement reports are used for L1 intra-frequency measurement and L1 inter-frequency measurement.

Figure 23:
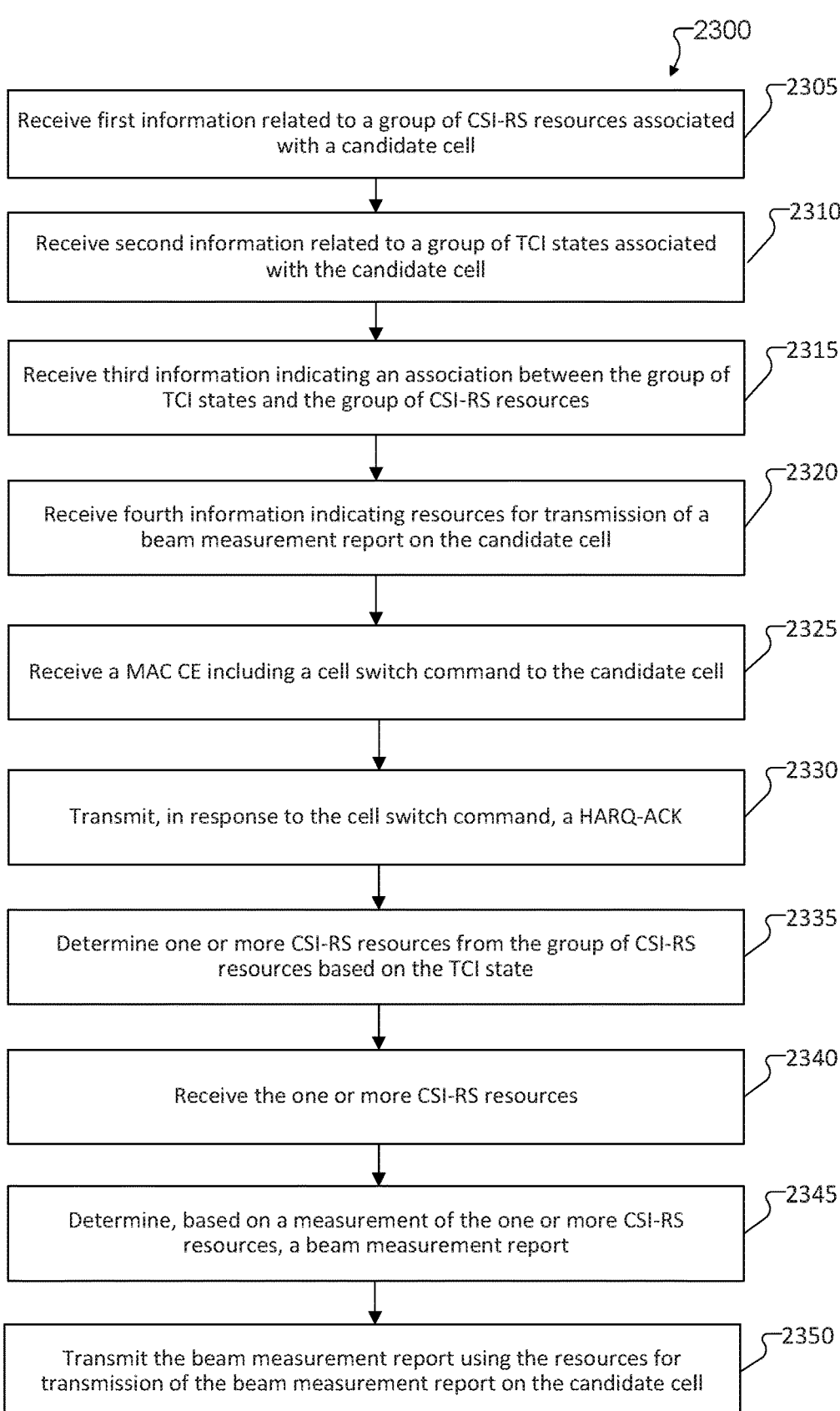
FIG. 23 illustrates a method for inter-cell beam measurement and reporting according to embodiments of the present disclosure.

FIG. 23 illustrates a method 2300 for inter-cell beam measurement and reporting or lower-layer (L1/L2) triggered mobility (LTM) measurement and reporting according to embodiments of the present disclosure. An embodiment of the method illustrated in FIG. 23 is for illustration only. One or more of the components illustrated in FIG. 23 may be implemented in specialized circuitry configured to perform the noted functions or one or more of the components may be implemented by one or more processors executing instructions to perform the noted functions. Other embodiments of inter-cell beam measurement and reporting or lower-layer (L1/L2) triggered mobility (LTM) measurement and reporting could be used without departing from the scope of this disclosure.

As illustrated in FIG. 23, the method 2300 begins at step 2305. At step 2305, a UE receives first information related to a group of CSI-RS resources associated with a candidate cell. At step 2310, the UE receives second information related to a group of TCI states associated with the candidate cell. At step 2315, the UE receives third information indicating an association between the group of TCI states and the group of CSI-RS resources. Each TCI state from the group of TCI states is associated with one or more CSI-RS resources from the group of CSI-RS resources. At step 2320 the UE receives fourth information indicating resources for transmission of a beam measurement report on the candidate cell. At step 2325, the UE receives a MAC CE including cell switch command to the candidate cell. The cell switch command includes a TCI state for the candidate cell. At step 2330, the UE transmits, in response to the cell switch command, a HARQ-ACK. At step 2335, the UE determines one or more CSI-RS resources from the group of CSI-RS resources based on the TCI state. At step 2340, the UE receives the one or more CSI-RS resources. At step 2345, the UE determines, based on a measurement of the one or more CSI-RS resources, a beam measurement report. Finally, at step 2350, the UE transmits the beam measurement report using the resources for transmission of a beam measurement report on the candidate cell.

Although FIG. 23 illustrates one example of a method 2300 for inter-cell beam measurement and reporting or lower-layer (L1/L2) triggered mobility (LTM) measurement and reporting, various changes may be made to FIG. 23. For example, while shown as a series of steps, various steps in FIG. 23 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A user equipment (UE), comprising:
a transceiver configured to:
   receive first information related to a group of channel state information reference signal (CSI-RS) resources associated with a candidate cell,
   receive second information related to a group of transmission configuration indication (TCI) states associated with the candidate cell,
   receive third information indicating an association between the group of TCI states and the group of CSI-RS resources, wherein each TCI state from the group of TCI states is associated with one or more CSI-RS resources from the group of CSI-RS resources,
   receive fourth information indicating resources for transmission of a beam measurement report on the candidate cell,
   receive a medium access control channel element (MAC CE) including a cell switch command to the candidate cell, wherein the cell switch command includes a TCI state for the candidate cell, and
   transmit, in response to the cell switch command, a hybrid automatic repeat request acknowledgement (HARQ-ACK); and
a processor operably coupled to the transceiver, the processor configured to determine one or more CSI-RS resources from the group of CSI-RS resources based on the TCI state,
wherein:
   the transceiver is further configured to receive the one or more CSI-RS resources,
   the processor is further configured to determine, based on a measurement of the one or more CSI-RS resources, a beam measurement report, and
   the transceiver is further configured to transmit the beam measurement report using the resources for transmission of the beam measurement report on the candidate cell.

2. The UE of claim 1, wherein:
the transceiver is further configured to receive configuration information for a timing offset, and
the one or more CSI-RS resources is received after the timing offset from a last symbol of a channel conveying the HARQ-ACK.

3. The UE of claim 1, wherein the beam measurement report includes a layer-1 signal-to-noise ratio (L1-SINR).

4. The UE of claim 3, wherein the processor is further configured to calculate the L1-SINR as a ratio between an instantaneous reference signal received power (RSRP) and a long term averaged noise and interference power.

5. The UE of claim 1, wherein:
the transceiver is further configured to:

receive fifth information related to a group of sounding reference signal (SRS) resources, and
receive sixth information indicating an association between the TCI states and SRS resources from the group of SRS resources,
the processor is further configured to determine one or more SRS resources based on the TCI state, and
the transceiver is further configured to transmit the one or more determined SRS resources.

6. The UE of claim 5, wherein:
the transceiver is further configured to receive configuration information related to a timing offset, and
the one or more SRS resources is transmitted after the timing offset from a last symbol of a channel conveying the HARQ-ACK.

7. The UE of claim 5, wherein the transceiver is further configured to receive configuration information indicating whether the UE:
receives the one or more CSI-RS resources and transmits the beam measurement report,
transmits the one or more SRS resources, or
receives the one or more CSI-RS resources, transmits the beam measurement report, and transmits the one or more SRS resources.

8. A base station (BS), comprising:
a transceiver configured to:
   transmit first information related to a group of channel state information reference signal (CSI-RS) resources associated with a candidate cell,
   transmit second information related to a group of transmission configuration indication (TCI) states associated with the candidate cell,
   transmit third information indicating an association between the group of TCI states and the group of CSI-RS resources, wherein each TCI state from the group of TCI states is associated with one or more CSI-RS resources from the group of CSI-RS resources,
   transmit fourth information indicating resources for a beam measurement report on the candidate cell,
   transmit a medium access control channel element (MAC CE) including a cell switch command to the candidate cell, wherein the cell switch command includes a TCI state for the candidate cell, and
   receive, in response to the cell switch command, a hybrid automatic repeat request acknowledgement (HARQ-ACK); and
a processor operably coupled to the transceiver, the processor configured to determine one or more CSI-RS resources from the group of CSI-RS resources based on the TCI state,
wherein:
   the transceiver is further configured to transmit the one or more CSI-RS resources, and
   receive the beam measurement report using the resources for the beam measurement report on the candidate cell.

9. The BS of claim 8, wherein:
the transceiver is further configured to transmit configuration information for a timing offset, and
the one or more CSI-RS resources is transmitted after the timing offset from a last symbol of a channel conveying the HARQ-ACK.

10. The BS of claim 8, wherein the beam measurement report includes a layer-1 signal-to-noise ratio (L1-SINR).

11. The BS of claim 10, wherein the L1-SINR is a ratio between an instantaneous reference signal received power (RSRP) and a long term averaged noise and interference power.

12. The BS of claim 8, wherein:

the transceiver is further configured to:

transmit fifth information related to a group of sounding reference signal (SRS) resources, and transmit sixth information indicating an association between the TCI states and SRS resources from the group of SRS resources, the processor is further configured to determine one or more SRS resources based on the TCI state, and the transceiver is further configured to receive the one or more determined SRS resources.

13. The BS of claim 12, wherein:

the transceiver is further configured to transmit configuration information related to a timing offset, and the one or more SRS resources is transmitted after the timing offset from a last symbol of a channel conveying the HARQ-ACK.

14. The BS of claim 12, wherein the transceiver is further configured to transmit configuration information indicating whether the BS:

transmits the one or more CSI-RS resources and received the beam measurement report, receives the one or more SRS resources, or transmits the one or more CSI-RS resources, receives the beam measurement report, and receives the one or more SRS resources.

15. A method of operating a user equipment (UE), the method comprising:

receiving first information related to a group of channel state information reference signal (CSI-RS) resources associated with a candidate cell, receiving second information related to a group of transmission configuration indication (TCI) states associated with the candidate cell, receiving third information indicating an association between the group of TCI states and the group of CSI-RS resources, wherein each TCI state from the group of TCI states is associated with one or more CSI-RS resources from the group of CSI-RS resources, receiving fourth information indicating resources for transmission of a beam measurement report on the candidate cell, receiving a medium access control channel element (MAC CE) including a cell switch command to the candidate cell, wherein the cell switch command includes a TCI state for the candidate cell, transmitting, in response to the cell switch command, a hybrid automatic repeat request acknowledgement (HARQ-ACK), determining one or more CSI-RS resources from the group of CSI-RS resources based on the TCI state, receiving the one or more CSI-RS resources, determining, based on a measurement of the one or more CSI-RS resources, a beam measurement report, and transmitting the beam measurement report using the resources for transmission of the beam measurement report on the candidate cell.

16. The method of claim 15, further comprising:

receiving configuration information for a timing offset, wherein the one or more CSI-RS resources is received after the timing offset from a last symbol of a channel conveying the HARQ-ACK.

17. The method of claim 15, wherein the beam measurement report includes a layer-1 signal-to-noise ratio (L1-SINR).

18. The method of claim 17, further comprising calculating the L1-SINR as a ratio between an instantaneous reference signal received power (RSRP) and a long term averaged noise and interference power.

19. The method of claim 15, further comprising:

receiving fifth information related to a group of sounding reference signal (SRS) resources, receiving sixth information indicating an association between the TCI states and SRS resources from the group of SRS resources, determining one or more SRS resources based on the TCI state, and transmitting the one or more determined SRS resources.

20. The method of claim 19, further comprising:

receiving configuration information related to a timing offset, wherein the one or more SRS resources is transmitted after the timing offset from a last symbol of a channel conveying the HARQ-ACK.

* * * * *